US012654769B2

(12) United States Patent
Sakai et al.

(10) Patent No.: US 12,654,769 B2
(45) Date of Patent: Jun. 16, 2026

(54) VEHICLE CONTROL DEVICE

(71) Applicants: TOYOTA JIDOSHA KABUSHIKI KAISHA, Toyota (JP); DENSO CORPORATION, Kariya-City (JP); J-QuAD DYNAMICS INC., Tokyo (JP)

(72) Inventors: Yu Sakai, Nagakute (JP); Takahiro Adachi, Chiryu (JP); Takuma Kyo, Tokyo (JP)

(73) Assignees: TOYOTA JIDOSHA KABUSHIKI KAISHA, Toyota (JP); DENSO CORPORATION, Kariya-City (JP); J-QuAD DYNAMICS INC., Tokyo (JP)

( * ) Notice: Subject to any disclaimer, the term of this patent is extended or adjusted under 35 U.S.C. 154(b) by 608 days.

(21) Appl. No.: 18/106,695

(22) Filed: Feb. 7, 2023

(65) Prior Publication Data

US 2023/0303162 A1 Sep. 28, 2023

(30) Foreign Application Priority Data

Mar. 22, 2022 (JP) ................................. 2022-044862

(51) Int. Cl.
B62D 6/00 (2006.01)
B60W 30/18 (2012.01)
(Continued)

(52) U.S. Cl.
CPC ....... B62D 6/008 (2013.01); B60W 30/18163 (2013.01); B60W 40/04 (2013.01); B62D 15/0255 (2013.01)

(58) Field of Classification Search
CPC ............... B62D 6/008; B62D 15/0255; B60W 30/18163; B60W 40/04; B60W 2710/20; B60W 30/12

See application file for complete search history.

(56) References Cited

U.S. PATENT DOCUMENTS

2005/0240328 A1* 10/2005 Shirato .................. B62D 1/286
701/1
2009/0024279 A1* 1/2009 Takeda ................... B62D 6/008
701/41
(Continued)

FOREIGN PATENT DOCUMENTS

JP 2004-331023 A 11/2004
JP 2012-148747 A 8/2012
(Continued)

OTHER PUBLICATIONS

Unpublished U.S. Appl. No. 18/087,330, filed Dec. 22, 2022. Inventors: Satoshi Handa et al.

*Primary Examiner* — Lindsay M Low
*Assistant Examiner* — Brian R Kirby
(74) *Attorney, Agent, or Firm* — Sughrue Mion, PLLC

(57) ABSTRACT

A vehicle control device includes: a reaction device that applies a steering reaction force to a steering operation performed by a driver on a driver's vehicle; and a control device that executes steering reaction force control for controlling a value of the steering reaction force. The control device applies, to a steering operation, a reaction force having a reference value as a steering reaction force when a lane change of a driver's vehicle is not performed during execution of steering reaction force control. When the lane change of the driver's vehicle is performed, the control device sets the steering reaction force to be applied to the steering operation in a direction of the lane change of the driver's vehicle to a value smaller than the reference value.

3 Claims, 24 Drawing Sheets

(51) Int. Cl.
  *B60W 40/04*   (2006.01)
  *B62D 15/02*   (2006.01)

(56)     References Cited

U.S. PATENT DOCUMENTS

| | | | |
|---|---|---|---|
| 2014/0074356 A1* | 3/2014 | Bone | G08G 1/167 |
| | | | 701/41 |
| 2015/0217801 A1* | 8/2015 | Takeda | B62D 6/003 |
| | | | 701/42 |
| 2017/0113673 A1* | 4/2017 | Kokido | B60W 30/10 |
| 2019/0286127 A1* | 9/2019 | Watanabe | G05D 1/0061 |
| 2019/0367082 A1 | 12/2019 | Sugamoto et al. | |
| 2021/0402998 A1* | 12/2021 | Inoue | B60W 10/18 |
| 2023/0286577 A1* | 9/2023 | Kimura | B62D 15/0255 |

FOREIGN PATENT DOCUMENTS

| | | |
|---|---|---|
| JP | 2019-209844 A | 12/2019 |
| JP | 2020-132025 A | 8/2020 |

* cited by examiner

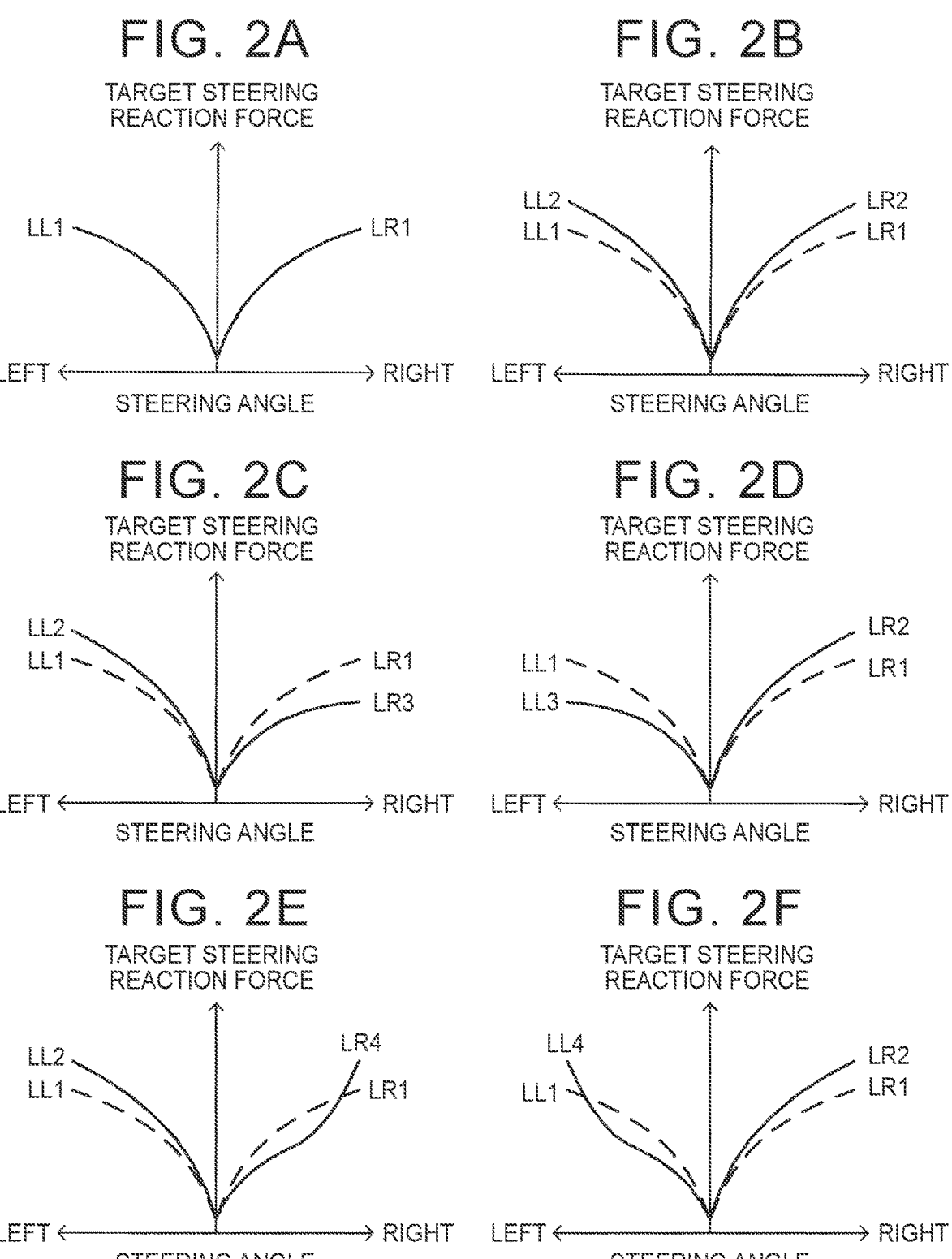

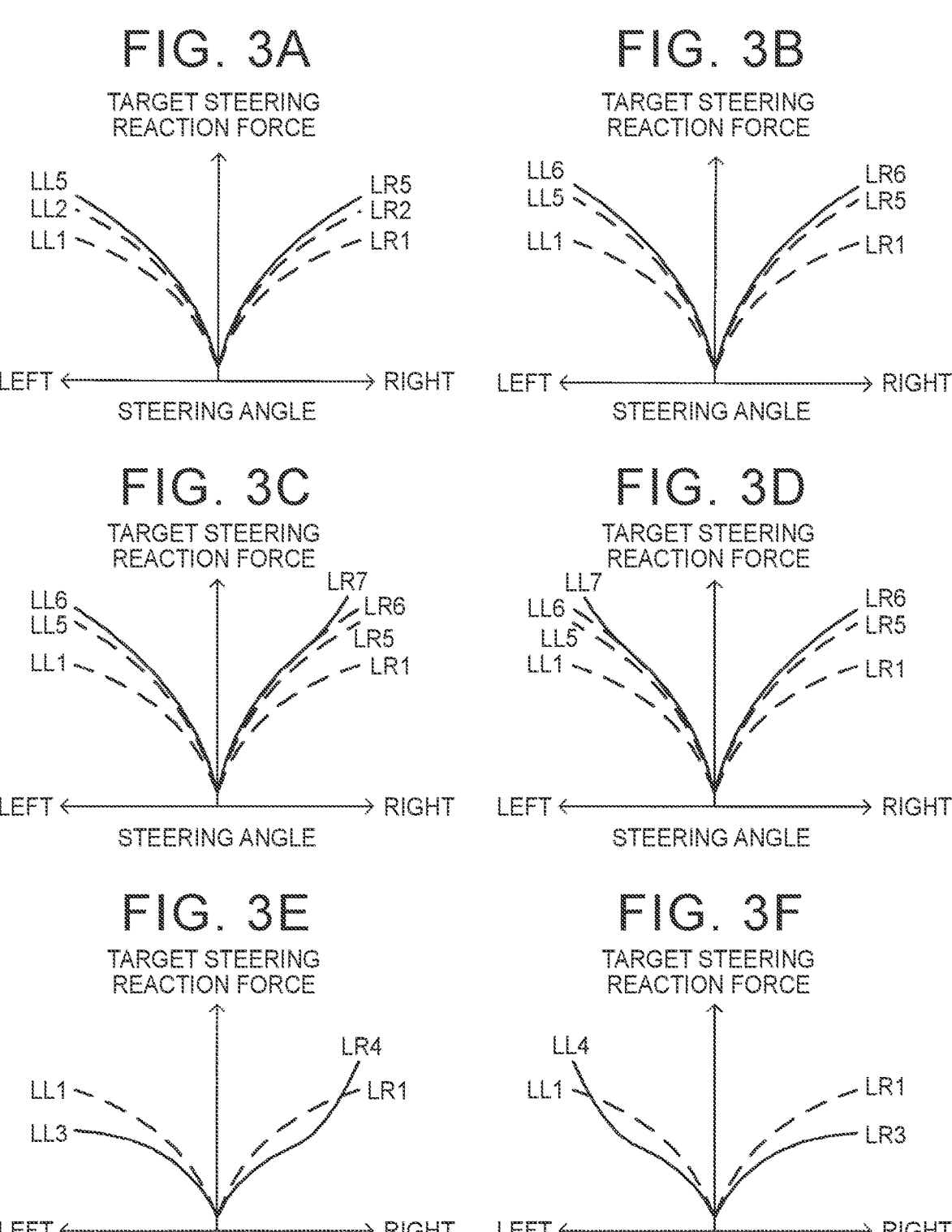

FIG. 3A

TARGET STEERING
REACTION FORCE

LL5
LL2
LL1

LR5
LR2
LR1

LEFT ←——————→ RIGHT

STEERING ANGLE

FIG. 3B

TARGET STEERING
REACTION FORCE

LL6
LL5
LL1

LR6
LR5
LR1

LEFT ←——————→ RIGHT

STEERING ANGLE

FIG. 3C

TARGET STEERING
REACTION FORCE

LL6
LL5
LL1

LR7
LR6
LR5
LR1

LEFT ←——————→ RIGHT

STEERING ANGLE

FIG. 3D

TARGET STEERING
REACTION FORCE

LL7
LL6
LL5
LL1

LR6
LR5
LR1

LEFT ←——————→ RIGHT

STEERING ANGLE

FIG. 3E

TARGET STEERING
REACTION FORCE

LR4
LL1
LR1
LL3

LEFT ←——————————→ RIGHT

STEERING ANGLE

FIG. 3F

TARGET STEERING
REACTION FORCE

LL4
LL1
LR1
LR3

LEFT ←——————————→ RIGHT

STEERING ANGLE

FIG. 5A

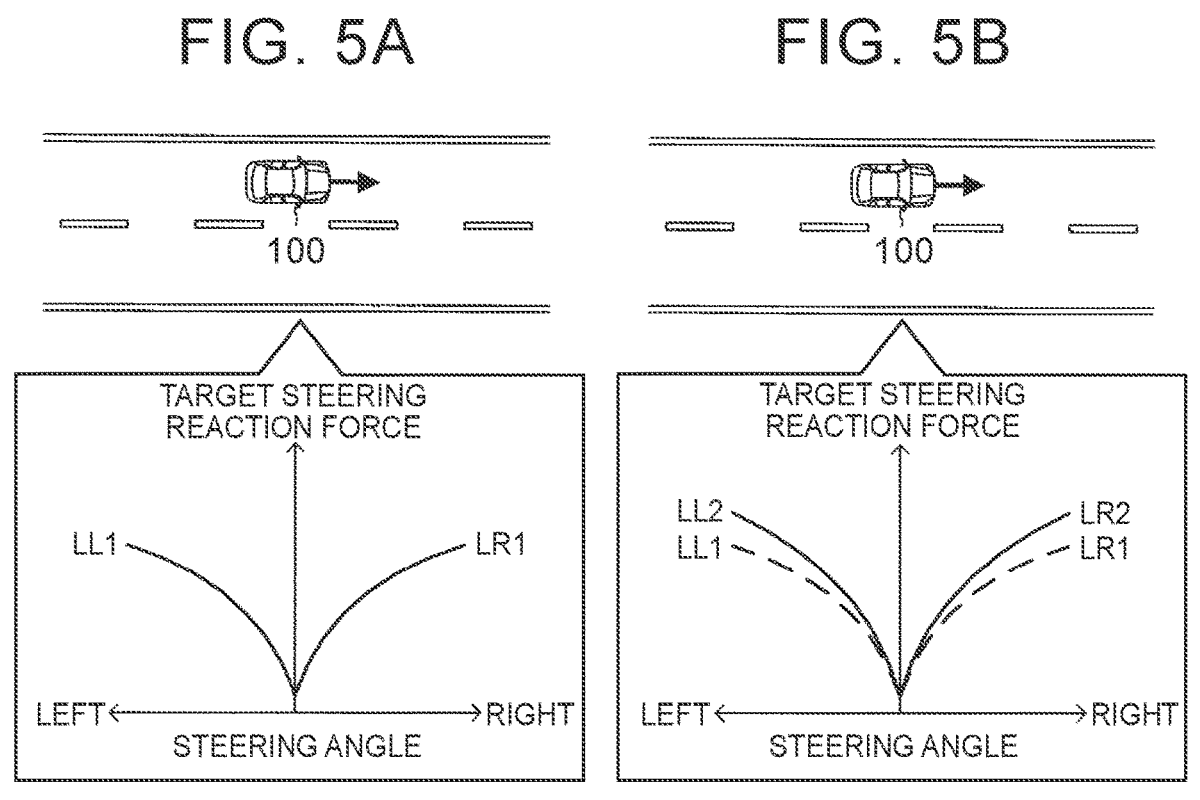

TARGET STEERING
REACTION FORCE

LL1

LR1

LEFT ← STEERING ANGLE → RIGHT

FIG. 5B

TARGET STEERING
REACTION FORCE

LL2
LL1

LR2
LR1

LEFT ← STEERING ANGLE → RIGHT

Figures 7A1, 7A2, 7B1, 7B2:
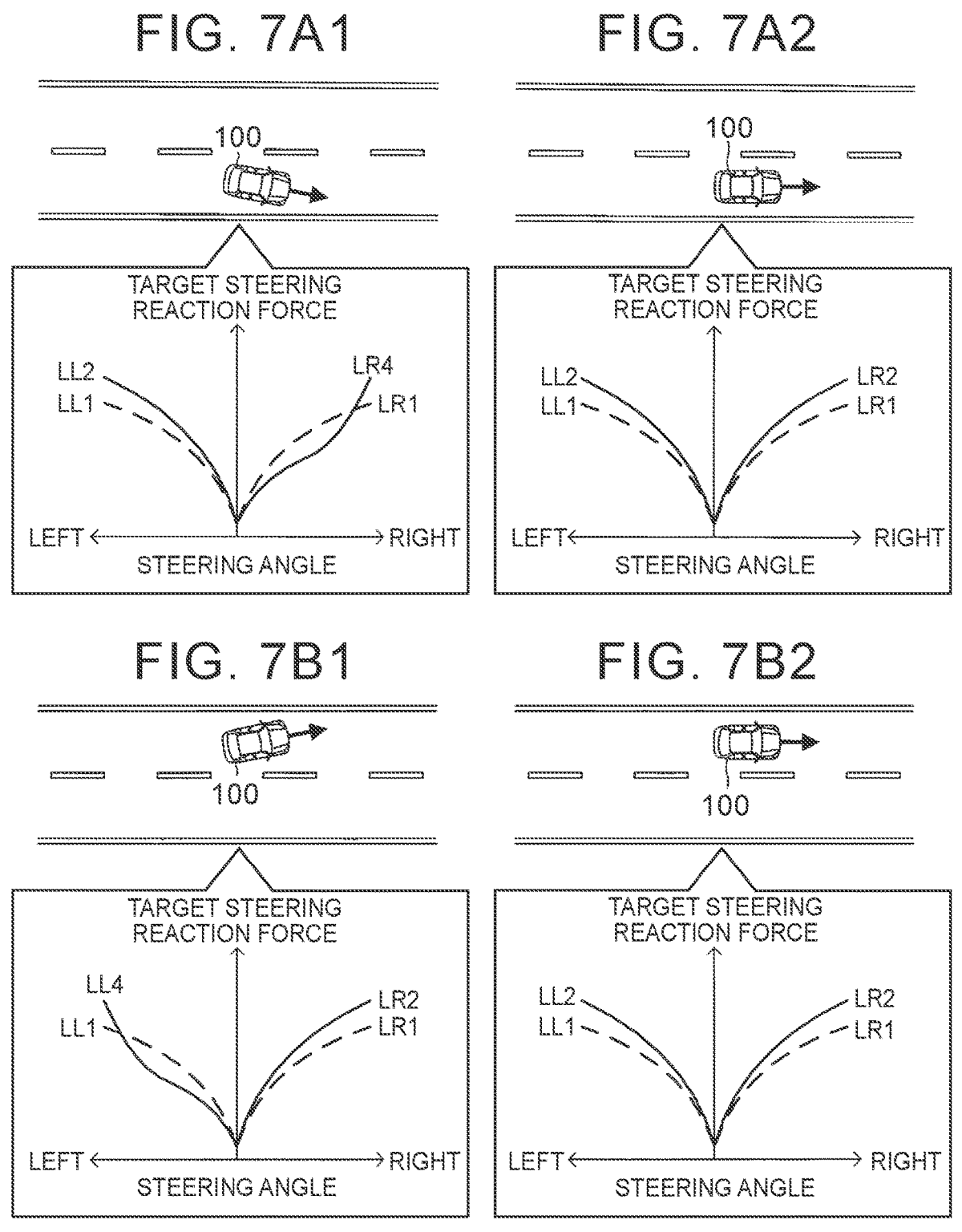

TARGET STEERING
REACTION FORCE

LL2
LL1

LR4
LR1

LEFT ← → RIGHT
STEERING ANGLE

TARGET STEERING
REACTION FORCE

LL2
LL1

LR2
LR1

LEFT ← → RIGHT
STEERING ANGLE

TARGET STEERING
REACTION FORCE

LL4
LL1

LR2
LR1

LEFT ← → RIGHT
STEERING ANGLE

TARGET STEERING
REACTION FORCE

LL2
LL1

LR2
LR1

LEFT ← → RIGHT
STEERING ANGLE

TARGET STEERING
REACTION FORCE

LL5
LL2
LL1

LR5
LR2
LR1

LEFT ← STEERING ANGLE → RIGHT

TARGET STEERING
REACTION FORCE

LL6
LL5
LL1

LR6
LR5
LR1

LEFT ← STEERING ANGLE → RIGHT

TARGET STEERING
REACTION FORCE

LL6
LL5
LL1

LR6
LR5

LR1

LEFT ←————→ RIGHT

STEERING ANGLE

Figures 9A, 9B, 9C:
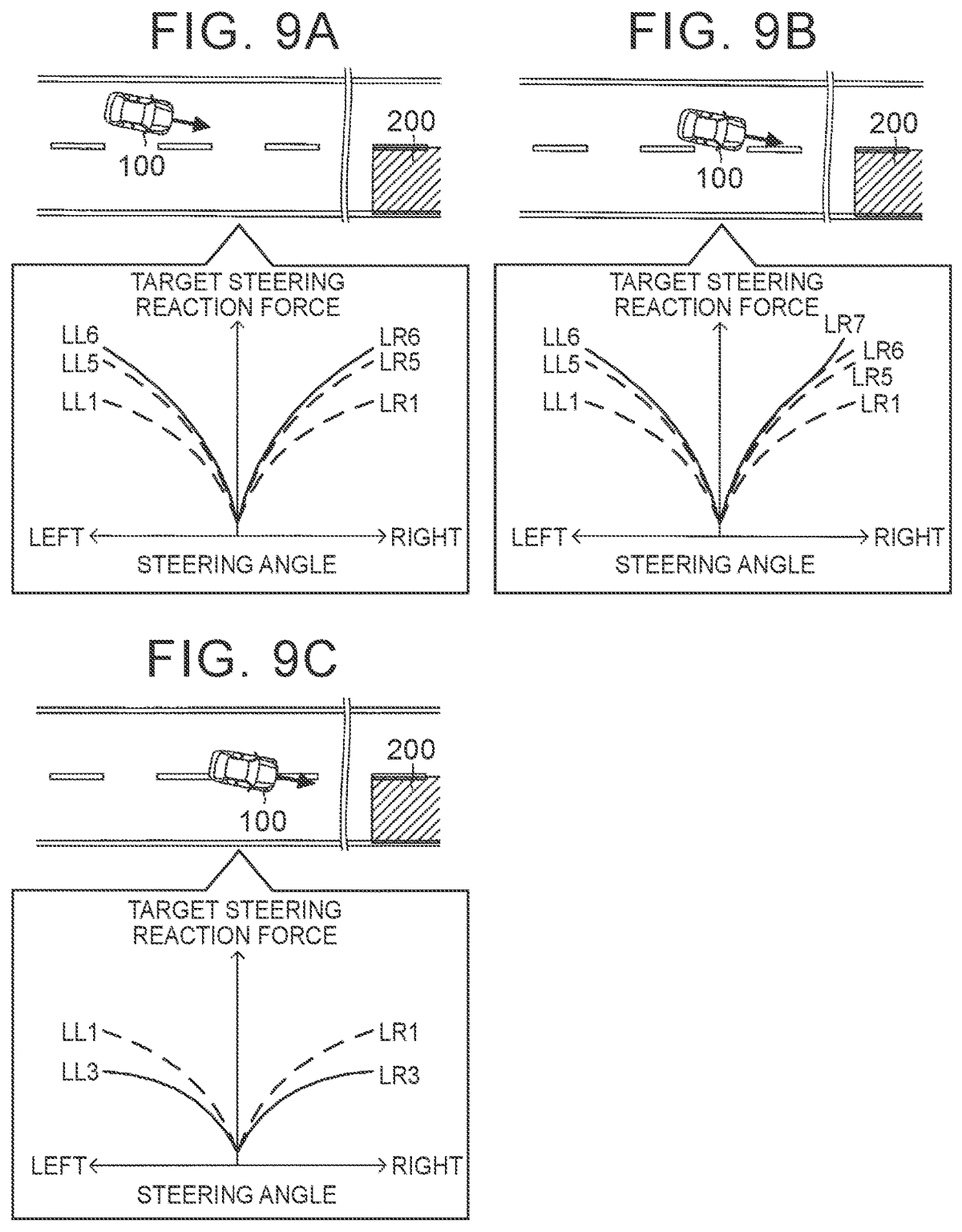

TARGET STEERING
REACTION FORCE

LL6
LL5
LL1

LR7
LR6
LR5
LR1

LEFT ←————→ RIGHT

STEERING ANGLE

TARGET STEERING
REACTION FORCE

LL1
LL3

LR1
LR3

LEFT ←————→ RIGHT

STEERING ANGLE

FIG. 10A1
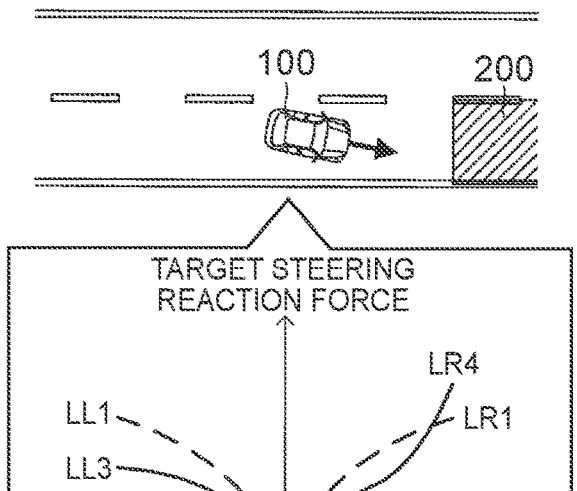
FIG. 10A2
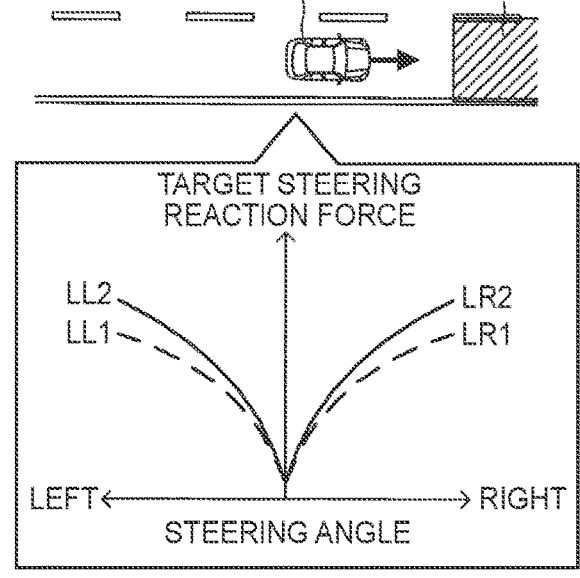
FIG. 10B1
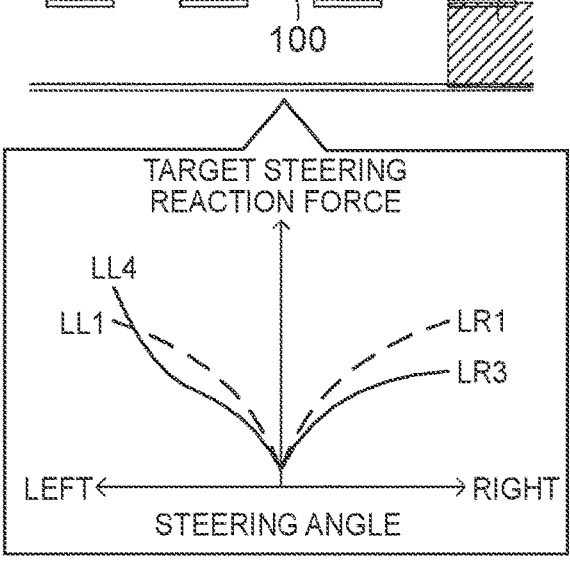
FIG. 10B2
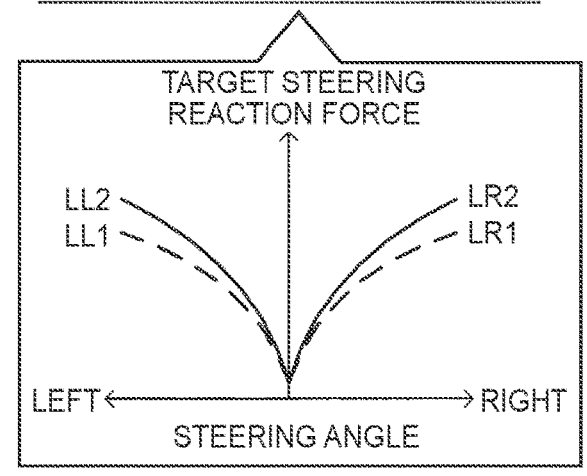

FIG. 11A

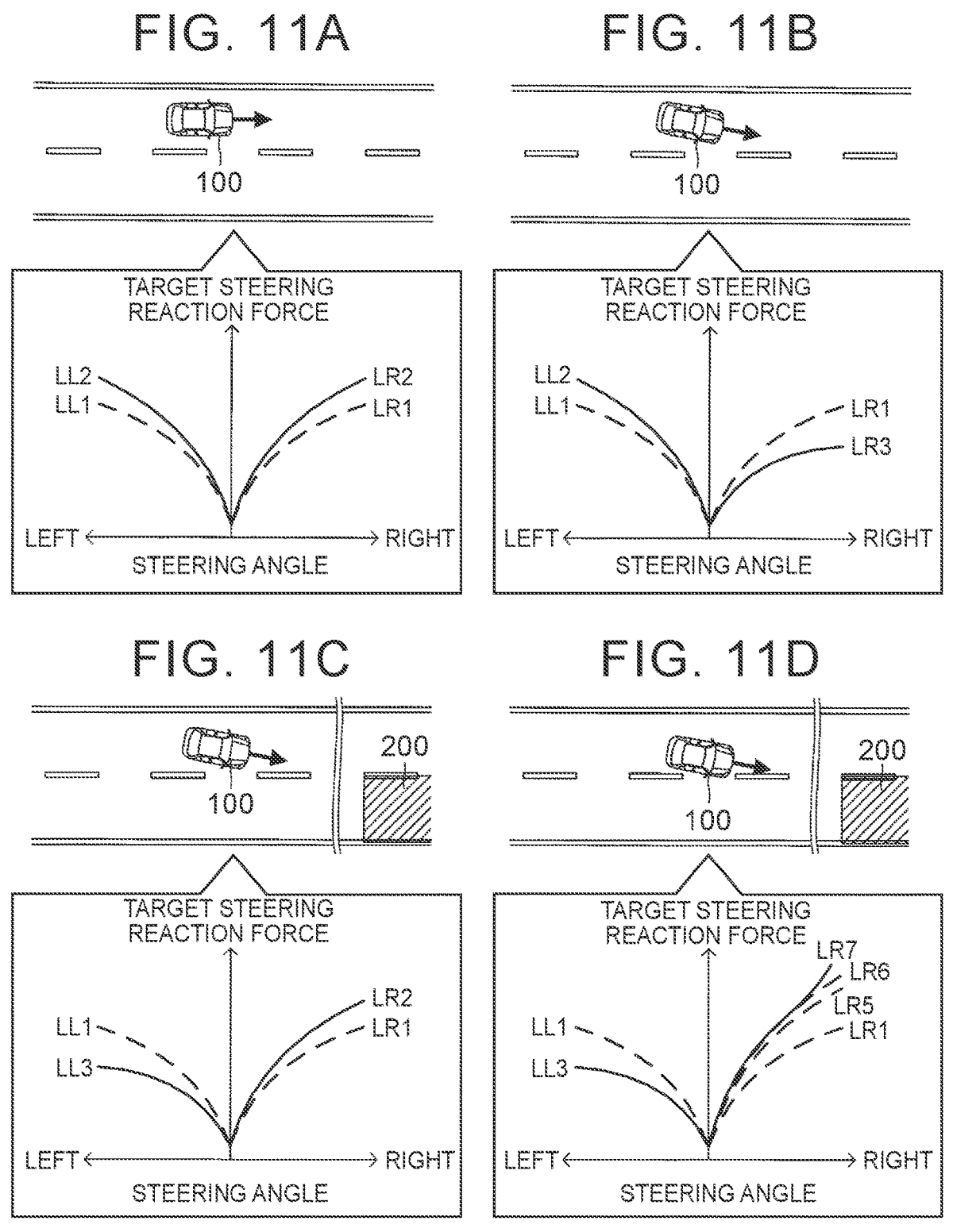

TARGET STEERING
REACTION FORCE

LL2
LL1

LR2
LR1

LEFT ← STEERING ANGLE → RIGHT

FIG. 11B

TARGET STEERING
REACTION FORCE

LL2
LL1

LR1
LR3

LEFT ← STEERING ANGLE → RIGHT

TARGET STEERING
REACTION FORCE

LL1
LL3

LR2
LR1

LEFT ← STEERING ANGLE → RIGHT

TARGET STEERING
REACTION FORCE

LR7
LR6
LR5
LR1

LL1
LL3

LEFT ← STEERING ANGLE → RIGHT

FIG. 13A1
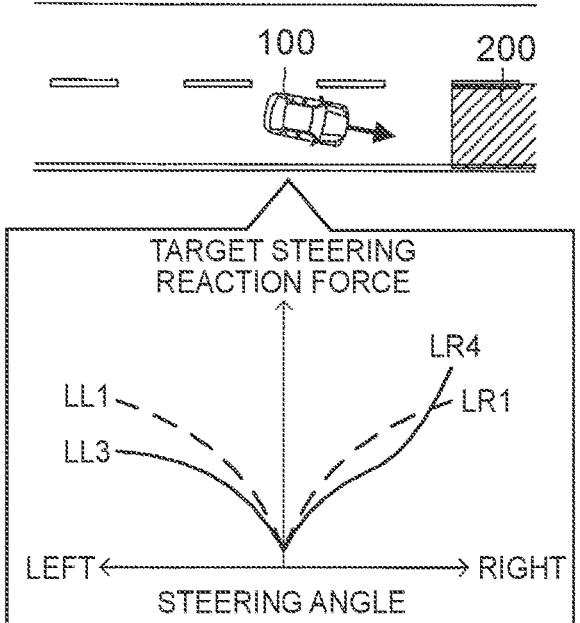
FIG. 13A2
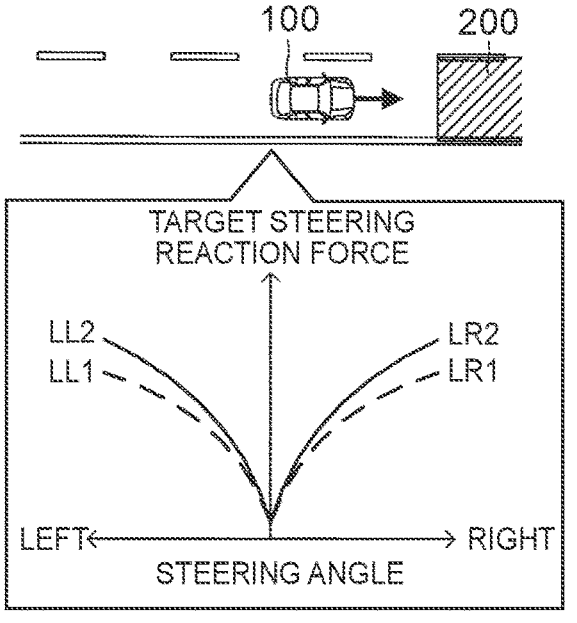
FIG. 13B1
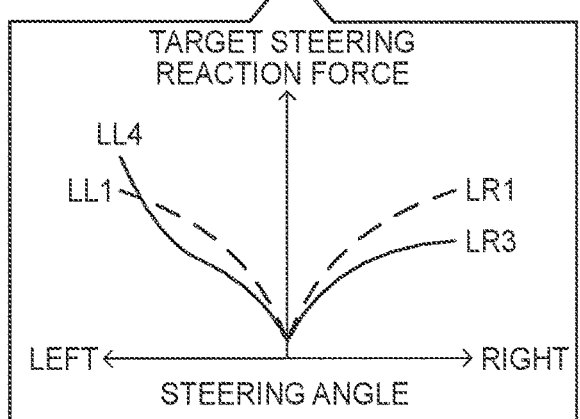
FIG. 13B2
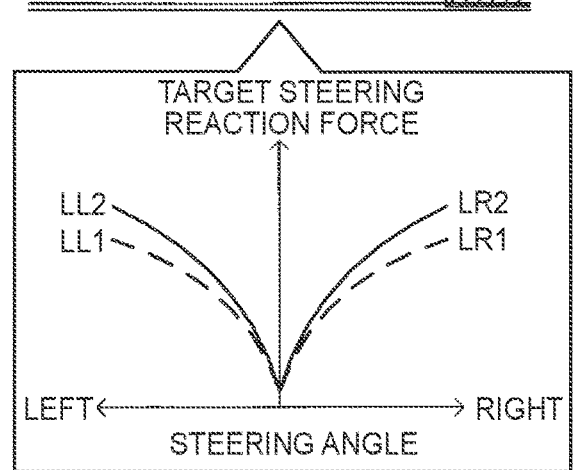

FIG. 14A
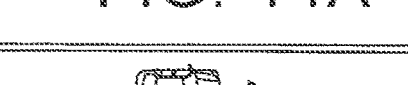
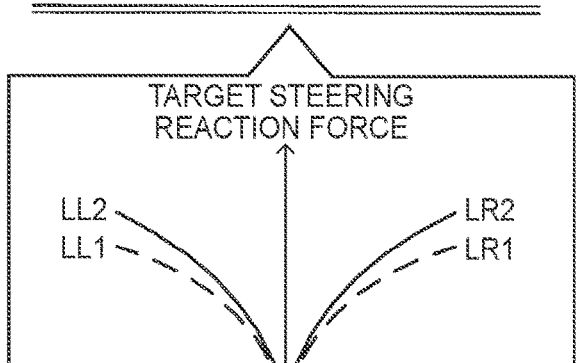
FIG. 14B
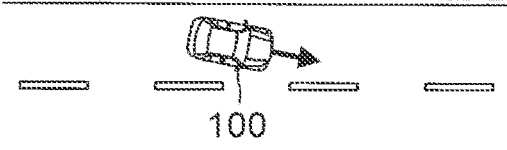
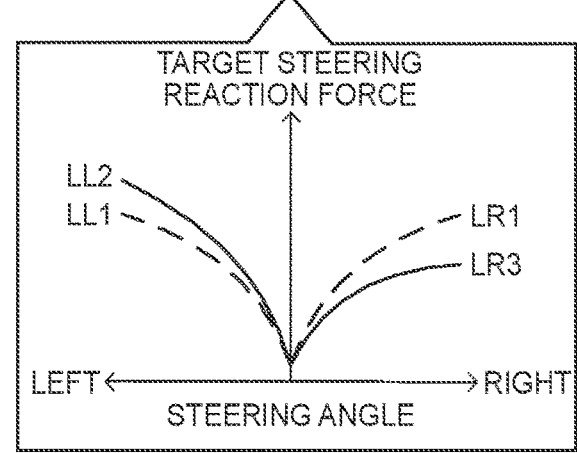
FIG. 14C
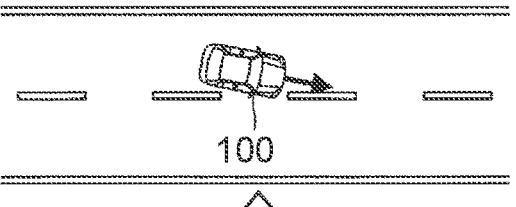
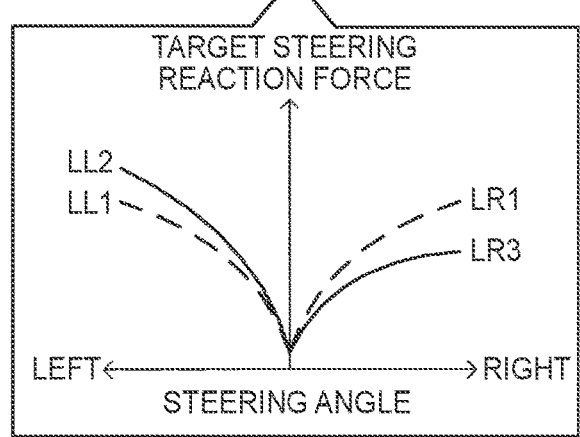
FIG. 14D
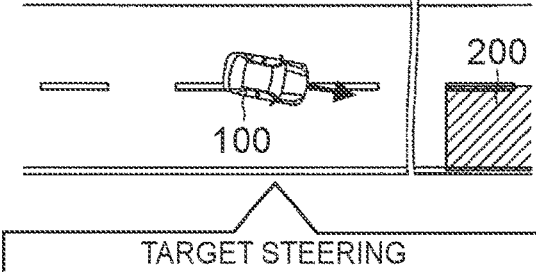
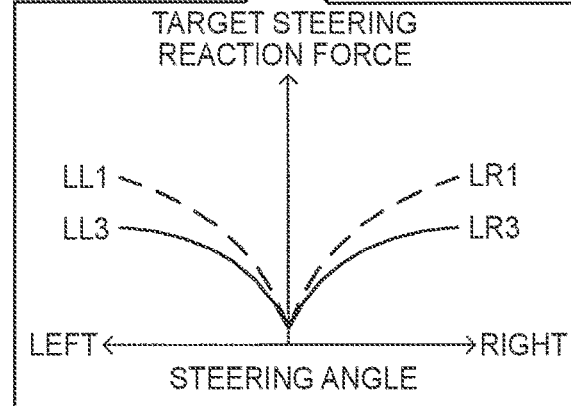

FIG. 15A1
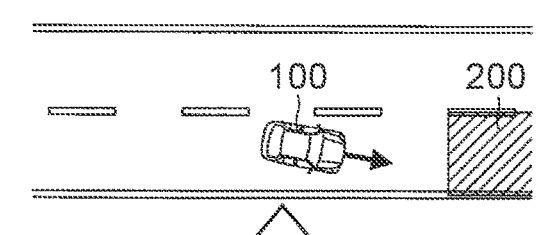
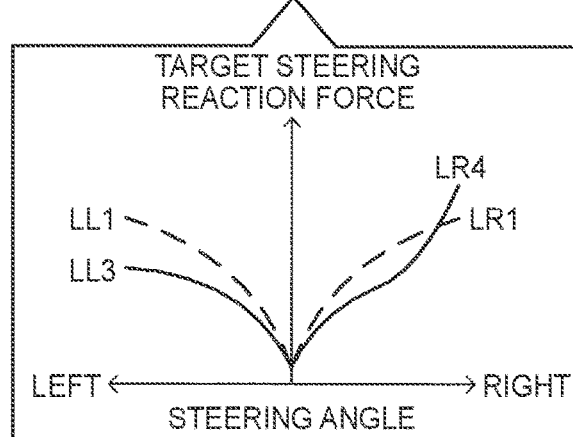
FIG. 15A2
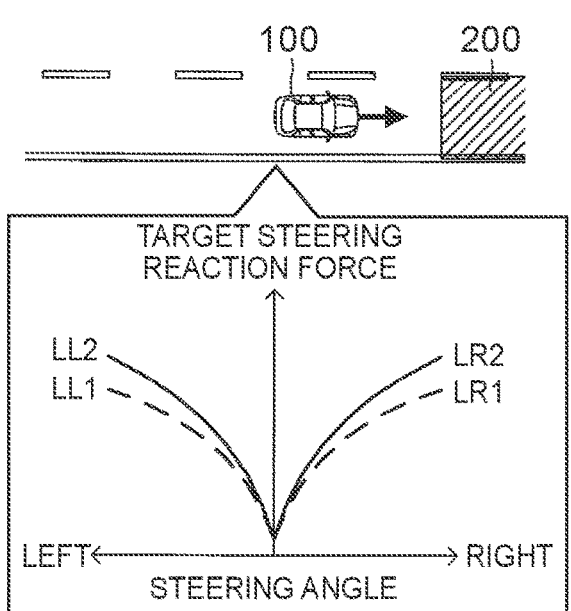
FIG. 15B1
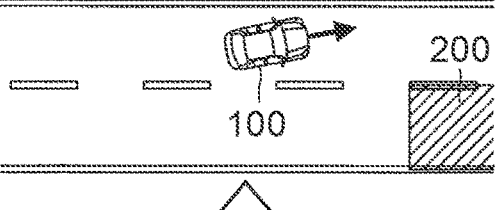
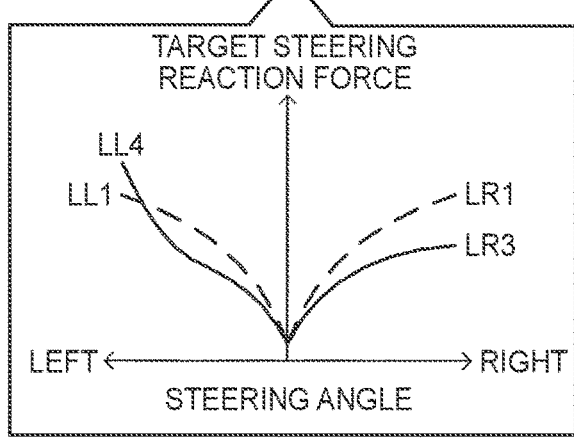
FIG. 15B2
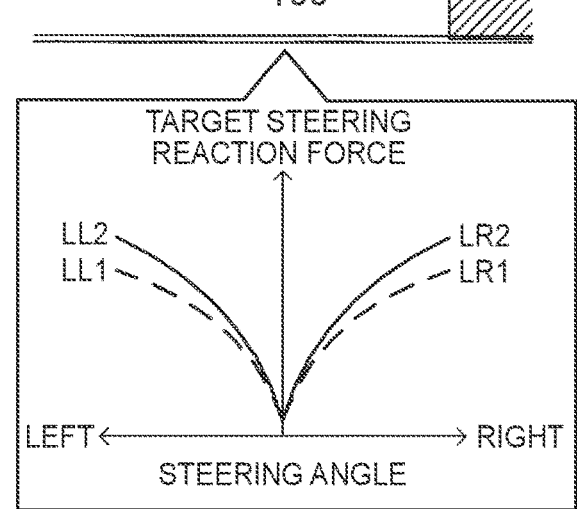

VEHICLE CONTROL DEVICE

CROSS-REFERENCE TO RELATED APPLICATION

This application claims priority to Japanese Patent Application No. 2022-044862 filed on Mar. 22, 2022 incorporated herein by reference in its entirety.

BACKGROUND

1. Technical Field

The present disclosure relates to a vehicle control device.

2. Description of Related Art

There is a range of an appropriate steering wheel operation amount (appropriate range) required for a driver in order that a vehicle can appropriately travel along a curved road. There is known a vehicle control device configured such that, when the amount of the driver's steering wheel operation increases and enters the appropriate range while the vehicle is traveling along a curved road, a reaction force (steering reaction force) to be applied to the driver's steering wheel operation is increased to easily keep the steering wheel operation amount within the appropriate range (see Japanese Unexamined Patent Application Publication No. 2019-209844 (JP 2019-209844 A)).

SUMMARY

It is desirable that, not only in a scene in which a driver's vehicle is traveling along a curved road but also in a scene in which the driver's vehicle is changing lanes, the driver can easily perform the steering wheel operation to change the lanes of the driver's vehicle. When an adjacent lane to which the driver's vehicle is expected to change the lane includes an area where entry of vehicles is restricted (entry-restricted area), such as a construction area, and the steering wheel operation to change lanes of the driver's vehicle is easy to perform, however, the driver's vehicle may easily enter the entry-restricted area.

The present disclosure provides a vehicle control device that can facilitate a lane change of a driver's vehicle while suppressing entry of the driver's vehicle into an entry-restricted area.

A vehicle control device according to a first aspect of the present disclosure includes: a reaction device configured to apply a steering reaction force to a steering operation performed by a driver on a driver's vehicle; and a control device configured to execute steering reaction force control for controlling a value of the steering reaction force. The control device is configured to apply, to the steering operation, a reaction force having a reference value as the steering reaction force when a lane change of the driver's vehicle is not performed during execution of the steering reaction force control. The control device is configured to, when the lane change of the driver's vehicle is performed during the execution of the steering reaction force control, set the steering reaction force to be applied to the steering operation in a direction of the lane change of the driver's vehicle to a value smaller than the reference value.

In the vehicle control device according to this aspect configured as described above, the control device is configured such that, when an entry-restricted area approach condition that a parallel lane adjoining a lane along which the driver's vehicle is traveling includes, at a part ahead of the driver's vehicle, an entry-restricted area where entry of the driver's vehicle is restricted is satisfied during the execution of the steering reaction force control, the steering reaction force to be applied to the steering operation in a direction of movement of the driver's vehicle toward the parallel lane is not set to the value smaller than the reference value.

Accordingly, when the parallel lane adjoining the lane along which the driver's vehicle is traveling (initial lane) includes the entry-restricted area, the steering reaction force to be applied to the steering operation in the direction of movement of the driver's vehicle toward the parallel lane is not reduced. Therefore, it is not easy to perform the steering operation in the direction of movement of the driver's vehicle toward the parallel lane. Thus, it is possible to suppress the entry of the driver's vehicle into the entry-restricted area through the lane change of the driver's vehicle to the parallel lane. When the parallel lane includes no entry-restricted area, the steering reaction force to be applied to the steering operation in the direction of movement of the driver's vehicle toward the parallel lane is reduced. Therefore, it is easy to perform the steering operation in the direction of movement of the driver's vehicle toward the parallel lane. Thus, according to this aspect, it is possible to facilitate the lane change of the driver's vehicle while suppressing the entry of the driver's vehicle into the entry-restricted area.

In the aspect described above, the control device may be configured to, when the entry-restricted area approach condition for the parallel lane is satisfied during the execution of the steering reaction force control, set the steering reaction force to be applied to the steering operation in the direction of movement of the driver's vehicle toward the parallel lane to a value larger than the reference value.

According to this aspect, when the entry-restricted area approach condition for the parallel lane is satisfied, the steering reaction force to be applied to the steering operation in the direction of movement of the driver's vehicle toward the parallel lane is increased. Therefore, it is possible to increase difficulty in performing the steering operation in the direction of movement of the driver's vehicle toward the parallel lane.

In the aspect described above, the control device may be configured to, when the entry-restricted area approach condition for the parallel lane to which the driver's vehicle is expected to change the lane is satisfied at a start of the lane change of the driver's vehicle during the execution of the steering reaction force control, or when the entry-restricted area approach condition for the parallel lane is satisfied within a period after the start of the lane change of the driver's vehicle and before entry of the driver's vehicle into the parallel lane, set the steering reaction force to be applied to the steering operation in the direction of the lane change of the driver's vehicle to a value larger than the reference value, and set the steering reaction force to be applied to the steering operation in a direction opposite to the direction of the lane change of the driver's vehicle to the value smaller than the reference value.

Accordingly, when the parallel lane to which the driver's vehicle is expected to change the lane includes the entry-restricted area, the steering reaction force to be applied to the steering operation in the direction of the lane change of the driver's vehicle is increased, and the steering reaction force to be applied to the steering operation in the opposite direction is reduced. Therefore, it is difficult to perform the steering operation in the direction of the lane change of the driver's vehicle, and it is easy to perform the steering operation in the opposite direction. Thus, it is easy to keep the driver's vehicle in its original lane, or to return the driver's vehicle to its original lane. Therefore, it is possible to suppress the entry of the driver's vehicle into the entry-restricted area through the lane change of the driver's vehicle.

In the aspect described above, the control device may be configured to, when the entry-restricted area approach condition for the parallel lane is satisfied within a period after the driver's vehicle starts to change the lane and starts to enter the parallel lane during the execution of the steering reaction force control and before entry of the driver's vehicle into the parallel lane is completed, set the steering reaction force to be applied to the steering operation in the direction of the lane change of the driver's vehicle to the value smaller than the reference value, and set the steering reaction force to be applied to the steering operation in a direction opposite to the direction of the lane change of the driver's vehicle to the value smaller than the reference value.

When the driver's vehicle approaches the entry-restricted area after the driver's vehicle starts to enter the parallel lane, it is preferable that the driver of the driver's vehicle decide whether to continue the lane change of the driver's vehicle or return the driver's vehicle to its original lane by stopping the lane change of the driver's vehicle. According to this aspect, when the driver's vehicle approaches the entry-restricted area after the driver's vehicle starts to enter the parallel lane, both the steering reaction force to be applied to the steering operation in the direction of the lane change of the driver's vehicle and the steering reaction force to be applied to the steering operation in the opposite direction are reduced. Therefore, the steering operation can easily be performed both when the driver decides to continue the lane change of the driver's vehicle and when the driver decides to return the driver's vehicle to its original lane by stopping the lane change of the driver's vehicle.

In the aspect described above, the control device may be configured such that, when the driver's vehicle starts to change the lane during the execution of the steering reaction force control, the steering operation in a direction opposite to the direction of the lane change of the driver's vehicle is performed during the lane change of the driver's vehicle, and entry of the driver's vehicle into the original lane is completed, a rate of increase in the steering reaction force to be applied to the steering operation in the direction opposite to the direction of the lane change of the driver's vehicle relative to an amount of the steering operation is set larger than the rate of increase before the entry of the driver's vehicle into the original lane is completed.

Accordingly, when the entry of the driver's vehicle into the original lane is completed, it is difficult to intensify the steering operation in the direction opposite to the direction of the lane change of the driver's vehicle. Therefore, it is easy to perform the steering operation for causing the driver's vehicle to travel along the original lane.

In the aspect described above, the control device may be configured to, when the entry-restricted area approach condition that has been temporarily satisfied for the parallel lane to which the driver's vehicle is expected to change the lane becomes unsatisfied in the lane change of the driver's vehicle during the execution of the steering reaction force control, set the steering reaction force to be applied to the steering operation in the direction of the lane change of the driver's vehicle to the value smaller than the reference value.

When the driver's vehicle continues to travel along the initial lane and passes by the entry-restricted area, the entry-restricted area approach condition becomes unsatisfied and the driver's vehicle does not enter the entry-restricted area although the driver's vehicle changes lanes. According to this aspect, when the entry-restricted area approach condition is temporarily satisfied and then becomes unsatisfied, the steering reaction force to be applied to the steering operation in the direction of the lane change of the driver's vehicle is reduced. Therefore, the steering operation for changing lanes of the driver's vehicle can easily be performed in a situation in which the driver's vehicle does not enter the entry-restricted area although the driver's vehicle changes lanes.

The constituent elements according to the present disclosure are not limited to those according to an embodiment of the present disclosure to be described later with reference to the drawings. Other objects, other features, and accompanying advantages of the present disclosure will easily be understood from the description of the embodiment of the present disclosure.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2A is a diagram showing a map to be used in normal steering reaction force control;

FIG. 2B is a diagram showing a map to be used in active steering reaction force control when the driver's vehicle is traveling straight ahead;

FIG. 2C is a diagram showing a map to be used in the active steering reaction force control when the driver's vehicle changes a lane to a right adjacent parallel lane;

FIG. 2D is a diagram showing a map to be used in the active steering reaction force control when the driver's vehicle changes the lane to a left adjacent parallel lane;

FIG. 2E is a diagram showing another map to be used in the active steering reaction force control when the driver's vehicle changes the lane to the right adjacent parallel lane;

FIG. 2F is a diagram showing another map to be used in the active steering reaction force control when the driver's vehicle changes the lane to the left adjacent parallel lane;

FIG. 3A is a diagram showing another map to be used in the active steering reaction force control when the driver's vehicle is traveling straight ahead;

FIG. 3B is a diagram showing still another map to be used in the active steering reaction force control when the driver's vehicle is traveling straight ahead;

FIG. 3C is a diagram showing still another map to be used in the active steering reaction force control when the driver's vehicle changes the lane to the right adjacent parallel lane;

FIG. 3D is a diagram showing still another map to be used in the active steering reaction force control when the driver's vehicle changes the lane to the left adjacent parallel lane;

FIG. 3E is a diagram showing still another map to be used in the active steering reaction force control when the driver's vehicle changes the lane to the right adjacent parallel lane;

FIG. 3F is a diagram showing still another map to be used in the active steering reaction force control when the driver's vehicle changes the lane to the left adjacent parallel lane;

FIG. 5A is a diagram showing a scene in which the driver's vehicle is traveling straight ahead when the normal steering reaction force control is being executed;

FIG. 5B is a diagram showing a scene in which the driver's vehicle is traveling straight ahead during execution of the active steering reaction force control;

FIG. 7A1 is a diagram showing a scene in which the driver's vehicle shown in FIG. 6D further advances and has entirely entered the right adjacent parallel lane during the execution of the active steering reaction force control;

FIG. 7A2 is a diagram showing a scene in which the driver's vehicle shown in FIG. 7A1 further advances and has completed changing the lanes during the execution of the active steering reaction force control;

FIG. 7B1 is a diagram showing a scene in which the driver's vehicle has returned to an initial lane during the execution of the active steering reaction force control;

FIG. 7B2 is a diagram showing a scene in which the driver's vehicle shown in FIG. 7B1 further advances and travels straight ahead during the execution of the active steering reaction force control;

FIG. 8A is a diagram showing a scene in which the driver's vehicle is traveling straight ahead and an entry-restricted area is present in the right adjacent parallel lane ahead of the driver's vehicle during the execution of the active steering reaction force control;

FIG. 8B is a diagram showing a scene in which the driver's vehicle shown in FIG. 8A continues to travel along the initial lane and approaches the entry-restricted area during the execution of the active steering reaction force control;

FIG. 9A is a diagram showing a scene in which the driver's vehicle shown in FIG. 8B starts to change lanes during the execution of the active steering reaction force control;

FIG. 9B is a diagram showing a scene in which the driver's vehicle shown in FIG. 9A further advances and its right front wheel has reached a position immediately short of the lane marking line during the execution of the active steering reaction force control;

FIG. 9C is a diagram showing a scene in which the driver's vehicle shown in FIG. 9B further advances and is traveling across the lane marking line during the execution of the active steering reaction force control;

FIG. 10A1 is a diagram showing a scene in which the driver's vehicle shown in FIG. 9C further advances and has entirely entered the right adjacent parallel lane during the execution of the active steering reaction force control;

FIG. 10A2 is a diagram showing a scene in which the driver's vehicle shown in FIG. 10A1 further advances and has completed changing the lanes during the execution of the active steering reaction force control;

FIG. 10B1 is a diagram showing a scene in which the driver's vehicle shown in FIG. 9C has returned to the initial lane during the execution of the active steering reaction force control;

FIG. 10B2 is a diagram showing a scene in which the driver's vehicle shown in FIG. 10B1 further advances and travels straight ahead during the execution of the active steering reaction force control;

FIG. 11A is a diagram showing a scene in which the driver's vehicle is traveling straight ahead during the execution of the active steering reaction force control;

FIG. 11B is a diagram showing a scene in which the driver's vehicle shown in FIG. 11A starts to change lanes during the execution of the active steering reaction force control;

FIG. 11C is a diagram showing a scene before the driver's vehicle shown in FIG. 11B further advances and its right front wheel reaches a position immediately short of the lane marking line during the execution of the active steering reaction force control;

FIG. 11D is a diagram showing a scene in which the driver's vehicle shown in FIG. 11C further advances and its right front wheel has reached the position immediately short of the lane marking line during the execution of the active steering reaction force control;

FIG. 13A1 is a diagram showing a scene in which the driver's vehicle shown in FIG. 12 further advances and has entirely entered the right adjacent parallel lane during the execution of the active steering reaction force control;

FIG. 13A2 is a diagram showing a scene in which the driver's vehicle shown in FIG. 13A1 further advances and has completed changing the lanes during the execution of the active steering reaction force control;

FIG. 13B1 is a diagram showing a scene in which the driver's vehicle shown in FIG. 12 has returned to the initial lane during the execution of the active steering reaction force control;

FIG. 13B2 is a diagram showing a scene in which the driver's vehicle shown in FIG. 13B1 further advances and travels straight ahead during the execution of the active steering reaction force control;

FIG. 14A is a diagram showing a scene in which the driver's vehicle is traveling straight ahead during the execution of the active steering reaction force control;

FIG. 14B is a diagram showing a scene in which the driver's vehicle shown in FIG. 14A starts to change lanes during the execution of the active steering reaction force control;

FIG. 14C is a diagram showing a scene in which the driver's vehicle shown in FIG. 14B further advances and its right front wheel has reached a position immediately short of the lane marking line during the execution of the active steering reaction force control;

FIG. 14D is a diagram showing a scene in which the driver's vehicle shown in FIG. 14C further advances and is traveling across the lane marking line during the execution of the active steering reaction force control;

FIG. 15A1 is a diagram showing a scene in which the driver's vehicle shown in FIG. 14D further advances and has entirely entered the right adjacent parallel lane during the execution of the active steering reaction force control;

FIG. 15A2 is a diagram showing a scene in which the driver's vehicle shown in FIG. 15A1 further advances and has completed changing the lanes during the execution of the active steering reaction force control;

FIG. 15B1 is a diagram showing a scene in which the driver's vehicle shown in FIG. 14D has returned to the initial lane during the execution of the active steering reaction force control;

FIG. 15B2 is a diagram showing a scene in which the driver's vehicle shown in FIG. 15B1 further advances and travels straight ahead during the execution of the active steering reaction force control;

DETAILED DESCRIPTION OF EMBODIMENTS

Figure 1:
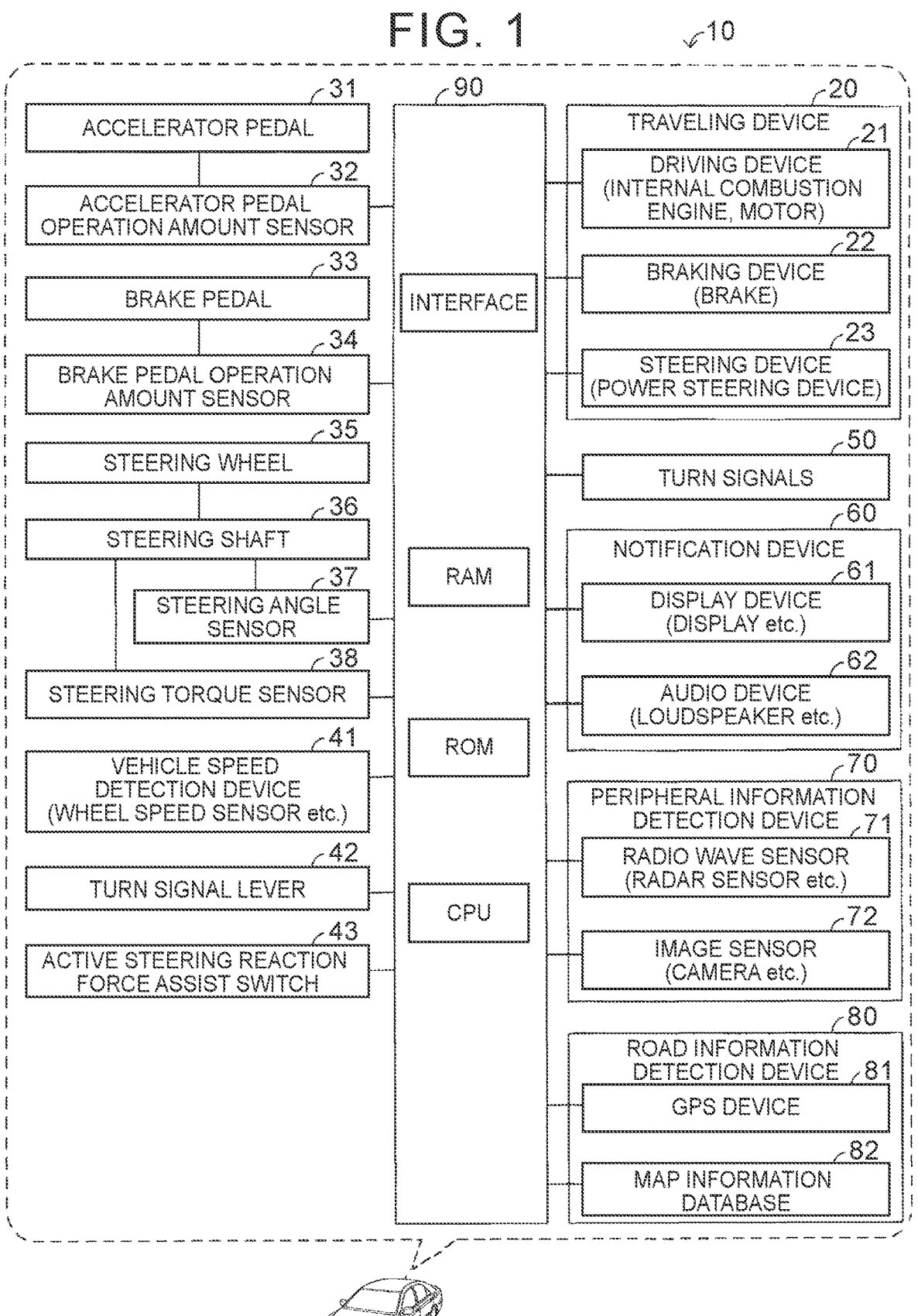
FIG. 1 is a diagram showing a vehicle control device according to an embodiment of the present disclosure and a vehicle (driver's vehicle) including the vehicle control device.

A vehicle control device according to an embodiment of the present disclosure will be described below with reference to the drawings. As shown in FIG. 1, a vehicle control device 10 according to the embodiment of the present disclosure is mounted on a driver's vehicle 100. In the following description, a driver of the driver's vehicle 100 is referred to simply as "driver".

ECU

The vehicle control device 10 includes an ECU 90. The term "ECU" is an abbreviation of "electronic control unit". The ECU 90 includes a microcomputer as a main component. The microcomputer includes a central processing unit (CPU), a read only memory (ROM), a random access memory (RAM), a non-volatile memory, and an interface. The CPU executes instructions, programs, or routines stored in the ROM to implement various functions.

Traveling Device

The driver's vehicle 100 includes a traveling device 20. The traveling device 20 includes a driving device 21, a braking device 22, and a steering device 23.

Driving Device

The driving device 21 outputs a driving torque (driving force) to be applied to the driver's vehicle 100 to cause the driver's vehicle 100 to travel, and is typified by an internal combustion engine or a motor. The driving device 21 is electrically connected to the ECU 90. The ECU 90 can control the driving torque to be output from the driving device 21 by controlling operation of the driving device 21.

Braking Device

The braking device 22 outputs a braking torque (braking force) to be applied to the driver's vehicle 100 to brake the driver's vehicle 100, and is typified by a brake. The braking device 22 is electrically connected to the ECU 90. The ECU 90 can control the braking torque to be output from the braking device 22 by controlling operation of the braking device 22.

Steering Device

The steering device 23 outputs a steering torque (steering force) to be applied to the driver's vehicle 100 to steer the driver's vehicle 100, and is typified by a power steering device. The steering device 23 is electrically connected to the ECU 90. The ECU 90 can control the steering torque and a steering reaction force described later to be output from the steering device 23 by controlling operation of the steering device 23.

Sensors and Other Devices

The driver's vehicle 100 further includes an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle speed detection device 41, a turn signal lever 42, an active steering reaction force assist switch 43, turn signals 50, a notification device 60, a peripheral information detection device 70, and a road information detection device 80.

Accelerator Pedal Operation Amount Sensor

The accelerator pedal operation amount sensor 32 detects an operation amount of the accelerator pedal 31, and is electrically connected to the ECU 90. The accelerator pedal operation amount sensor 32 transmits information on the detected operation amount of the accelerator pedal 31 to the ECU 90. The ECU 90 acquires the operation amount of the accelerator pedal 31 as an accelerator pedal operation amount AP based on the information. The ECU 90 acquires a requested driving torque (requested driving force) based on the accelerator pedal operation amount AP and a traveling speed of the driver's vehicle 100, and controls the operation of the driving device 21 to apply a driving torque corresponding to the requested driving torque from the driving device 21 to the driver's vehicle 100 (in particular, driving wheels of the driver's vehicle 100).

Brake Pedal Operation Amount Sensor

The brake pedal operation amount sensor 34 detects an operation amount of the brake pedal 33, and is electrically connected to the ECU 90. The brake pedal operation amount sensor 34 transmits information on the detected operation amount of the brake pedal 33 to the ECU 90. The ECU 90 acquires the operation amount of the brake pedal 33 as a brake pedal operation amount BP based on the information.

The ECU 90 acquires a requested braking torque (requested braking force) based on the brake pedal operation amount BP, and controls the operation of the braking device 22 to apply a braking torque corresponding to the requested braking torque from the braking device 22 to the driver's vehicle 100 (in particular, the wheels of the driver's vehicle 100).

Steering Angle Sensor

The steering angle sensor 37 detects a rotation angle of the steering shaft 36 with respect to a neutral position, and is electrically connected to the ECU 90. The steering angle sensor 37 transmits information on the detected rotation angle of the steering shaft 36 to the ECU 90. The ECU 90 acquires the rotation angle of the steering shaft 36 as a steering angle θ based on the information.

Steering Torque Sensor

The steering torque sensor 38 detects a torque input to the steering shaft 36 by the driver via the steering wheel 35, and is electrically connected to the ECU 90. The steering torque sensor 38 transmits information on the detected torque to the ECU 90. The ECU 90 acquires the torque input to the steering shaft 36 by the driver via the steering wheel as a driver input torque based on the information.

The ECU 90 acquires a requested steering torque based on the steering angle θ, the driver input torque, and the traveling speed of the driver's vehicle 100, and controls the operation of the steering device 23 to apply a steering torque corresponding to the requested steering torque from the steering device 23 to the driver's vehicle 100 (in particular, steered wheels of the driver's vehicle 100) and apply a reaction force corresponding to a target steering reaction force RFtgt set as described later to the steering wheel 35 (driver's steering wheel operation). In the present example, the steering device 23 therefore includes a reaction device configured to apply the steering reaction force to the steering wheel operation (steering operation) performed on the driver's vehicle 100 by the driver.

Vehicle Speed Detection Device

The vehicle speed detection device 41 detects a traveling speed of the driver's vehicle 100, and is typified by a wheel speed sensor. The vehicle speed detection device 41 is electrically connected to the ECU 90. The vehicle speed detection device 41 transmits information on the detected traveling speed of the driver's vehicle 100 to the ECU 90. The ECU 90 acquires the traveling speed of the driver's vehicle 100 as a driver's vehicle speed V100 based on the information.

The turn signal lever 42 is operated by the driver to operate the turn signals 50, and is electrically connected to the ECU 90. When the turn signal lever 42 is operated from a neutral position to a right turning position, the ECU 90 operates (blinks) the turn signals 50 provided at the right front corner and the right rear corner of the driver's vehicle 100. When the turn signal lever 42 is operated from the neutral position to a left turning position, the ECU 90 operates (blinks) the turn signals 50 provided at the left front corner and the left rear corner of the driver's vehicle 100.

Active Steering Reaction Force Assist Switch

The active steering reaction force assist switch 43 is operated by the driver to request execution of active steering reaction force control described later, and is electrically connected to the ECU 90. The ECU 90 determines that the execution of the active steering reaction force control is requested when the active steering reaction force assist switch 43 is operated and set to an ON position.

Notification Device

The notification device 60 provides various notifications to the driver, and includes a display device 61 and an audio device 62 in the present example. The display device 61 is, for example, a display that displays various images. The audio device 62 is, for example, a loudspeaker that outputs various sounds.

Display Device

The display device 61 is electrically connected to the ECU 90. The ECU 90 can display various images on the display device 61.

Audio Device

The audio device 62 is electrically connected to the ECU 90. The ECU 90 can output various sounds from the audio device 62.

Peripheral Information Detection Device

The peripheral information detection device 70 detects information around the driver's vehicle 100, and includes a radio wave sensor 71 and an image sensor 72 in the present example. Examples of the radio wave sensor 71 include a radar sensor (such as a millimeter wave radar). Examples of the image sensor 72 include a camera. The peripheral information detection device 70 may include an acoustic wave sensor such as an ultrasonic sensor (clearance sonar) or an optical sensor such as a laser radar (light detection and ranging (LiDAR)).

Radio Wave Sensor

The radio wave sensor 71 is electrically connected to the ECU 90. The radio wave sensor 71 emits a radio wave, and receives the radio wave reflected by an object (reflected wave). The radio wave sensor 71 transmits information (detection result) related to the emitted radio wave and the received radio wave (reflected wave) to the ECU 90. In other words, the radio wave sensor 71 detects an object present around the driver's vehicle 100, and transmits information (detection result) related to the detected object to the ECU 90. The ECU 90 can acquire information related to the object present around the driver's vehicle 100 as peripheral detection information IS based on the information (radio wave information). In the present example, the object is a vehicle, a motorcycle, a bicycle, a person, or the like.

Image Sensor

The image sensor 72 is electrically connected to the ECU 90. The image sensor 72 captures an image of an area around the driver's vehicle 100, and transmits information related to the captured image to the ECU 90. The ECU 90 acquires information related to the periphery of the driver's vehicle 100 as the peripheral detection information IS based on the information (camera image information).

Road Information Detection Device

The road information detection device 80 includes a global positioning system (GPS) device 81 and a map information database 82.

GPS Device

The GPS device 81 receives a so-called GPS signal, and is electrically connected to the ECU 90. The ECU 90 acquires the GPS signal via the GPS device 81. The ECU 90 can acquire a current position P100 of the driver's vehicle 100 based on the acquired GPS signal.

Map Information Database

The map information database 82 stores map information including, for example, information related to roads, and is electrically connected to the ECU 90. The ECU 90 acquires information related to, for example, a road where the driver's vehicle 100 is currently traveling as road information IR based on the current position P100 of the driver's vehicle 100.

Outline of Operation of Vehicle Control Device

Next, an outline of operation of the vehicle control device 10 will be described. The vehicle control device 10 executes steering reaction force control for controlling a reaction force (steering reaction force) to be applied to the steering wheel 35 or its operation (steering wheel operation or steering operation) by the driver.

The steering reaction force is applied to the steering wheel 35 as a force for rotating the steering wheel 35 counterclockwise (leftward) when the driver applies, to the steering wheel 35, a force for rotating the steering wheel 35 clockwise (rightward), and is applied to the steering wheel 35 as a force for rotating the steering wheel 35 clockwise (rightward) when the driver applies, to the steering wheel 35, a force for rotating the steering wheel 35 counterclockwise (leftward).

When the execution of the active steering reaction force control is not requested, the vehicle control device 10 executes normal steering reaction force control as the steering reaction force control. When the execution of the active steering reaction force control is requested, the vehicle control device 10 executes the active steering reaction force control as the steering reaction force control.

Maps

The vehicle control device 10 stores various maps or lookup tables shown in FIGS. 2A to 4C as maps or lookup tables to be used for acquiring (setting) a target value of the steering reaction force (target steering reaction force RFtgt) by using the steering angle θ as an argument during the execution of the steering reaction force control.

FIG. 2A

The map shown in FIG. 2A (normal assist map) is used when executing the normal steering reaction force control. According to this normal assist map, the target steering reaction force RFtgt based on the steering angle θ is acquired in accordance with a characteristic defined by a line LR1 or a line LL1.

In the maps shown in FIG. 2A and other figures, the horizontal axis represents the steering angle θ, and the vertical axis represents the target steering reaction force RFtgt. When the steering angle θ is a value on the right side of the vertical axis, the steering angle θ is a steering angle when the steering wheel 35 is rotated rightward (clockwise) from the neutral position. When the steering angle θ is a value on the left side of the vertical axis, the steering angle θ is a steering angle when the steering wheel 35 is rotated leftward (counterclockwise) from the neutral position. When the steering angle θ is a value at the intersection between the vertical axis and the horizontal axis, the steering angle θ is a steering angle θ when the steering wheel 35 is in the neutral position. In the present example, this steering angle θ is zero.

In the maps shown in FIG. 2A and other figures, the line on the right side of the vertical axis shows a relationship between the steering angle θ and the target steering reaction force RFtgt when the steering wheel 35 is rotated rightward. The line on the left side of the vertical axis shows a relationship between the steering angle θ and the target steering reaction force RFtgt when the steering wheel 35 is rotated leftward.

Accordingly, in the map shown in FIG. 2A, the line LR1 is a line (normal steering reaction force line) that defines the relationship between the steering angle θ and the target steering reaction force RFtgt when the steering wheel is operated rightward. The target steering reaction force RFtgt acquired from the normal steering reaction force line LR1 increases as the steering angle θ increases.

In the map shown in FIG. 2A, the line LL1 is a line (normal steering reaction force line) that defines the relationship between the steering angle θ and the target steering reaction force RFtgt when the steering wheel is operated leftward. The target steering reaction force RFtgt acquired from the normal steering reaction force line LL1 increases as the steering angle θ increases.

In the present example, the normal steering reaction force line LR1 and the normal steering reaction force line LL1 are line symmetric across the vertical axis, but need not have such a relationship.

FIG. 2B

The map shown in FIG. 2B is used when executing the active steering reaction force control. According to this map, the target steering reaction force RFtgt based on the steering angle θ is acquired in accordance with characteristics defined by a line LR2 and a line LL2.

In the map shown in FIG. 2B, the line LR2 is a line that defines the relationship between the steering angle θ and the target steering reaction force RFtgt when the steering wheel is operated rightward. The target steering reaction force RFtgt acquired from the line LR2 increases as the steering angle θ increases. Comparing the steering reaction forces acquired at the same steering angle θ, the target steering reaction force RFtgt acquired from the line LR2 is larger than the target steering reaction force RFtgt acquired from the normal steering reaction force line LR1.

In the map shown in FIG. 2B, the line LL2 is a line that defines the relationship between the steering angle θ and the target steering reaction force RFtgt when the steering wheel is operated leftward. The target steering reaction force RFtgt acquired from the line LL2 increases as the steering angle θ increases. Comparing the steering reaction forces acquired at the same steering angle θ, the target steering reaction force RFtgt acquired from the line LL2 is larger than the target steering reaction force RFtgt acquired from the normal steering reaction force line LL1.

In the present example, the line LR2 and the line LL2 are line symmetric across the vertical axis, but need not have such a relationship.

FIG. 2C

The map shown in FIG. 2C is also used when executing the active steering reaction force control. According to this map, the target steering reaction force RFtgt based on the steering angle θ is acquired in accordance with characteristics defined by a line LR3 and a line LL2.

In the map shown in FIG. 2C, the line LR3 is a line that defines the relationship between the steering angle θ and the target steering reaction force RFtgt when the steering wheel is operated rightward. The target steering reaction force RFtgt acquired from the line LR3 increases as the steering angle θ increases. Comparing the steering reaction forces acquired at the same steering angle θ, the target steering reaction force RFtgt acquired from the line LR3 is smaller than the target steering reaction force RFtgt acquired from the normal steering reaction force line LR1.

In the map shown in FIG. 2C, the line LL2 is the same as the line LL2 shown in FIG. 2B.

FIG. 2D

The map shown in FIG. 2D is also used when executing the active steering reaction force control. According to this map, the target steering reaction force RFtgt based on the steering angle θ is acquired in accordance with characteristics defined by a line LR2 and a line LL3.

In the map shown in FIG. 2D, the line LL3 is a line that defines the relationship between the steering angle θ and the target steering reaction force RFtgt when the steering wheel is operated leftward. The target steering reaction force RFtgt acquired from the line LL3 increases as the steering angle θ increases. Comparing the steering reaction forces acquired at the same steering angle θ, the target steering reaction force RFtgt acquired from the line LL3 is smaller than the target steering reaction force RFtgt acquired from the normal steering reaction force line LL1.

In the map shown in FIG. 2D, the line LR2 is the same as the line LR2 shown in FIG. 2B.

In the present example, the line LR3 shown in FIG. 2C and the line LL3 shown in FIG. 2D are line symmetric across the vertical axis, but need not have such a relationship.

FIG. 2E

The map shown in FIG. 2E is also used when executing the active steering reaction force control. According to this map, the target steering reaction force RFtgt based on the steering angle θ is acquired in accordance with characteristics defined by a line LR4 and a line LL2.

In the map shown in FIG. 2E, the line LR4 is a line that defines the relationship between the steering angle θ and the target steering reaction force RFtgt when the steering wheel is operated rightward. The target steering reaction force RFtgt acquired from the line LR4 increases as the steering angle θ increases. Comparing the steering reaction forces acquired at the same steering angle θ, the target steering reaction force RFtgt acquired from the line LR4 is smaller than the target steering reaction force RFtgt acquired from the normal steering reaction force line LR1 in a range of the steering angle θ from zero to a certain value. The target steering reaction force RFtgt acquired from the line LR4 is larger than the target steering reaction force RFtgt acquired from the normal steering reaction force line LR1 in a range of the steering angle θ equal to or larger than the certain value. The rate of increase in the target steering reaction force RFtgt relative to an increase in the steering angle θ is higher when the steering angle θ is equal to or larger than the certain value than when the steering angle θ is smaller than the certain value.

In the map shown in FIG. 2E, the line LL2 is the same as the line LL2 shown in FIG. 2B.

FIG. 2F

The map shown in FIG. 2F is also used when executing the active steering reaction force control. According to this map, the target steering reaction force RFtgt based on the steering angle θ is acquired in accordance with characteristics defined by a line LR2 and a line LL4.

In the map shown in FIG. 2F, the line LL4 is a line that defines the relationship between the steering angle θ and the target steering reaction force RFtgt when the steering wheel is operated leftward. The target steering reaction force RFtgt acquired from the line LL4 increases as the steering angle θ increases. Comparing the steering reaction forces acquired at the same steering angle θ, the target steering reaction force RFtgt acquired from the line LL4 is smaller than the target steering reaction force RFtgt acquired from the normal steering reaction force line LL1 in a range of the steering angle θ from zero to a certain value. The target steering reaction force RFtgt acquired from the line LL4 is larger than the target steering reaction force RFtgt acquired from the normal steering reaction force line LL1 in a range of the steering angle θ equal to or larger than the certain value. The rate of increase in the target steering reaction force RFtgt relative to an increase in the steering angle θ is higher when the steering angle θ is equal to or larger than the certain value than when the steering angle θ is smaller than the certain value.

In the map shown in FIG. 2F, the line LR2 is the same as the line LR2 shown in FIG. 2B.

In the present example, the line LR4 shown in FIG. 2E and the line LL4 shown in FIG. 2F are line symmetric across the vertical axis, but need not have such a relationship.

FIG. 3A

The map shown in FIG. 3A is used when executing the active steering reaction force control. According to this map, the target steering reaction force RFtgt based on the steering angle θ is acquired in accordance with characteristics defined by a line LR5 and a line LL5.

In the map shown in FIG. 3A, the line LR5 is a line that defines the relationship between the steering angle θ and the target steering reaction force RFtgt when the steering wheel is operated rightward. The target steering reaction force RFtgt acquired from the line LR5 increases as the steering angle θ increases. Comparing the steering reaction forces acquired at the same steering angle θ, the target steering reaction force RFtgt acquired from the line LR5 is larger than the target steering reaction force RFtgt acquired from the normal steering reaction force line LR1 and larger than the target steering reaction force RFtgt acquired from the line LR2.

In the map shown in FIG. 3A, the line LL5 is a line that defines the relationship between the steering angle θ and the target steering reaction force RFtgt when the steering wheel is operated leftward. The target steering reaction force RFtgt acquired from the line LL5 increases as the steering angle θ increases. Comparing the steering reaction forces acquired at the same steering angle θ, the target steering reaction force RFtgt acquired from the line LL5 is larger than the target steering reaction force RFtgt acquired from the normal steering reaction force line LL1 and larger than the target steering reaction force RFtgt acquired from the line LL2.

FIG. 3B

The map shown in FIG. 3B is also used when executing the active steering reaction force control. According to this map, the target steering reaction force RFtgt based on the steering angle θ is acquired in accordance with characteristics defined by a line LR6 and a line LL6.

In the map shown in FIG. 3B, the line LR6 is a line that defines the relationship between the steering angle θ and the target steering reaction force RFtgt when the steering wheel is operated rightward. The target steering reaction force RFtgt acquired from the line LR6 increases as the steering angle θ increases. Comparing the steering reaction forces acquired at the same steering angle θ, the target steering reaction force RFtgt acquired from the line LR6 is larger than the target steering reaction force RFtgt acquired from the line LR5.

In the map shown in FIG. 3B, the line LL6 is a line that defines the relationship between the steering angle θ and the target steering reaction force RFtgt when the steering wheel is operated leftward. The target steering reaction force RFtgt acquired from the line LL6 increases as the steering angle θ increases. Comparing the steering reaction forces acquired at the same steering angle θ, the target steering reaction force RFtgt acquired from the line LL6 is larger than the target steering reaction force RFtgt acquired from the line LL5.

FIG. 3C

The map shown in FIG. 3C is also used when executing the active steering reaction force control. According to this map, the target steering reaction force RFtgt based on the steering angle θ is acquired in accordance with characteristics defined by a line LR7 and a line LL6.

In the map shown in FIG. 3C, the line LR7 is a line that defines the relationship between the steering angle θ and the target steering reaction force RFtgt when the steering wheel is operated rightward. The target steering reaction force RFtgt acquired from the line LR7 increases as the steering angle θ increases. Comparing the steering reaction forces acquired at the same steering angle θ, the target steering reaction force RFtgt acquired from the line LR7 is larger than the target steering reaction force RFtgt acquired from the line LR5. The rate of increase in the target steering reaction force RFtgt relative to an increase in the steering angle θ is higher when the steering angle θ is equal to or larger than a certain value than when the steering angle θ is smaller than the certain value.

At least when the steering angle θ is equal to or larger than the certain value, the target steering reaction force RFtgt acquired from the line LR7 is larger than the target steering reaction force RFtgt acquired from the line LR6 and the rate of increase relative to the increase in the steering angle θ is higher.

In the map shown in FIG. 3C, the line LL6 is the same as the line LL6 shown in FIG. 3B.

FIG. 3D

The map shown in FIG. 3D is also used when executing the active steering reaction force control. According to this map, the target steering reaction force RFtgt based on the steering angle θ is acquired in accordance with characteristics defined by a line LR6 and a line LL7.

In the map shown in FIG. 3D, the line LL7 is a line that defines the relationship between the steering angle θ and the target steering reaction force RFtgt when the steering wheel is operated leftward. The target steering reaction force RFtgt acquired from the line LL7 increases as the steering angle θ increases. Comparing the steering reaction forces acquired at the same steering angle θ, the target steering reaction force RFtgt acquired from the line LL7 is larger than the target steering reaction force RFtgt acquired from the line LL5. The rate of increase in the target steering reaction force RFtgt relative to an increase in the steering angle θ is higher when the steering angle θ is equal to or larger than a certain value than when the steering angle θ is smaller than the certain value.

At least when the steering angle θ is equal to or larger than the certain value, the target steering reaction force RFtgt acquired from the line LL7 is larger than the target steering reaction force RFtgt acquired from the line LL6 and the rate of increase relative to the increase in the steering angle θ is higher.

In the map shown in FIG. 3D, the line LR6 is the same as the line LR6 shown in FIG. 3B.

In the present example, the line LR7 shown in FIG. 3C and the line LL7 shown in FIG. 3D are line symmetric across the vertical axis, but need not have such a relationship.

FIG. 3E

The map shown in FIG. 3E is also used when executing the active steering reaction force control. According to this map, the target steering reaction force RFtgt based on the steering angle θ is acquired in accordance with characteristics defined by a line LR4 and a line LL3. The line LR4 is the same as the line LR4 shown in FIG. 2E, and the line LL3 is the same as the line LL3 shown in FIG. 2D.

FIG. 3F

The map shown in FIG. 3F is also used when executing the active steering reaction force control. According to this map, the target steering reaction force RFtgt based on the steering angle θ is acquired in accordance with characteristics defined by a line LR3 and a line LL4. The line LL4 is the same as the line LL4 shown in FIG. 2F. The line LR3 is the same as the line LR3 shown in FIG. 2C.

FIG. 4A

Figure 4A:
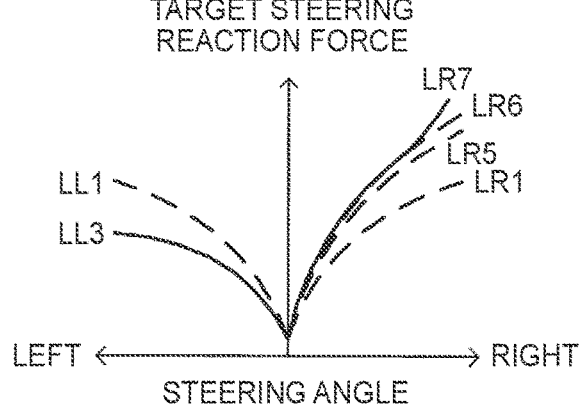
FIG. 4A is a diagram showing still another map to be used in the active steering reaction force control when the driver's vehicle changes the lane to the right adjacent parallel lane.

The map shown in FIG. 4A is also used when executing the active steering reaction force control. According to this map, the target steering reaction force RFtgt based on the steering angle θ is acquired in accordance with characteristics defined by a line LR7 and a line LL3. In the map shown in FIG. 4A, the line LR7 is the same as the line LR7 shown in FIG. 3C. The line LL3 is the same as the line LL3 shown in FIG. 2D.

FIG. 4B

Figure 4B:
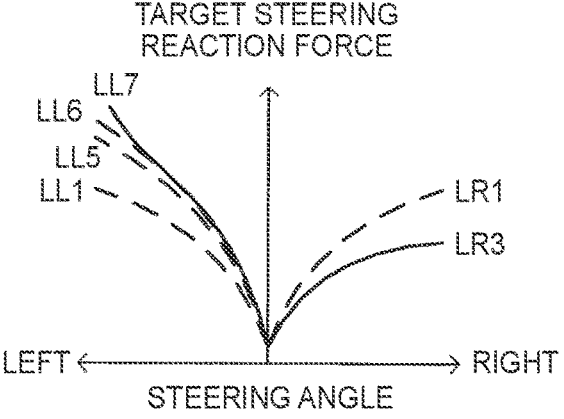
FIG. 4B is a diagram showing still another map to be used in the active steering reaction force control when the driver's vehicle changes the lane to the left adjacent parallel lane.

The map shown in FIG. 4B is also used when executing the active steering reaction force control. According to this map, the target steering reaction force RFtgt based on the steering angle θ is acquired in accordance with characteristics defined by a line LR3 and a line LL7. In the map shown in FIG. 4B, the line LL7 is the same as the line LL7 shown in FIG. 3D. The line LR3 is the same as the line LR3 shown in FIG. 2C.

FIG. 4C

Figure 4C:
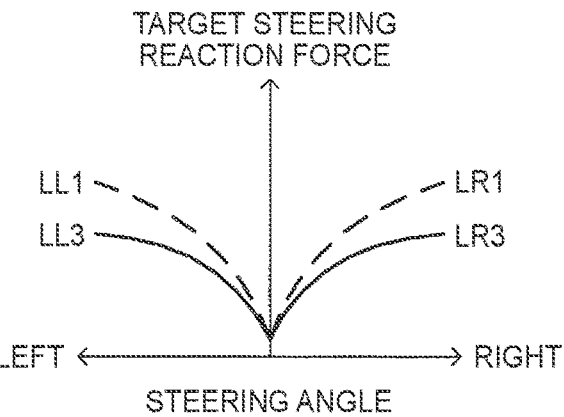
FIG. 4C is a diagram showing still another map to be used in the active steering reaction force control when the driver's vehicle changes the lane to the right adjacent parallel lane or the left adjacent parallel lane.

The map shown in FIG. 4C is also used when executing the active steering reaction force control. According to this map, the target steering reaction force RFtgt based on the steering angle θ is acquired in accordance with characteristics defined by a line LR3 and a line LL3. In the map shown in FIG. 4C, the line LR3 is the same as the line LR3 shown in FIG. 2C. The line LL3 is the same as the line LL3 shown in FIG. 2D.

Normal Steering Reaction Force Control

As described above, when the execution of the active steering reaction force control is not requested, the vehicle control device 10 executes the normal steering reaction force control as the steering reaction force control.

In the normal steering reaction force control, the target steering reaction force RFtgt is set based on the steering angle θ (amount of the steering operation), and a steering reaction force corresponding to the target steering reaction force RFtgt (normal steering reaction force) is applied to the steering wheel 35 (steering wheel operation). In the present example, the normal steering reaction force control is control for setting the target steering reaction force RFtgt by using the normal assist map shown in FIG. 2A and applying a steering reaction force corresponding to the target steering reaction force RFtgt (normal steering reaction force) to the steering wheel 35.

FIG. 5A

During the execution of the normal steering reaction force control, as shown in FIG. 5A, the vehicle control device 10 acquires (sets) the target steering reaction force RFtgt by applying the steering angle θ to the normal assist map shown in FIG. 2A, and controls the operation of the steering device 23 to apply a steering reaction force corresponding to the target steering reaction force RFtgt (normal steering reaction force) from the steering device 23 to the steering wheel 35.

Accordingly, a larger steering reaction force (normal steering reaction force) is applied to the steering wheel 35 as the steering angle θ increases.

Instead of acquiring (setting) the target steering reaction force RFtgt by using the map shown in FIG. 2A or other figures, the vehicle control device 10 may acquire (set) the target steering reaction force RFtgt by calculation using an arithmetic expression that defines the relationship between the steering angle θ and the target steering reaction force RFtgt. In this case, the vehicle control device 10 acquires (sets) the target steering reaction force RFtgt by calculation by applying the steering angle θ to the arithmetic expression.

Active Steering Reaction Force Control

When executing the active steering reaction force control, the vehicle control device 10 executes the active steering reaction force control as the steering reaction force control. When neither an entry-restricted area detection condition nor an entry-restricted area approach condition is satisfied, the vehicle control device 10 executes first active steering reaction force control as the active steering reaction force control. When the entry-restricted area detection condition or the entry-restricted area approach condition is satisfied, the vehicle control device 10 executes second active steering reaction force control as the active steering reaction force control.

The entry-restricted area detection condition is satisfied when the driver's vehicle 100 is traveling along an initial lane, an entry-restricted area 200 where entry of the driver's vehicle 100 is restricted is present in an adjacent parallel lane ahead of the driver's vehicle 100, and the distance between the entry-restricted area 200 and the driver's vehicle 100 is longer than a first distance and equal to or shorter than a second distance (that is, the detected entry-restricted area 200 is relatively far from the driver's vehicle 100). Otherwise, the condition is not satisfied.

The entry-restricted area approach condition is satisfied when the entry-restricted area 200 where the entry of the driver's vehicle 100 is restricted is present in the adjacent parallel lane ahead of the driver's vehicle 100 and the distance between the entry-restricted area 200 and the driver's vehicle 100 is equal to or shorter than the first distance (that is, the detected entry-restricted area 200 is relatively close to the driver's vehicle 100). Otherwise, the condition is not satisfied.

As described above, the entry-restricted area 200 is the area where the entry of the driver's vehicle 100 is restricted. For example, the entry-restricted area 200 is an area in a designated traffic lane or a priority traffic lane, a construction area or an area where the traffic is regulated due to an accident, or an area beyond an end point of a passing lane or a climbing lane. When a so-called car navigation system is providing guidance on a route to a destination, a lane or the like different from a lane designated in that route may be set as the entry-restricted area 200.

First Active Steering Reaction Force Control

In the first active steering reaction force control, the target steering reaction force RFtgt is set based on the steering angle θ, and a steering reaction force corresponding to the target steering reaction force RFtgt is applied to the steering wheel 35. In the present example, the first active steering reaction force control is control for setting the target steering reaction force RFtgt by using the map shown in FIG. 2B and applying a steering reaction force corresponding to the target steering reaction force RFtgt to the steering wheel 35.

FIG. 5B

When the driver's vehicle 100 is traveling straight ahead as shown in FIG. 5B during the execution of the first active steering reaction force control, the vehicle control device 10 acquires (sets) the target steering reaction force RFtgt by applying the steering angle θ to the map shown in FIG. 2B, and controls the operation of the steering device 23 to apply a steering reaction force corresponding to the target steering reaction force RFtgt from the steering device 23 to the steering wheel 35.

Accordingly, a larger steering reaction force is applied to the steering wheel as the steering angle θ increases. Comparing the steering reaction forces at the same steering angle θ, this steering reaction force is larger than the steering reaction force applied by the normal steering reaction force control (normal steering reaction force or reaction force of reference value).

That is, when the active steering reaction force control is being executed and a lane change start condition is not satisfied, the vehicle control device 10 increases the steering reaction force compared to the case where the active steering reaction force control is not executed (that is, the normal steering reaction force control is being executed).

Accordingly, it is difficult for the driver to increase the amount of steering wheel operation compared to the case where the normal steering reaction force control is being executed. Thus, it is easier to keep the amount of steering wheel operation near zero, thereby easily holding the rotational position of the steering wheel 35 for causing the driver's vehicle 100 to travel straight ahead.

The lane change start condition is satisfied when the driver starts a steering wheel operation for changing lanes of the driver's vehicle 100 (lane change steering wheel operation). After the lane change start condition has been satisfied, the lane change start condition becomes unsatisfied when the lane change of the driver's vehicle 100 is completed or stopped.

In the present example, when the turn signals 50 are operated, an adjacent parallel lane is present in the turning direction of the driver's vehicle 100 indicated by the turn signals 50, and the steering wheel 35 is rotated in the turning direction of the driver's vehicle 100 indicated by the turn signals 50, the vehicle control device 10 determines that the driver has started the lane change steering wheel operation, that is, determines that the lane change start condition is satisfied. Otherwise, the vehicle control device 10 determines that the lane change start condition is not satisfied.

The adjacent parallel lane adjoins the initial lane (lane where the driver's vehicle 100 is currently traveling), and the traveling direction of vehicles in the adjacent parallel lane is the same as the traveling direction of the driver's vehicle 100 in the initial lane. In the following description, a right adjacent parallel lane is an adjacent parallel lane that adjoins the initial lane on its right side. A left adjacent parallel lane is an adjacent parallel lane that adjoins the initial lane on its left side.

Whether the adjacent parallel lane is present in the turning direction of the driver's vehicle 100 indicated by the turn signals 50 is determined based on the peripheral detection information IS and/or the road information IR.

After the lane change start condition has been satisfied and the driver's vehicle 100 has entirely entered the adjacent parallel lane, the steering angle θ decreases to a relatively small value in a predetermined range. When this state continues for a predetermined period, the vehicle control device 10 determines that the lane change of the driver's vehicle 100 has been completed.

When the lane change of the driver's vehicle 100 is not completed, the driver's vehicle 100 is traveling in the initial lane, and the steering angle θ is a relatively small value in the predetermined range continuously for the predetermined period after a predetermined time has elapsed since the lane change start condition was satisfied, the vehicle control device 10 determines that the lane change of the driver's vehicle 100 has been stopped.

Scenes in which the driver changes lanes of the driver's vehicle 100 include not only scenes described below but also a scene in which the driver's vehicle 100 enters a main lane of an expressway from a gently curved road leading to the main lane of the expressway, and a scene in which the driver's vehicle 100 enters a right turning lane from the initial lane. The vehicle control device 10 can also be applied to such scenes.

Second Active Steering Reaction Force Control

In the second active steering reaction force control, a target value of the steering reaction force (target steering reaction force RFtgt) is set based on the steering angle θ, and a steering reaction force corresponding to the target steering reaction force RFtgt is applied to the steering wheel 35. In the present example, the second active steering reaction force control is control for applying, to the steering wheel 35, a steering reaction force corresponding to the target steering reaction force RFtgt set in the following manner depending on whether the entry-restricted area detection condition is satisfied and whether the entry-restricted area approach condition is satisfied.

Whether the entry-restricted area detection condition is satisfied and whether the entry-restricted area approach condition is satisfied is determined based on the peripheral detection information IS.

Scene 1

First, description will be given of operations of the vehicle control device in a scene in which neither the entry-restricted area detection condition nor the entry-restricted area approach condition is satisfied while the driver's vehicle 100 is traveling straight ahead and the entry-restricted area approach condition is not satisfied while the driver's vehicle 100 is changing the lane to the adjacent parallel lane.

FIG. 6A

Figures 6A, 6B, 6C, 6D:
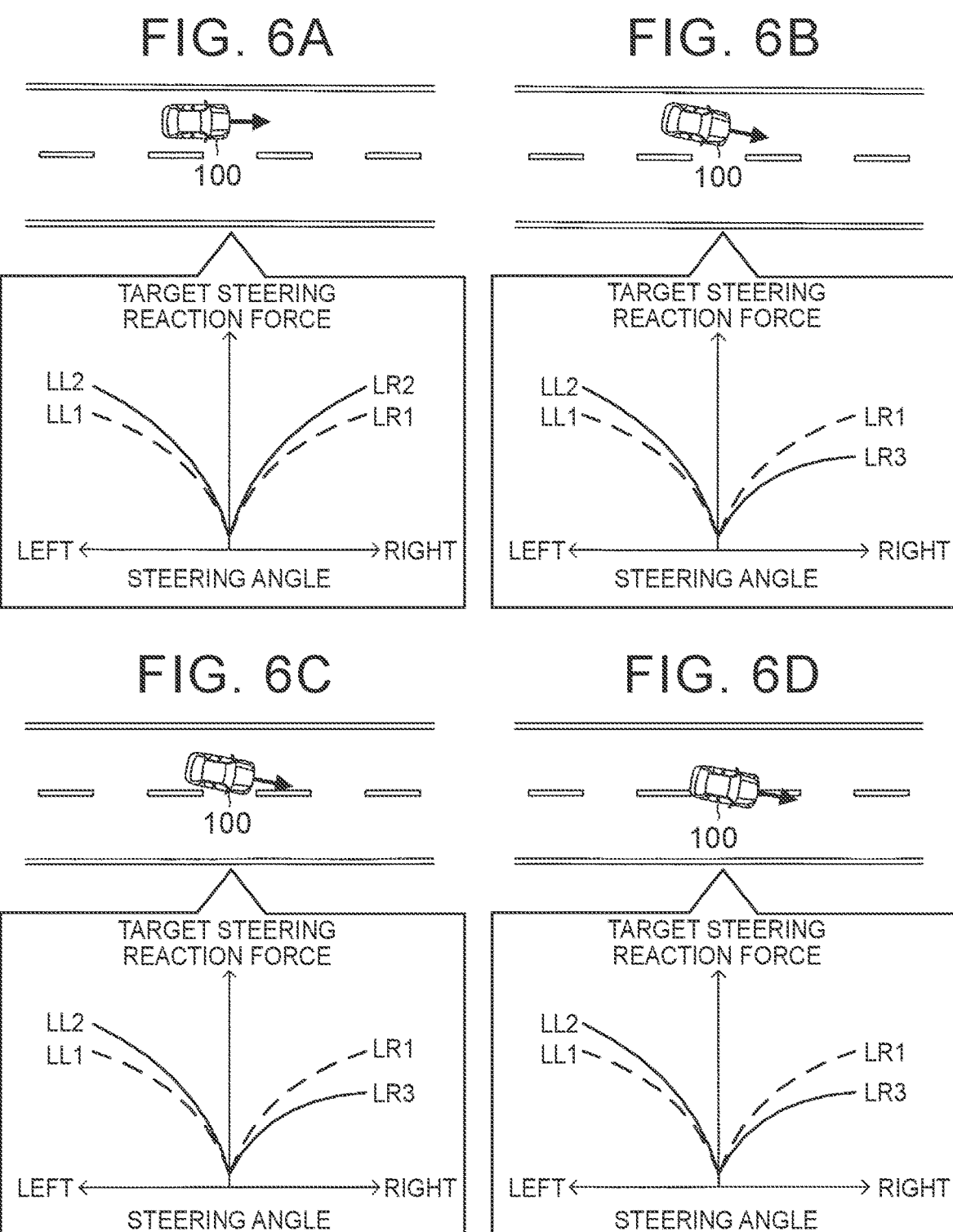
FIG. 6A is a diagram showing a scene in which the driver's vehicle is traveling straight ahead during the execution of the active steering reaction force control.
FIG. 6B is a diagram showing a scene in which the driver's vehicle shown in FIG. 6A starts to change lanes during the execution of the active steering reaction force control.
FIG. 6C is a diagram showing a scene in which the driver's vehicle shown in FIG. 6B further advances and its right front wheel has reached a position immediately short of a lane marking line during the execution of the active steering reaction force control.
FIG. 6D is a diagram showing a scene in which the driver's vehicle shown in FIG. 6C further advances and is traveling across the lane marking line during the execution of the active steering reaction force control.

When neither the entry-restricted area detection condition nor the entry-restricted area approach condition is satisfied in a case where the driver's vehicle 100 is traveling straight ahead and the lane change start condition is not satisfied as shown in FIG. 6A during the execution of the active steering reaction force control, the vehicle control device 10 sets the target steering reaction force RFtgt by using the map shown in FIG. 2B and controls the operation of the steering device 23 to apply a steering reaction force corresponding to the target steering reaction force RFtgt to the steering wheel 35 as described above.

FIG. 6B

When the entry-restricted area approach condition is not satisfied in a case where the driver's vehicle 100 starts to change the lane to the right adjacent parallel lane and the lane change start condition is satisfied as shown in FIG. 6B, the vehicle control device switches the map to be used for setting the target steering reaction force RFtgt from the map shown in FIG. 2B to the map shown in FIG. 2C, sets the target steering reaction force RFtgt, and controls the operation of the steering device 23 to apply a steering reaction force corresponding to the target steering reaction force RFtgt to the steering wheel 35.

Thus, a steering reaction force defined by the line LR3 is applied to a rightward steering wheel operation. Comparing the steering reaction forces at the same steering angle θ, this steering reaction force is smaller than the normal steering reaction force.

A steering reaction force defined by the line LL2 is applied to a leftward steering wheel operation. Comparing the steering reaction forces at the same steering angle θ, this steering reaction force is larger than the normal steering reaction force.

When the driver's vehicle 100 starts to change the lane to the left adjacent parallel lane, the vehicle control device 10 switches the map to be used for setting the target steering reaction force RFtgt from the map shown in FIG. 2B to the map shown in FIG. 2D, sets the target steering reaction force RFtgt, and controls the operation of the steering device 23 to apply a steering reaction force corresponding to the target steering reaction force RFtgt to the steering wheel 35.

Thus, a steering reaction force defined by the line LL3 is applied to a leftward steering wheel operation. Comparing the steering reaction forces at the same steering angle θ, this steering reaction force is smaller than the normal steering reaction force. A steering reaction force defined by the line LR2 is applied to a rightward steering wheel operation. Comparing the steering reaction forces at the same steering angle θ, this steering reaction force is larger than the normal steering reaction force.

Thus, when the lane change start condition is satisfied during the execution of the active steering reaction force control, the vehicle control device 10 reduces the steering reaction force to be applied to the steering wheel operation in the direction in which the driver's vehicle 100 is expected to change the lane and increases the steering reaction force to be applied to the steering wheel operation in the opposite direction, compared to the case where the lane change start condition is not satisfied.

Accordingly, the driver can easily perform the lane change steering wheel operation.

FIGS. 6C, 6D, and 7A1

As shown in FIG. 6C, the front wheel of the driver's vehicle 100 reaches a position immediately short of a lane marking line (lane marking line that separates the initial lane and the right adjacent parallel lane) (reaches a position at a predetermined distance from the lane marking line to the driver's vehicle 100). As shown in FIG. 6D, the driver's vehicle 100 travels across the lane marking line. As shown in FIG. 7A1, the driver's vehicle 100 entirely enters the right adjacent parallel lane. Thus, unless the entry-restricted area approach condition is satisfied within the period after the satisfaction of the lane change start condition and before the entry of the entire driver's vehicle 100 into the right adjacent parallel lane, the vehicle control device 10 sets the target steering reaction force RFtgt by using the map shown in FIG. 2C. The vehicle control device 10 controls the operation of the steering device 23 to apply a steering reaction force corresponding to the target steering reaction force RFtgt to the steering wheel 35.

When the driver's vehicle 100 is changing the lane to the left adjacent parallel lane, the vehicle control device 10 sets the target steering reaction force RFtgt by using the map shown in FIG. 2D unless the entry-restricted area approach condition is satisfied within the period after the satisfaction of the lane change start condition and before the entry of the entire driver's vehicle 100 into the left adjacent parallel lane. The vehicle control device 10 controls the operation of the steering device 23 to apply a steering reaction force corresponding to the target steering reaction force RFtgt to the steering wheel 35.

The lane marking line that separates the initial lane and the right adjacent parallel lane and the lane marking line that separates the initial lane and the left adjacent parallel lane are detected based on the peripheral detection information IS.

When the driver's vehicle 100 has entirely entered the right adjacent parallel lane as shown in FIG. 7A1, the vehicle control device 10 switches the map to be used for setting the target steering reaction force RFtgt from the map shown in FIG. 2C to the map shown in FIG. 2E, and sets the target steering reaction force RFtgt. The vehicle control device controls the operation of the steering device 23 to apply a steering reaction force corresponding to the target steering reaction force RFtgt to the steering wheel 35.

Thus, a steering reaction force defined by the line LR4 is applied to a rightward steering wheel operation. The rate of increase in this steering reaction force relative to an increase in the steering angle θ is higher when the steering angle θ is equal to or larger than a certain value than when the steering angle θ is smaller than the certain value.

When a situation corresponding to the situation shown in FIG. 7A1 has occurred in the case where the driver's vehicle 100 is changing the lane to the left adjacent parallel lane, the vehicle control device 10 switches the map to be used for setting the target steering reaction force RFtgt from the map shown in FIG. 2D to the map shown in FIG. 2F, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LL4 is applied to a leftward steering wheel operation. The rate of increase in this steering reaction force relative to an increase in the steering angle θ is higher when the steering angle θ is equal to or larger than a certain value than when the steering angle θ is smaller than the certain value.

Thus, when the driver's vehicle 100 has entirely entered the adjacent parallel lane to change the lane of the driver's vehicle 100 after the lane change start condition is satisfied, the vehicle control device 10 applies, to the steering wheel operation in the direction in which the driver's vehicle 100 changes the lane, the steering reaction force by setting the target steering reaction force RFtgt so that the rate of increase relative to the increase in the steering angle θ is higher when the steering angle θ is equal to or larger than the certain value than when the steering angle θ is smaller than the certain value.

Thus, the driver can easily perform the steering wheel operation to reduce the steering angle θ (that is, the operation to return the steering wheel 35 to the neutral position). FIG. 7A2

When the driver's vehicle 100 has completed changing the lane to the right adjacent parallel lane as shown in FIG. 7A2, the vehicle control device 10 switches the map to be used for setting the target steering reaction force RFtgt from the map shown in FIG. 2E to the map shown in FIG. 2B, and sets the target steering reaction force RFtgt. The vehicle control device 10 controls the operation of the steering device 23 to apply a steering reaction force corresponding to the target steering reaction force RFtgt to the steering wheel 35.

When the driver's vehicle 100 has completed changing the lane to the left adjacent parallel lane in the lane change of the driver's vehicle 100 to the left adjacent parallel lane, the vehicle control device 10 switches the map to be used for setting the target steering reaction force RFtgt from the map shown in FIG. 2F to the map shown in FIG. 2B, and sets the target steering reaction force RFtgt. The vehicle control device 10 controls the operation of the steering device 23 to apply a steering reaction force corresponding to the target steering reaction force RFtgt to the steering wheel 35 (steering wheel operation).

FIG. 7B1

When the steering wheel operation is switched after the start of the lane change of the driver's vehicle 100 to the right adjacent parallel lane and the driver's vehicle 100 is returned to its original lane (initial lane) as shown in FIG. 7B1, the vehicle control device 10 switches the map to be used for setting the target steering reaction force RFtgt to the map shown in FIG. 2F, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LL4 is applied to a leftward steering wheel operation. The rate of increase in this steering reaction force relative to an increase in the steering angle θ is higher when the steering angle θ is equal to or larger than a certain value than when the steering angle θ is smaller than the certain value.

When a situation corresponding to the situation shown in FIG. 7B1 has occurred in the case where the driver's vehicle 100 is changing the lane to the left adjacent parallel lane, the vehicle control device 10 switches the map to be used for setting the target steering reaction force RFtgt to the map shown in FIG. 2E, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR4 is applied to a rightward steering wheel operation. The rate of increase in this steering reaction force relative to an increase in the steering angle θ is higher when the steering angle θ is equal to or larger than a certain value than when the steering angle θ is smaller than the certain value.

Thus, when the steering wheel operation is switched and the driver's vehicle 100 is returned to its original lane (initial lane) during the execution of the active steering reaction force control, the vehicle control device 10 applies, to the steering wheel operation in the direction opposite to the direction in which the driver's vehicle 100 changes the lane (steering wheel operation in the direction in which the driver's vehicle 100 is returned to its original lane), the steering reaction force by setting the target steering reaction force RFtgt so that the rate of increase relative to the increase in the steering angle θ is higher when the steering angle θ is equal to or larger than the certain value than when the steering angle θ is smaller than the certain value.

Thus, the driver can easily perform the steering wheel operation to reduce the steering angle θ (that is, the operation to return the steering wheel 35 to the neutral position).

FIG. 7B2

When the driver's vehicle 100 has returned to the initial lane as shown in FIG. 7B2 and determination is made that the lane change of the driver's vehicle 100 to the right adjacent parallel lane has been stopped, the vehicle control device 10 switches the map to be used for setting the target steering reaction force RFtgt from the map shown in FIG. 2F to the map shown in FIG. 2B, and sets the target steering reaction force RFtgt. The vehicle control device 10 controls the operation of the steering device 23 to apply a steering reaction force corresponding to the target steering reaction force RFtgt to the steering wheel 35.

When determination is made, in the lane change of the driver's vehicle 100 to the left adjacent parallel lane, that the driver's vehicle 100 has returned to the initial lane and the lane change of the driver's vehicle 100 to the left adjacent parallel lane has been stopped, the vehicle control device 10 switches the map to be used for setting the target steering reaction force RFtgt from the map shown in FIG. 2E to the map shown in FIG. 2B, and sets the target steering reaction force RFtgt. The vehicle control device 10 controls the operation of the steering device 23 to apply a steering reaction force corresponding to the target steering reaction force RFtgt to the steering wheel 35.

The above are the operations of the vehicle control device 10 in the scene in which the entry-restricted area approach condition is not satisfied while the driver's vehicle 100 is changing the lane to the adjacent parallel lane.

Scene 2

Next, description will be given of operations of the vehicle control device in a scene in which the entry-restricted area approach condition is satisfied when the lane change start condition is satisfied.

FIG. 8A

Figures 8A, 8B:
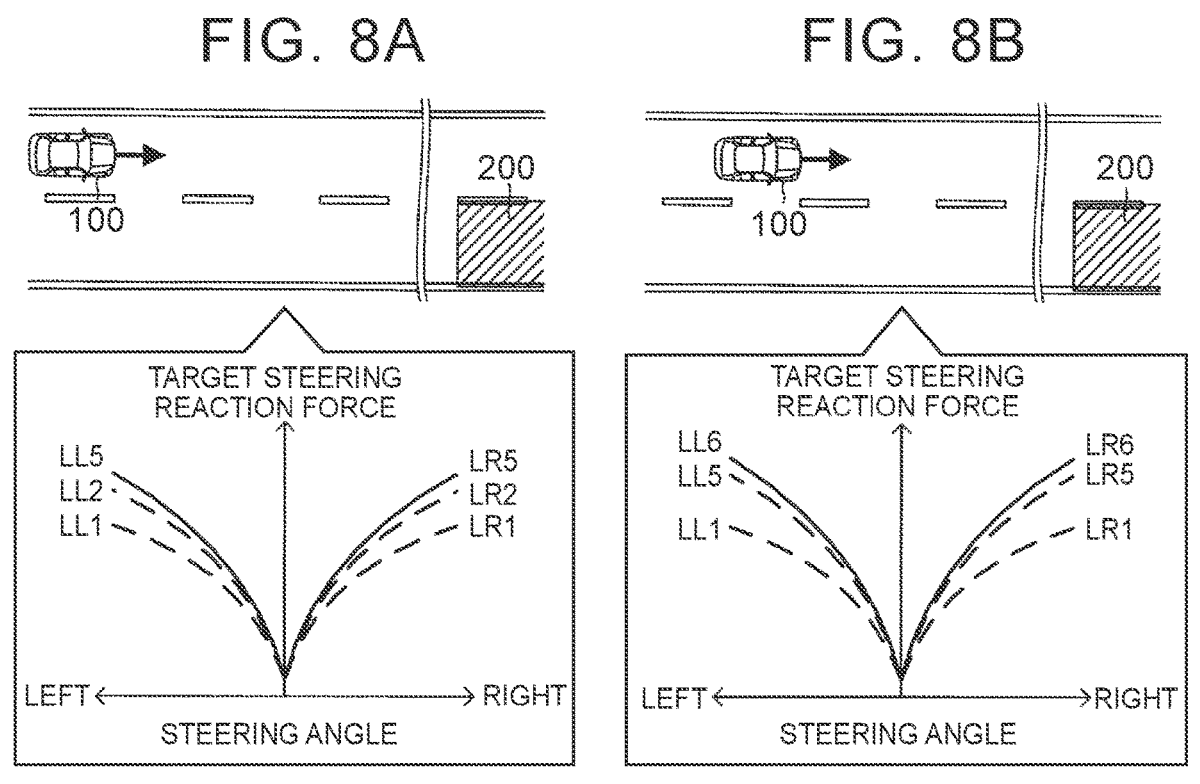

When the entry-restricted area approach condition is not satisfied but the entry-restricted area detection condition is satisfied in a case where the driver's vehicle 100 is traveling straight ahead and the lane change start condition is not satisfied as shown in FIG. 8A during the execution of the active steering reaction force control, the vehicle control device 10 sets the target steering reaction force RFtgt by using the map shown in FIG. 3A. The vehicle control device 10 controls the operation of the steering device 23 to apply a steering reaction force corresponding to the target steering reaction force RFtgt to the steering wheel 35.

Accordingly, a larger steering reaction force is applied to the steering wheel as the steering angle θ increases. Comparing the steering reaction forces at the same steering angle θ, this steering reaction force is larger than the steering reaction force defined by the line LR2.

That is, when the entry-restricted area detection condition is satisfied in the case where the lane change start condition is not satisfied during the execution of the active steering reaction force control, the vehicle control device 10 increases the steering reaction force compared to the case where the entry-restricted area detection condition is not satisfied.

Accordingly, it is difficult for the driver to increase the amount of steering wheel operation. Thus, it is easier to keep the amount of steering wheel operation near zero, thereby easily holding the rotational position of the steering wheel 35 for causing the driver's vehicle 100 to travel straight ahead.

FIG. 8B

When the driver's vehicle 100 further advances and the entry-restricted area approach condition is satisfied as shown in FIG. 8B, the vehicle control device 10 switches the map to be used for setting the target steering reaction force RFtgt from the map shown in FIG. 3A to the map shown in FIG. 3B, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR6 is applied to a rightward steering wheel operation. Comparing the steering reaction forces at the same steering angle θ, this steering reaction force is larger than the steering reaction force defined by the line LR5.

That is, when the entry-restricted area approach condition is satisfied in the case where the lane change start condition is not satisfied during the execution of the active steering reaction force control, the vehicle control device 10 increases the steering reaction force compared to the case where the entry-restricted area approach condition is not satisfied.

Accordingly, it is more difficult for the driver to increase the amount of steering wheel operation. Thus, it is easier to keep the amount of steering wheel operation near zero, thereby easily holding the rotational position of the steering wheel 35 for causing the driver's vehicle 100 to travel straight ahead.

FIG. 9A

When the entry-restricted area approach condition is satisfied in a case where the driver's vehicle 100 starts to change the lane to the right adjacent parallel lane and the lane change start condition is satisfied as shown in FIG. 9A, the vehicle control device sets the target steering reaction force RFtgt by continuously using the map shown in FIG. 3B. The vehicle control device 10 controls the operation of the steering device 23 to apply a steering reaction force corresponding to the target steering reaction force RFtgt to the steering wheel 35.

Thus, a steering reaction force defined by the line LR6 is applied to a rightward steering wheel operation. Comparing the steering reaction forces at the same steering angle θ, this steering reaction force is larger than the steering reaction force defined by the line LR5.

Also when the entry-restricted area approach condition is satisfied in a case where the driver's vehicle 100 starts to change the lane to the left adjacent parallel lane, the vehicle control device 10 sets the target steering reaction force RFtgt by continuously using the map shown in FIG. 3B. The vehicle control device 10 controls the operation of the steering device 23 to apply a steering reaction force corresponding to the target steering reaction force RFtgt to the steering wheel 35.

Thus, a steering reaction force defined by the line LL6 is applied to a leftward steering wheel operation. Comparing the steering reaction forces at the same steering angle θ, this steering reaction force is larger than the steering reaction force defined by the line LL5.

Thus, when the lane change start condition is satisfied during the execution of the active steering reaction force control and the entry-restricted area approach condition is satisfied at this time, the vehicle control device 10 increases the steering reaction force to be applied to the steering wheel operation in the direction in which the driver's vehicle 100 is expected to change the lane, compared to the case where the entry-restricted area approach condition is not satisfied.

Accordingly, it is difficult for the driver to operate the steering wheel 35 in the direction in which the driver's vehicle 100 is expected to change the lane. Thus, it is possible to suppress the entry of the driver's vehicle 100 into the entry-restricted area 200.

FIG. 9B

Then, the lane change steering wheel operation is continued and the front wheel of the driver's vehicle 100 reaches a position immediately short of the lane marking line (position at the predetermined distance from the lane marking line to the driver's vehicle 100) as shown in FIG. 9B. When the entry-restricted area approach condition is still satisfied in this case, the vehicle control device 10 switches the map to be used for setting the target steering reaction force RFtgt from the map shown in FIG. 3B to the map shown in FIG. 3C, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR7 is applied to a rightward steering wheel operation. When the steering angle θ is equal to or larger than a certain value, this steering reaction force is larger than the steering reaction force applied in accordance with the line LR6 and the rate of increase relative to an increase in the steering angle θ is higher.

When a situation corresponding to the situation shown in FIG. 9B has occurred in the case where the driver's vehicle 100 is changing the lane to the left adjacent parallel lane, the vehicle control device 10 switches the map to be used for setting the target steering reaction force RFtgt from the map shown in FIG. 3B to the map shown in FIG. 3D, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LL7 is applied to a leftward steering wheel operation. When the steering angle θ is equal to or larger than a certain value, this steering reaction force is larger than the steering reaction force applied in accordance with the line LL6 and the rate of increase relative to an increase in the steering angle θ is higher.

Thus, when the front wheel of the driver's vehicle 100 reaches the position immediately short of the lane marking line (position at the predetermined distance from the lane marking line to the driver's vehicle 100) by the lane change steering wheel operation with the entry-restricted area approach condition satisfied during the execution of the active steering reaction force control, the vehicle control device 10 further increases the steering reaction force to be applied to the steering wheel operation in the direction in which the driver's vehicle 100 is expected to change the lane.

Accordingly, it is more difficult for the driver to operate the steering wheel in the direction in which the driver's vehicle 100 is expected to change the lane. Thus, it is possible to suppress the entry of the driver's vehicle 100 into the entry-restricted area 200.

FIG. 9C

Then, the lane change steering wheel operation is continued and the driver's vehicle 100 travels across the lane marking line as shown in FIG. 9C. When the entry-restricted area approach condition is still satisfied in this case, the vehicle control device 10 switches the map to be used for setting the target steering reaction force RFtgt from the map shown in FIG. 3C to the map shown in FIG. 4C, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR3 is applied to a rightward steering wheel operation. A steering reaction force defined by the line LL3 is applied to a leftward steering wheel operation. Comparing the steering reaction forces at the same steering angle θ, these steering reaction forces are smaller than the normal steering reaction forces.

When a situation corresponding to the situation shown in FIG. 9C has occurred in the case where the driver's vehicle 100 is changing the lane to the left adjacent parallel lane, the vehicle control device 10 switches the map to be used for setting the target steering reaction force RFtgt from the map shown in FIG. 3D to the map shown in FIG. 4C, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR3 is applied to a rightward steering wheel operation. A steering reaction force defined by the line LL3 is applied to a leftward steering wheel operation. Comparing the steering reaction forces at the same steering angle θ, these steering reaction forces are smaller than the normal steering reaction forces.

Thus, when the driver's vehicle 100 travels across the lane marking line by the lane change steering wheel operation with the entry-restricted area approach condition satisfied during the execution of the active steering reaction force control, the vehicle control device 10 reduces the steering reaction forces to be applied to the steering wheel operations in the direction in which the driver's vehicle 100 is expected to change the lane and in the opposite direction.

Accordingly, the driver can easily perform the steering wheel operation when the driver continues the lane change steering wheel operation by his/her decision to continue the lane change of the driver's vehicle 100 or when the driver switches the steering wheel operation to return the driver's vehicle 100 to its original lane (initial lane) in order to avoid the entry of the driver's vehicle 100 into the entry-restricted area 200.

FIG. 10A1

When the lane change steering wheel operation is continued and the driver's vehicle 100 has entirely entered the right adjacent parallel lane as shown in FIG. 10A1, the vehicle control device 10 switches the map to be used for setting the target steering reaction force RFtgt from the map shown in FIG. 4C to the map shown in FIG. 3E, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR4 is applied to a rightward steering wheel operation. The rate of increase in this steering reaction force relative to an increase in the steering angle θ is higher when the steering angle θ is equal to or larger than a certain value than when the steering angle θ is smaller than the certain value.

When a situation corresponding to the situation shown in FIG. 10A1 has occurred in the case where the driver's vehicle 100 is changing the lane to the left adjacent parallel lane, the vehicle control device 10 switches the map to be used for setting the target steering reaction force RFtgt from the map shown in FIG. 4C to the map shown in FIG. 3F, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LL4 is applied to a leftward steering wheel operation. The rate of increase in this steering reaction force relative to an increase in the steering angle θ is higher when the steering angle θ is equal to or larger than a certain value than when the steering angle θ is smaller than the certain value.

Thus, when the lane change steering wheel operation is continued and the driver's vehicle 100 has entirely entered the adjacent parallel lane in the scene in which the entry-restricted area approach condition is satisfied at the start of the lane change of the driver's vehicle 100 to the adjacent parallel lane during the execution of the active steering reaction force control, the vehicle control device 10 applies, to the lane change steering wheel operation, the steering reaction force by setting the target steering reaction force RFtgt so that the rate of increase relative to the increase in the steering angle θ is higher when the steering angle θ is equal to or larger than the certain value than when the steering angle θ is smaller than the certain value.

Thus, the driver can easily perform the steering wheel operation to reduce the steering angle θ (that is, the operation to return the steering wheel 35 to the neutral position).

FIG. 10A2

When the driver's vehicle 100 has completed changing the lane to the right adjacent parallel lane as shown in FIG. 10A2, the vehicle control device 10 switches the map to be used for setting the target steering reaction force RFtgt from the map shown in FIG. 3E to the map shown in FIG. 2B, and sets the target steering reaction force RFtgt. The vehicle control device 10 controls the operation of the steering device 23 to apply a steering reaction force corresponding to the target steering reaction force RFtgt to the steering wheel 35.

When a situation corresponding to the situation shown in FIG. 10A2 has occurred in the case where the driver's vehicle 100 is changing the lane to the left adjacent parallel lane, the vehicle control device 10 switches the map to be used for setting the target steering reaction force RFtgt from the map shown in FIG. 3F to the map shown in FIG. 2B, and sets the target steering reaction force RFtgt. The vehicle control device 10 controls the operation of the steering device 23 to apply a steering reaction force corresponding to the target steering reaction force RFtgt to the steering wheel 35.

FIG. 10B1

When the steering wheel operation is switched after the situation shown in FIG. 9C has occurred and the driver's vehicle 100 is returned to its original lane (initial lane) as shown in FIG. 10B1, the vehicle control device 10 switches the map to be used for setting the target steering reaction force RFtgt from the map shown in FIG. 4C to the map shown in FIG. 3F, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LL4 is applied to a leftward steering wheel operation. The rate of increase in this steering reaction force relative to an increase in the steering angle θ is higher when the steering angle θ is equal to or larger than a certain value than when the steering angle θ is smaller than the certain value.

When a situation corresponding to the situation shown in FIG. 10B1 has occurred in the case where the driver's vehicle 100 is changing the lane to the left adjacent parallel lane, the vehicle control device 10 switches the map to be used for setting the target steering reaction force RFtgt from the map shown in FIG. 4C to the map shown in FIG. 3E, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR4 is applied to a rightward steering wheel operation. The rate of increase in this steering reaction force relative to an increase in the steering angle θ is higher when the steering angle θ is equal to or larger than a certain value than when the steering angle θ is smaller than the certain value.

Thus, when the steering wheel operation is switched and the driver's vehicle 100 is returned to its original lane (initial lane) after the driver's vehicle 100 has traveled across the lane marking line with the entry-restricted area approach condition satisfied during the execution of the active steering reaction force control, the vehicle control device 10 applies, to the steering wheel operation in the direction opposite to the direction in which the driver's vehicle 100 changes the lane (steering wheel operation in the direction in which the driver's vehicle 100 is returned to its original lane), the steering reaction force by setting the target steering reaction force RFtgt so that the rate of increase relative to the increase in the steering angle θ is higher when the steering angle θ is equal to or larger than the certain value than when the steering angle θ is smaller than the certain value.

Thus, the driver can easily perform the steering wheel operation to reduce the steering angle θ (that is, the operation to return the steering wheel 35 to the neutral position).

FIG. 10B2

When the driver's vehicle 100 has returned to the initial lane as shown in FIG. 10B2 and the vehicle control device 10 determines that the lane change of the driver's vehicle 100 to the right adjacent parallel lane has been stopped, the vehicle control device 10 switches the map to be used for setting the target steering reaction force RFtgt from the map shown in FIG. 3F to the map shown in FIG. 2B, and sets the target steering reaction force RFtgt. The vehicle control device 10 controls the operation of the steering device 23 to apply a steering reaction force corresponding to the target steering reaction force RFtgt to the steering wheel 35.

When a situation corresponding to the situation shown in FIG. 10B2 has occurred in the case where the driver's vehicle 100 is changing the lane to the left adjacent parallel lane, the vehicle control device 10 switches the map to be used for setting the target steering reaction force RFtgt from the map shown in FIG. 3E to the map shown in FIG. 2B, and sets the target steering reaction force RFtgt. The vehicle control device 10 controls the operation of the steering device 23 to apply a steering reaction force corresponding to the target steering reaction force RFtgt to the steering wheel 35.

The above are the operations of the vehicle control device 10 in the scene in which the entry-restricted area approach condition is satisfied when the lane change start condition is satisfied.

When the temporarily satisfied entry-restricted area approach condition becomes unsatisfied, for example, because the driver's vehicle 100 that continues to travel in the initial lane passes by the entry-restricted area 200 after the start of the lane change of the driver's vehicle 100 to the right adjacent parallel lane, the vehicle control device 10 switches the map to be used for setting the target steering reaction force RFtgt to the map shown in FIG. 2C, and sets the target steering reaction force RFtgt. The vehicle control device 10 controls the operation of the steering device 23 to apply a steering reaction force corresponding to the target steering reaction force RFtgt to the steering wheel 35.

When the temporarily satisfied entry-restricted area approach condition becomes unsatisfied, for example, because the driver's vehicle 100 that continues to travel in the initial lane passes by the entry-restricted area 200 after the start of the lane change of the driver's vehicle 100 to the left adjacent parallel lane, the vehicle control device 10 switches the map to be used for setting the target steering reaction force RFtgt to the map shown in FIG. 2D, and sets the target steering reaction force RFtgt. The vehicle control device 10 controls the operation of the steering device 23 to apply a steering reaction force corresponding to the target steering reaction force RFtgt to the steering wheel 35.

Scene 3

Next, description will be given of operations of the vehicle control device in a scene in which the entry-restricted area approach condition is not satisfied when the lane change start condition is satisfied but the entry-restricted area approach condition is satisfied before the front wheel of the driver's vehicle 100 reaches a position immediately short of the lane marking line (position at the predetermined distance from the lane marking line to the driver's vehicle 100).

FIG. 11A

When neither the entry-restricted area detection condition nor the entry-restricted area approach condition is satisfied in a case where the driver's vehicle 100 is traveling straight ahead and the lane change start condition is not satisfied as shown in FIG. 11A during the execution of the active steering reaction force control, the vehicle control device 10 sets the target steering reaction force RFtgt by using the map shown in FIG. 2B as described above. The vehicle control device 10 controls the operation of the steering device 23 to apply a steering reaction force corresponding to the target steering reaction force RFtgt to the steering wheel 35.

FIG. 11B

When the entry-restricted area approach condition is not satisfied in a case where the driver's vehicle 100 starts to change the lane to the right adjacent parallel lane and the lane change start condition is satisfied as shown in FIG. 11B, the vehicle control device switches the map to be used for setting the target steering reaction force RFtgt from the map shown in FIG. 2B to the map shown in FIG. 2C, and sets the target steering reaction force RFtgt. The vehicle control device 10 controls the operation of the steering device 23 to apply a steering reaction force corresponding to the target steering reaction force RFtgt to the steering wheel 35.

When the driver's vehicle 100 starts to change the lane to the left adjacent parallel lane, the vehicle control device 10 switches the map to be used for setting the target steering reaction force RFtgt from the map shown in FIG. 2B to the map shown in FIG. 2D, and sets the target steering reaction force RFtgt. The vehicle control device 10 controls the operation of the steering device 23 to apply a steering reaction force corresponding to the target steering reaction force RFtgt to the steering wheel 35.

FIG. 11C

When the entry-restricted area approach condition is satisfied before the front wheel of the driver's vehicle 100 reaches a position immediately short of the lane marking line (position at the predetermined distance from the lane marking line to the driver's vehicle 100) as shown in FIG. 11C, the vehicle control device 10 switches the map to be used for setting the target steering reaction force RFtgt from the map shown in FIG. 2C to the map shown in FIG. 2D, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR2 is applied to a rightward steering wheel operation. Comparing the steering reaction forces at the same steering angle θ, this steering reaction force is larger than the normal steering reaction force.

A steering reaction force defined by the line LL3 is applied to a leftward steering wheel operation. Comparing the steering reaction forces at the same steering angle θ, this steering reaction force is smaller than the normal steering reaction force. For the rightward steering wheel operation, a steering reaction force defined by the line LR5 or the line LR6 in place of the line LR2 may be applied.

When a situation corresponding to the situation shown in FIG. 11C has occurred in the case where the driver's vehicle 100 is changing the lane to the left adjacent parallel lane, the vehicle control device 10 switches the map to be used for setting the target steering reaction force RFtgt from the map shown in FIG. 2D to the map shown in FIG. 2C, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LL2 is applied to a leftward steering wheel operation. Comparing the steering reaction forces at the same steering angle θ, this steering reaction force is larger than the normal steering reaction force. A steering reaction force defined by the line LR3 is applied to a rightward steering wheel operation. Comparing the steering reaction forces at the same steering angle θ, this steering reaction force is smaller than the normal steering reaction force. For the leftward steering wheel operation, a steering reaction force defined by the line LL5 or the line LL6 in place of the line LL2 may be applied.

Thus, when the entry-restricted area approach condition is satisfied before the front wheel of the driver's vehicle 100 reaches the position immediately short of the lane marking line (position at the predetermined distance from the lane marking line to the driver's vehicle 100) while the driver's vehicle 100 is changing the lane to the adjacent parallel lane during the execution of the active steering reaction force control, the vehicle control device increases the steering reaction force to be applied to the lane change steering wheel operation and reduces the steering reaction force to be applied to the steering wheel operation to return the driver's vehicle 100 to its original lane (initial lane).

Thus, the driver can easily perform the steering wheel operation to return the driver's vehicle 100 to its original lane (initial lane).

FIG. 11D

Then, the lane change steering wheel operation is continued and the front wheel of the driver's vehicle 100 reaches the position immediately short of the lane marking line (position at the predetermined distance from the lane marking line to the driver's vehicle 100) as shown in FIG. 11D. When the entry-restricted area approach condition is still satisfied in this case, the vehicle control device 10 switches the map to be used for setting the target steering reaction force RFtgt from the map shown in FIG. 2D to the map shown in FIG. 4A, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force corresponding to the target steering reaction force RFtgt defined by the line LR7 is applied to a rightward steering wheel operation. When the steering angle θ is equal to or larger than a certain value, this steering reaction force is larger than the steering reaction force applied in accordance with the line LR6 and the rate of increase relative to an increase in the steering angle θ is higher.

When a situation corresponding to the situation shown in FIG. 11D has occurred in the case where the driver's vehicle 100 is changing the lane to the left adjacent parallel lane, the vehicle control device 10 switches the map to be used for setting the target steering reaction force RFtgt from the map shown in FIG. 2C to the map shown in FIG. 4B, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LL7 is applied to a leftward steering wheel operation. When the steering angle θ is equal to or larger than a certain value, this steering reaction force is larger than the steering reaction force applied in accordance with the line LL6 and the rate of increase relative to an increase in the steering angle θ is higher.

Thus, when the entry-restricted area approach condition is satisfied during the execution of the active steering reaction force control and then the front wheel of the driver's vehicle 100 reaches the position immediately short of the lane marking line (position at the predetermined distance from the lane marking line to the driver's vehicle 100) by the lane change steering wheel operation, the vehicle control device 10 further increases the steering reaction force to be applied to the steering wheel operation in the direction in which the driver's vehicle 100 is expected to change the lane.

Figure 12:
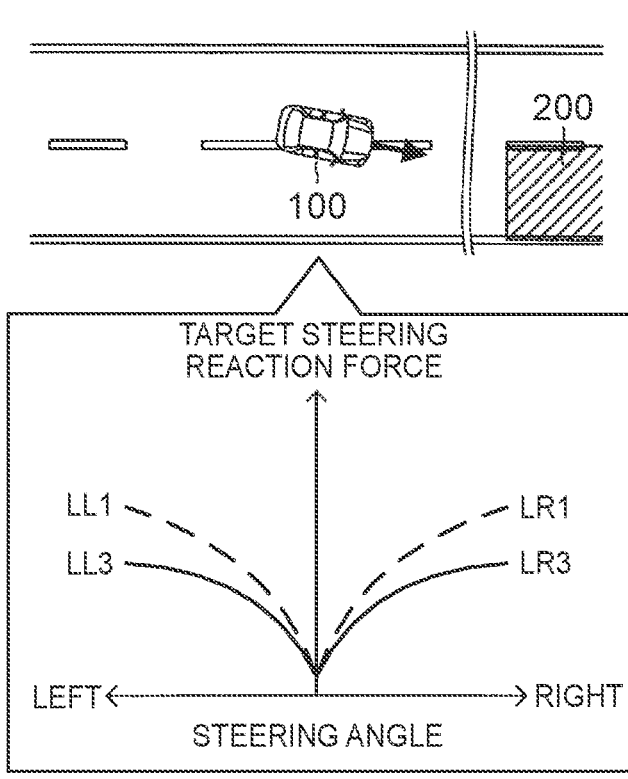
FIG. 12 is a diagram showing a scene in which the driver's vehicle shown in FIG. 11D further advances and is traveling across the lane marking line during the execution of the active steering reaction force control.

Accordingly, it is more difficult for the driver to perform the lane change steering wheel operation. Thus, it is possible to suppress the entry of the driver's vehicle 100 into the entry-restricted area 200.
FIG. 12

Then, the lane change steering wheel operation is continued and the driver's vehicle 100 travels across the lane marking line as shown in FIG. 12. When the entry-restricted area approach condition is still satisfied in this case, the vehicle control device 10 switches the map to be used for setting the target steering reaction force RFtgt from the map shown in FIG. 4A to the map shown in FIG. 4C, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR3 is applied to a rightward steering wheel operation. A steering reaction force defined by the line LL3 is applied to a leftward steering wheel operation. Comparing the steering reaction forces at the same steering angle θ, these steering reaction forces are smaller than the normal steering reaction forces.

When a situation corresponding to the situation shown in FIG. 12 has occurred in the case where the driver's vehicle 100 is changing the lane to the left adjacent parallel lane, the vehicle control device 10 switches the map to be used for setting the target steering reaction force RFtgt from the map shown in FIG. 4B to the map shown in FIG. 4C, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR3 is applied to a rightward steering wheel operation. A steering reaction force defined by the line LL3 is applied to a leftward steering wheel operation. Comparing the steering reaction forces at the same steering angle θ, these steering reaction forces are smaller than the normal steering reaction forces.

Thus, when the entry-restricted area approach condition is satisfied during the execution of the active steering reaction force control and then the driver's vehicle 100 travels across the lane marking line by the lane change steering wheel operation, the vehicle control device 10 reduces the steering reaction forces to be applied to the steering wheel operations in the direction in which the driver's vehicle 100 is expected to change the lane and in the opposite direction.

Accordingly, the driver can easily perform the steering wheel operation when the driver continues the lane change steering wheel operation by his/her decision to continue the lane change of the driver's vehicle 100 or when the driver switches the steering wheel operation to return the driver's vehicle 100 to its original lane (initial lane) in order to avoid the entry of the driver's vehicle 100 into the entry-restricted area 200.
FIG. 13A1

When the lane change steering wheel operation is continued and the driver's vehicle 100 has entirely entered the right adjacent parallel lane as shown in FIG. 13A1, the vehicle control device 10 controls the operation of the steering device 23 in the same manner as that in the situation shown in FIG. 10A1 described above.

When a situation corresponding to the situation shown in FIG. 13A1 has occurred in the case where the driver's vehicle 100 is changing the lane to the left adjacent parallel lane, the vehicle control device 10 controls the operation of the steering device 23 in the same manner as that in the situation corresponding to the situation shown in FIG. 10A1 described above.

Thus, when the lane change steering wheel operation is continued and the driver's vehicle 100 has entirely entered the left adjacent parallel lane in the scene in which the driver's vehicle 100 starts to change the lane to the adjacent parallel lane during the execution of the active steering reaction force control and then the entry-restricted area approach condition is satisfied before the front wheel of the driver's vehicle 100 reaches the position immediately short of the lane marking line (position at the predetermined distance from the lane marking line to the driver's vehicle 100), the vehicle control device 10 applies, to the lane change steering wheel operation, the steering reaction force by setting the target steering reaction force RFtgt so that the rate of increase relative to the increase in the steering angle θ is higher when the steering angle θ is equal to or larger than the certain value than when the steering angle θ is smaller than the certain value.

Thus, the driver can easily perform the steering wheel operation to reduce the steering angle θ (that is, the operation to return the steering wheel 35 to the neutral position).
FIG. 13A2

When the driver's vehicle 100 has completed changing the lane to the right adjacent parallel lane as shown in FIG. 13A2, the vehicle control device 10 controls the operation of the steering device 23 in the same manner as that in the situation shown in FIG. 10A2 described above.

When a situation corresponding to the situation shown in FIG. 13A2 has occurred in the case where the driver's vehicle 100 is changing the lane to the left adjacent parallel lane, the vehicle control device 10 controls the operation of the steering device 23 in the same manner as that in the situation corresponding to the situation shown in FIG. 10A2 described above.
FIG. 13B1

When the steering wheel operation is switched after the situation shown in FIG. 12 has occurred and the driver's vehicle 100 is returned to its original lane (initial lane) as shown in FIG. 13B1, the vehicle control device 10 controls the operation of the steering device 23 in the same manner as that in the situation shown in FIG. 10B1 described above.

When a situation corresponding to the situation shown in FIG. 13B1 has occurred in the case where the driver's vehicle 100 is changing the lane to the left adjacent parallel lane, the vehicle control device 10 controls the operation of the steering device 23 in the same manner as that in the situation corresponding to the situation shown in FIG. 10B1 described above.

Thus, when the steering wheel operation is switched and the driver's vehicle 100 is returned to its original lane (initial lane) after the driver's vehicle 100 has traveled across the lane marking line with the entry-restricted area approach condition satisfied during the execution of the active steering reaction force control, the vehicle control device 10 applies, to the steering wheel operation in the direction opposite to the direction in which the driver's vehicle 100 changes the lane (steering wheel operation in the direction in which the driver's vehicle 100 is returned to its original lane), the steering reaction force by setting the target steering reaction force RFtgt so that the rate of increase relative to the increase in the steering angle θ is higher when the steering angle θ is equal to or larger than the certain value than when the steering angle θ is smaller than the certain value.

FIG. 13B2

When the driver's vehicle 100 has returned to the initial lane as shown in FIG. 13B2 and the vehicle control device 10 determines that the lane change of the driver's vehicle 100 to the right adjacent parallel lane has been stopped, the vehicle control device 10 controls the operation of the steering device 23 in the same manner as that in the situation shown in FIG. 10B2 described above.

When a situation corresponding to the situation shown in FIG. 13B2 has occurred in the case where the driver's vehicle 100 is changing the lane to the left adjacent parallel lane, the vehicle control device 10 controls the operation of the steering device 23 in the same manner as that in the situation corresponding to the situation shown in FIG. 10B2 described above.

The above are the operations of the vehicle control device 10 in the scene in which the entry-restricted area approach condition is not satisfied when the lane change start condition is satisfied but the entry-restricted area approach condition is satisfied before the front wheel of the driver's vehicle 100 reaches the position immediately short of the lane marking line (position at the predetermined distance from the lane marking line to the driver's vehicle 100).

Scene 4

Next, description will be given of operations of the vehicle control device in a scene in which the entry-restricted area approach condition is not satisfied when the lane change start condition is satisfied but the entry-restricted area approach condition is satisfied when the driver's vehicle 100 is traveling across the lane marking line.

FIG. 14A

When neither the entry-restricted area detection condition nor the entry-restricted area approach condition is satisfied in a case where the driver's vehicle 100 is traveling straight ahead and the lane change start condition is not satisfied as shown in FIG. 14A during the execution of the active steering reaction force control, the vehicle control device 10 sets the target steering reaction force RFtgt by using the map shown in FIG. 2B and controls the operation of the steering device 23 to apply a steering reaction force corresponding to the target steering reaction force RFtgt to the steering wheel 35 as described above.

FIG. 14B

When the entry-restricted area approach condition is not satisfied in a case where the driver's vehicle 100 starts to change the lane to the right adjacent parallel lane and the lane change start condition is satisfied as shown in FIG. 14B, the vehicle control device switches the map to be used for setting the target steering reaction force RFtgt from the map shown in FIG. 2B to the map shown in FIG. 2C, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR3 is applied to a rightward steering wheel operation. Comparing the steering reaction forces at the same steering angle θ, this steering reaction force is smaller than the normal steering reaction force. A steering reaction force defined by the line LL2 is applied to a leftward steering wheel operation. Comparing the steering reaction forces at the same steering angle θ, this steering reaction force is larger than the normal steering reaction force.

When the driver's vehicle 100 starts to change the lane to the left adjacent parallel lane, the vehicle control device 10 switches the map to be used for setting the target steering reaction force RFtgt from the map shown in FIG. 2B to the map shown in FIG. 2D, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LL3 is applied to a leftward steering wheel operation. Comparing the steering reaction forces at the same steering angle θ, this steering reaction force is smaller than the normal steering reaction force. A steering reaction force defined by the line LR2 is applied to a rightward steering wheel operation. Comparing the steering reaction forces at the same steering angle θ, this steering reaction force is larger than the normal steering reaction force.

Thus, when the lane change start condition is satisfied during the execution of the active steering reaction force control, the vehicle control device 10 reduces the steering reaction force to be applied to the steering wheel operation in the direction in which the driver's vehicle 100 is expected to change the lane and increases the steering reaction force to be applied to the steering wheel operation in the opposite direction, compared to the case where the lane change start condition is not satisfied.

Accordingly, the driver can easily perform the lane change steering wheel operation.

FIGS. 14C and 14D

As shown in FIG. 14C, the front wheel of the driver's vehicle 100 reaches a position immediately short of the lane marking line (position at the predetermined distance from the lane marking line to the driver's vehicle 100). As shown in FIG. 14D, the driver's vehicle 100 travels across the lane marking line. Thus, unless the entry-restricted area approach condition is satisfied within the period after the satisfaction of the lane change start condition and before the traveling of the driver's vehicle 100 across the lane marking line, the vehicle control device 10 sets the target steering reaction force RFtgt by using the map shown in FIG. 2C. The vehicle control device 10 controls the operation of the steering device 23 to apply a steering reaction force corresponding to the target steering reaction force RFtgt to the steering wheel 35.

When the driver's vehicle 100 is changing the lane to the left adjacent parallel lane, the vehicle control device 10 sets the target steering reaction force RFtgt by using the map shown in FIG. 2D during a period after the satisfaction of the lane change start condition and before the traveling of the driver's vehicle 100 across the lane marking line. The vehicle control device 10 controls the operation of the steering device 23 to apply a steering reaction force corresponding to the target steering reaction force RFtgt to the steering wheel 35.

FIG. 14D

Then, the driver's vehicle 100 travels across the lane marking line as shown in FIG. 14D. When the entry-restricted area approach condition is satisfied in this case, the vehicle control device 10 switches the map to be used for setting the target steering reaction force RFtgt from the map shown in FIG. 2C to the map shown in FIG. 4C, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR3 is applied to a rightward steering wheel operation. A steering reaction force defined by the line LL3 is applied to a leftward steering wheel operation. Comparing the steering reaction forces at the same steering angle θ, these steering reaction forces are smaller than the normal steering reaction forces.

When a situation corresponding to the situation shown in FIG. 14D has occurred in the case where the driver's vehicle 100 is changing the lane to the left adjacent parallel lane, the vehicle control device 10 switches the map to be used for setting the target steering reaction force RFtgt from the map shown in FIG. 2D to the map shown in FIG. 4C, and sets the target steering reaction force RFtgt. The vehicle control device 10 controls the operation of the steering device 23 to apply a steering reaction force corresponding to the target steering reaction force RFtgt to the steering wheel 35.

Thus, a steering reaction force defined by the line LR3 is applied to a rightward steering wheel operation. A steering reaction force defined by the line LL3 is applied to a leftward steering wheel operation. Comparing the steering reaction forces at the same steering angle θ, these steering reaction forces are smaller than the normal steering reaction forces.

Thus, when the driver's vehicle 100 starts to change the lane to the adjacent parallel lane during the execution of the active steering reaction force control and the entry-restricted area approach condition is satisfied when the driver's vehicle 100 travels across the lane marking line, the vehicle control device 10 reduces the steering reaction forces to be applied to the steering wheel operations in the direction in which the driver's vehicle 100 is expected to change the lane and in the opposite direction.

Accordingly, the driver can easily perform the steering wheel operation when the driver continues the lane change steering wheel operation by his/her decision to continue the lane change of the driver's vehicle 100 or when the driver switches the steering wheel operation to return the driver's vehicle 100 to its original lane (initial lane) in order to avoid the entry of the driver's vehicle 100 into the entry-restricted area 200.

FIG. 15A1

When the lane change steering wheel operation is continued and the driver's vehicle 100 has entirely entered the right adjacent parallel lane as shown in FIG. 15A1, the vehicle control device 10 controls the operation of the steering device 23 in the same manner as that in the situation shown in FIG. 10A1 described above.

When a situation corresponding to the situation shown in FIG. 15A1 has occurred in the case where the driver's vehicle 100 is changing the lane to the left adjacent parallel lane, the vehicle control device 10 controls the operation of the steering device 23 in the same manner as that in the situation corresponding to the situation shown in FIG. 10A1 described above.

Thus, when the lane change steering wheel operation is continued and the driver's vehicle 100 has entirely entered the left adjacent parallel lane in the scene in which the driver's vehicle 100 starts to change the lane to the adjacent parallel lane during the execution of the active steering reaction force control and then the entry-restricted area approach condition is satisfied while the driver's vehicle 100 is traveling across the lane marking line, the vehicle control device 10 applies, to the lane change steering wheel operation, the steering reaction force by setting the target steering reaction force RFtgt so that the rate of increase relative to the increase in the steering angle θ is higher when the steering angle θ is equal to or larger than the certain value than when the steering angle θ is smaller than the certain value.

Thus, the driver can easily perform the steering wheel operation to reduce the steering angle θ (that is, the operation to return the steering wheel 35 to the neutral position).

FIG. 15A2

When the driver's vehicle 100 has completed changing the lane to the right adjacent parallel lane as shown in FIG. 15A2, the vehicle control device 10 controls the operation of the steering device 23 in the same manner as that in the situation shown in FIG. 10A2 described above.

When a situation corresponding to the situation shown in FIG. 15A2 has occurred in the case where the driver's vehicle 100 is changing the lane to the left adjacent parallel lane, the vehicle control device 10 controls the operation of the steering device 23 in the same manner as that in the situation corresponding to the situation shown in FIG. 10A2 described above.

FIG. 15B1

When the steering wheel operation is switched after the situation shown in FIG. 14D has occurred and the driver's vehicle 100 is returned to its original lane (initial lane) as shown in FIG. 15B1, the vehicle control device 10 controls the operation of the steering device 23 in the same manner as that in the situation shown in FIG. 10B1 described above.

When a situation corresponding to the situation shown in FIG. 15B1 has occurred in the case where the driver's vehicle 100 is changing the lane to the left adjacent parallel lane, the vehicle control device 10 controls the operation of the steering device 23 in the same manner as that in the situation corresponding to the situation shown in FIG. 10B1 described above.

Thus, when the driver's vehicle 100 starts to change the lane to the adjacent parallel lane during the execution of the active steering reaction force control, the entry-restricted area approach condition is satisfied while the driver's vehicle 100 is traveling across the lane marking line, and the steering wheel operation is switched and the driver's vehicle 100 is returned to its original lane (initial lane), the vehicle control device 10 applies, to the steering wheel operation in the direction opposite to the direction in which the driver's vehicle 100 changes the lane (steering wheel operation in the direction in which the driver's vehicle 100 is returned to its original lane), the steering reaction force by setting the target steering reaction force RFtgt so that the rate of increase relative to the increase in the steering angle θ is higher when the steering angle θ is equal to or larger than the certain value than when the steering angle θ is smaller than the certain value.

FIG. 15B2

When the driver's vehicle 100 has returned to the initial lane as shown in FIG. 15B2 and the vehicle control device 10 determines that the lane change of the driver's vehicle 100 to the right adjacent parallel lane has been stopped, the vehicle control device 10 controls the operation of the steering device 23 in the same manner as that in the situation shown in FIG. 10B2 described above.

When a situation corresponding to the situation shown in FIG. 15B2 has occurred in the case where the driver's vehicle 100 is changing the lane to the left adjacent parallel lane, the vehicle control device 10 controls the operation of the steering device 23 in the same manner as that in the situation corresponding to the situation shown in FIG. 10B2 described above.

The above are the operations of the vehicle control device 10 in the scene in which the entry-restricted area approach condition is not satisfied when the lane change start condition is satisfied but the entry-restricted area approach condition is satisfied when the driver's vehicle 100 is traveling across the lane marking line.

When the entry-restricted area detection condition and/or the entry-restricted area approach condition are/is satisfied, the vehicle control device 10 may cause the display device 61 to display an image for informing the driver that the entry-restricted area 200 is present. When the entry-restricted area detection condition and/or the entry-restricted area approach condition are/is satisfied, the vehicle control device 10 may cause the audio device 62 to output a sound for informing the driver that the entry-restricted area 200 is present.

Specific Operations of Vehicle Control Device

Next, specific operations of the vehicle control device 10 will be described. The CPU of the ECU 90 of the vehicle control device 10 executes a routine shown in FIG. 16 in a predetermined calculation cycle. At a predetermined timing, the CPU starts the process from Step 1600 of the routine shown in FIG. 16, and advances the process to Step 1605 to determine whether the execution of the active steering reaction force control is requested.

Figure 16:
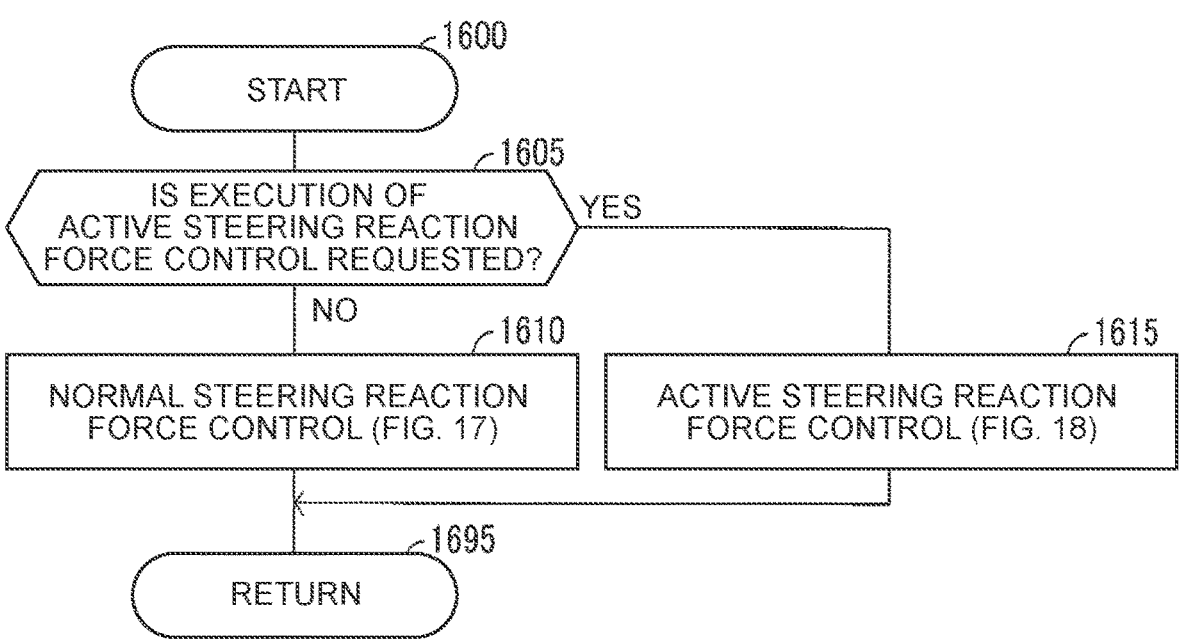
FIG. 16 is a flowchart showing a routine to be executed by the vehicle control device according to the embodiment of the present disclosure.
Figure 17:
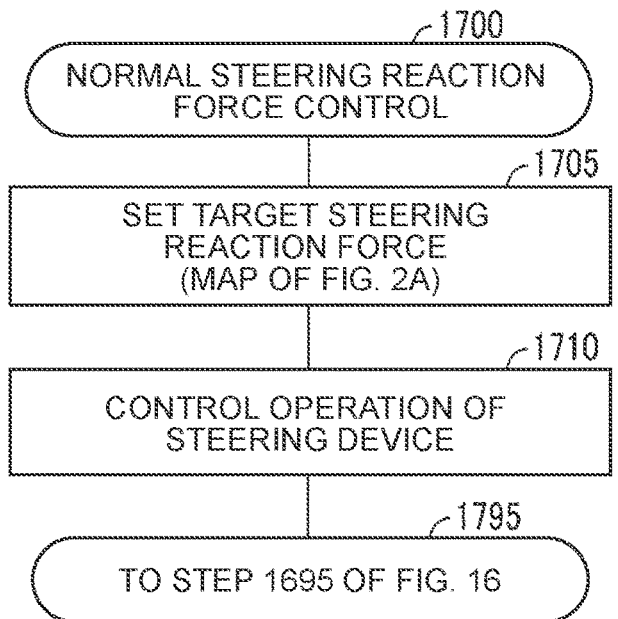
FIG. 17 is a flowchart showing a routine to be executed by the vehicle control device according to the embodiment of the present disclosure.

When the CPU determines "No" in Step 1605, the CPU advances the process to Step 1610 to execute a routine shown in FIG. 17. When the CPU advances the process to Step 1610, the CPU starts a process from Step 1700 of the routine shown in FIG. 17, and advances the process to Step 1705 to set the target steering reaction force RFtgt by using the map shown in FIG. 2A. Next, the CPU advances the process to Step 1710 to control the operation of the steering device 23 to output a steering reaction force corresponding to the target steering reaction force RFtgt set in Step 1705. Next, the CPU advances the process to Step 1695 of the routine shown in FIG. 16 via Step 1795, and temporarily terminates the process of this routine.

Figure 18:
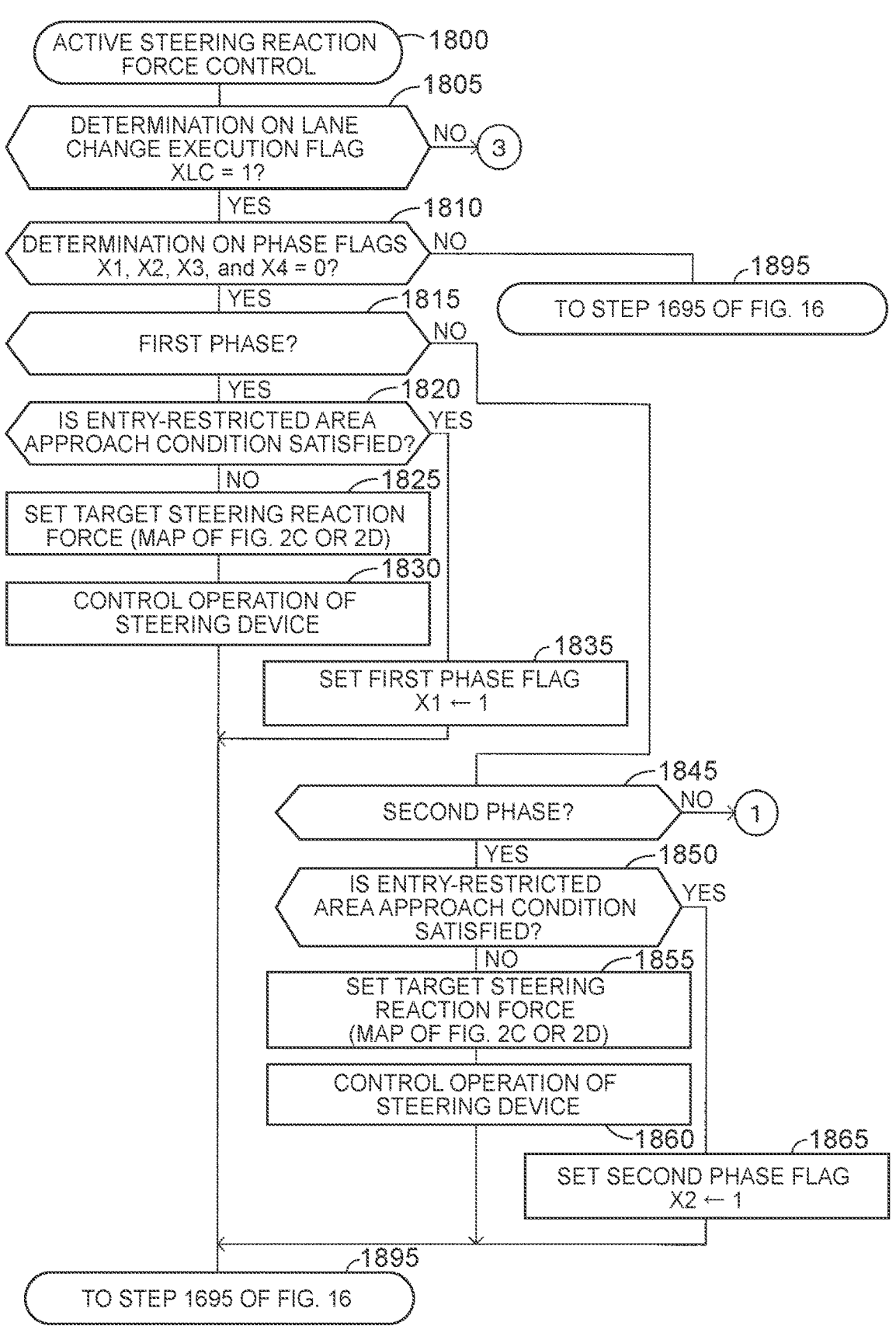
FIG. 18 is a flowchart showing a routine to be executed by the vehicle control device according to the embodiment of the present disclosure.

When the CPU determines "Yes" in Step 1605 of the routine shown in FIG. 16, the CPU advances the process to Step 1615 to execute a routine shown in FIG. 18. When the CPU advances the process to Step 1615, the CPU starts a process from Step 1800 of the routine shown in FIG. 18, and advances the process to Step 1805 to determine whether the value of a lane change execution flag XLC is "1". The value of the lane change execution flag XLC is set to "1" when the driver's vehicle 100 has started the lane change, and is set to "0" when the driver's vehicle 100 has completed or stopped the lane change.

When the CPU determines "Yes" in Step 1805, the CPU advances the process to Step 1810 to determine whether all the values of a first phase flag X1, a second phase flag X2, a third phase flag X3, and a fourth phase flag X4 are "0". The value of the first phase flag X1 is set to "1" when the entry-restricted area approach condition is satisfied in a first phase described later, and is set to "0" when the entry-restricted area approach condition is not satisfied or the lane change of the driver's vehicle 100 is stopped. The value of the second phase flag X2 is set to "1" when the entry-restricted area approach condition is satisfied in a second phase described later, and is set to "0" when the entry-restricted area approach condition is not satisfied or the lane change of the driver's vehicle 100 is stopped. The value of the third phase flag X3 is set to "1" when the entry-restricted area approach condition is satisfied in a third phase described later, and is set to "0" when the entry-restricted area approach condition is not satisfied or the lane change of the driver's vehicle 100 is stopped. The value of the fourth phase flag X4 is set to "1" when the entry-restricted area approach condition is satisfied in a fourth phase described later, and is set to "0" when the entry-restricted area approach condition is not satisfied or the lane change of the driver's vehicle 100 is stopped.

When the CPU determines "Yes" in Step 1810, the CPU advances the process to Step 1815 to determine whether the current phase is the first phase. The first phase is a timing when the lane change of the driver's vehicle 100 is started (that is, the lane change start condition is satisfied).

When the CPU determines "Yes" in Step 1815, the CPU advances the process to Step 1820 to determine whether the entry-restricted area approach condition is satisfied. When the CPU determines "No" in Step 1820, the CPU advances the process to Step 1825. When the driver's vehicle 100 is changing the lane to the right adjacent parallel lane, the CPU sets the target steering reaction force RFtgt by using the map shown in FIG. 2C. When the driver's vehicle 100 is changing the lane to the left adjacent parallel lane, the CPU sets the target steering reaction force RFtgt by using the map shown in FIG. 2D. Next, the CPU advances the process to Step 1830 to control the operation of the steering device 23 to output a steering reaction force corresponding to the target steering reaction force RFtgt set in Step 1825. Next, the CPU advances the process to Step 1695 of the routine shown in FIG. 16 via Step 1895, and temporarily terminates the process of this routine.

When the CPU determines "Yes" in Step 1820, the CPU advances the process to Step 1835 to set the value of the first phase flag X1 to "1". Thus, the determination is "No" in Step 1810, and is "Yes" in Step 2205 of a routine shown in FIG. 22. Next, the CPU advances the process to Step 1695 of the routine shown in FIG. 16 via Step 1895, and temporarily terminates the process of this routine.

When the CPU determines "No" in Step 1815, the CPU advances the process to Step 1845 to determine whether the current phase is the second phase. The second phase is a period after the lane change of the driver's vehicle 100 is started and before the front wheel of the driver's vehicle 100 reaches a position immediately short of the lane marking line (position at the predetermined distance from the lane marking line to the driver's vehicle 100).

When the CPU determines "Yes" in Step 1845, the CPU advances the process to Step 1850 to determine whether the entry-restricted area approach condition is satisfied. When the CPU determines "No" in Step 1850, the CPU advances the process to Step 1855. When the driver's vehicle 100 is changing the lane to the right adjacent parallel lane, the CPU sets the target steering reaction force RFtgt by using the map shown in FIG. 2C. When the driver's vehicle 100 is changing the lane to the left adjacent parallel lane, the CPU sets the target steering reaction force RFtgt by using the map shown in FIG. 2D. Next, the CPU advances the process to Step 1860 to control the operation of the steering device 23 to output a steering reaction force corresponding to the target steering reaction force RFtgt set in Step 1855. Next, the CPU advances the process to Step 1695 of the routine shown in FIG. 16 via Step 1895, and temporarily terminates the process of this routine.

When the CPU determines "Yes" in Step 1850, the CPU advances the process to Step 1865 to set the value of the second phase flag X2 to "1". Thus, the determination is "No" in Step 1810, and is "Yes" in Step 2305 of a routine shown in FIG. 23. Next, the CPU advances the process to Step 1695 of the routine shown in FIG. 16 via Step 1895, and temporarily terminates the process of this routine.

Figure 19:
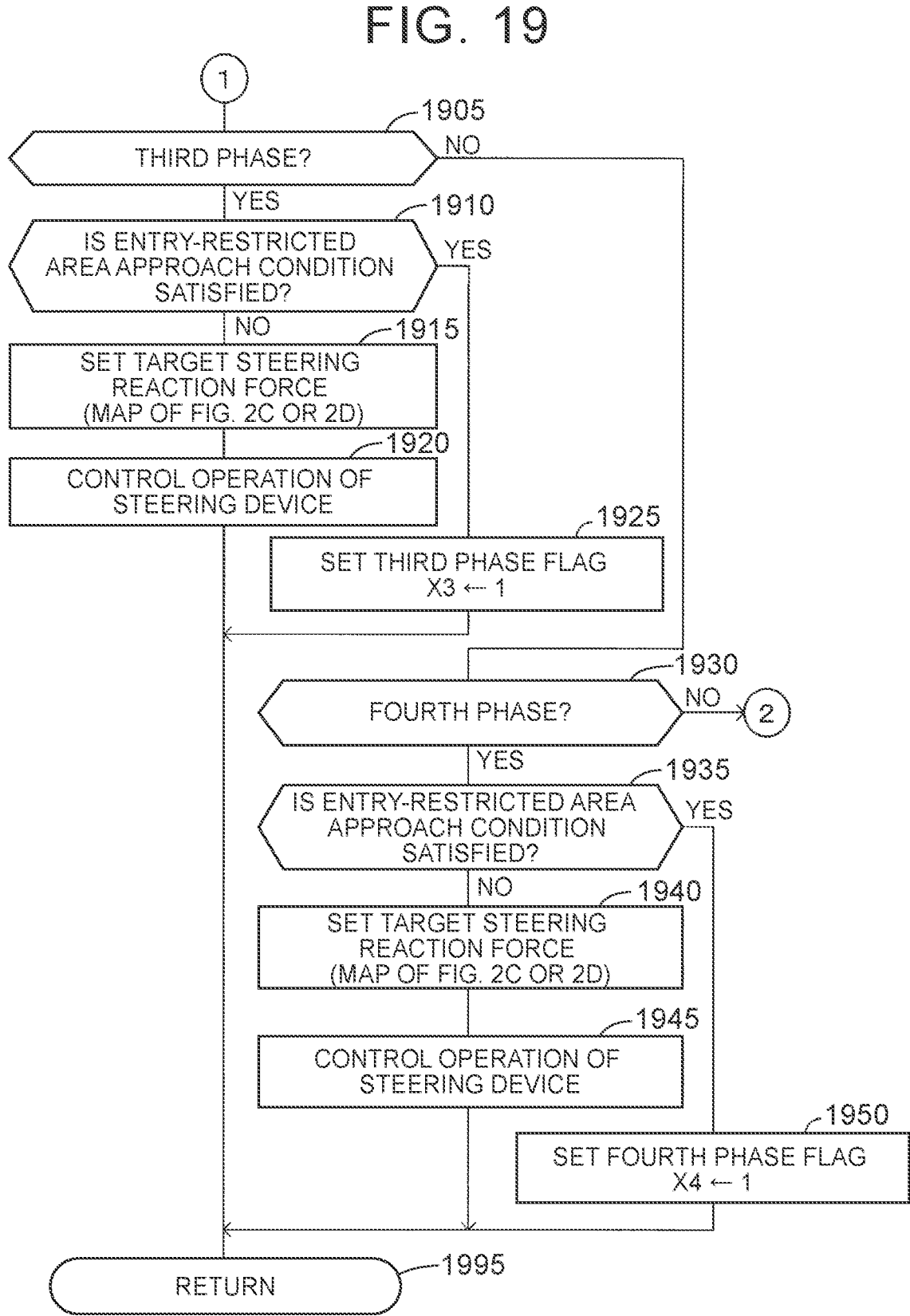
FIG. 19 is a flowchart showing a routine to be executed by the vehicle control device according to the embodiment of the present disclosure.

When the CPU determines "No" in Step 1845, the CPU advances the process to Step 1905 of a routine shown in FIG. 19 to determine whether the current phase is the third phase. The third phase is a period after the lane change of the driver's vehicle 100 is started and then the front wheel of the driver's vehicle 100 reaches the position immediately short of the lane marking line (position at the predetermined distance from the lane marking line to the driver's vehicle 100) and before the front wheel of the driver's vehicle 100 is located over the lane marking line (the driver's vehicle 100 travels across the lane marking line).

When the CPU determines "Yes" in Step 1905, the CPU advances the process to Step 1910 to determine whether the entry-restricted area approach condition is satisfied. When the CPU determines "No" in Step 1910, the CPU advances the process to Step 1915. When the driver's vehicle 100 is changing the lane to the right adjacent parallel lane, the CPU sets the target steering reaction force RFtgt by using the map shown in FIG. 2C. When the driver's vehicle 100 is changing the lane to the left adjacent parallel lane, the CPU sets the target steering reaction force RFtgt by using the map shown in FIG. 2D. Next, the CPU advances the process to Step 1920 to control the operation of the steering device 23 to output a steering reaction force corresponding to the target steering reaction force RFtgt set in Step 1915. Next, the CPU advances the process to Step 1995 to temporarily terminate the process of this routine.

When the CPU determines "Yes" in Step 1910, the CPU advances the process to Step 1925 to set the value of the third phase flag X3 to "1". Thus, the determination is "No" in Step 1810, and is "Yes" in Step 2405 of a routine shown in FIG. 24. Next, the CPU advances the process to Step 1995 to temporarily terminate the process of this routine.

When the CPU determines "No" in Step 1905, the CPU advances the process to Step 1930 to determine whether the current phase is the fourth phase. The fourth phase is a period in which the driver's vehicle 100 of which front wheel is located over the lane marking line after the lane change of the driver's vehicle 100 is started is traveling across the lane marking line.

When the CPU determines "Yes" in Step 1930, the CPU advances the process to Step 1935 to determine whether the entry-restricted area approach condition is satisfied. When the CPU determines "No" in Step 1935, the CPU advances the process to Step 1940. When the driver's vehicle 100 is changing the lane to the right adjacent parallel lane, the CPU sets the target steering reaction force RFtgt by using the map shown in FIG. 2C. When the driver's vehicle 100 is changing the lane to the left adjacent parallel lane, the CPU sets the target steering reaction force RFtgt by using the map shown in FIG. 2D. Next, the CPU advances the process to Step 1945 to control the operation of the steering device 23 to output a steering reaction force corresponding to the target steering reaction force RFtgt set in Step 1940. Next, the CPU advances the process to Step 1995 to temporarily terminate the process of this routine.

When the CPU determines "Yes" in Step 1935, the CPU advances the process to Step 1950 to set the value of the fourth phase flag X4 to "1". Thus, the determination is "No" in Step 1810, and is "Yes" in Step 2505 of a routine shown in FIG. 25. Next, the CPU advances the process to Step 1995 to temporarily terminate the process of this routine.

Figure 20:
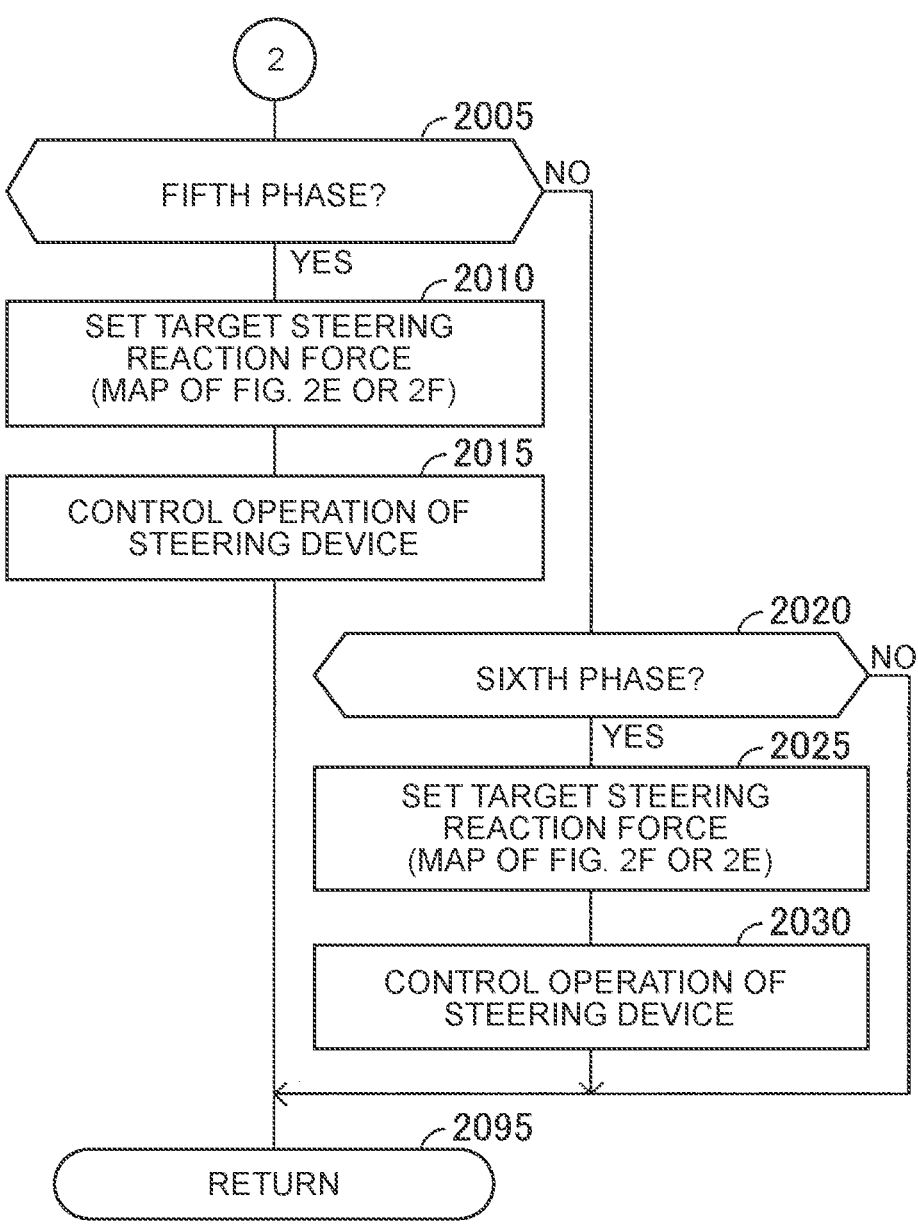
FIG. 20 is a flowchart showing a routine to be executed by the vehicle control device according to the embodiment of the present disclosure.

When the CPU determines "No" in Step 1930, the CPU advances the process to Step 2005 of a routine shown in FIG. 20 to determine whether the current phase is a fifth phase. The fifth phase is a period after the lane change of the driver's vehicle 100 is started and then the driver's vehicle 100 entirely enters the adjacent parallel lane and before the lane change of the driver's vehicle 100 is completed.

When the CPU determines "Yes" in Step 2005, the CPU advances the process to Step 2010. When the driver's vehicle 100 is changing the lane to the right adjacent parallel lane, the CPU sets the target steering reaction force RFtgt by using the map shown in FIG. 2E. When the driver's vehicle 100 is changing the lane to the left adjacent parallel lane, the CPU sets the target steering reaction force RFtgt by using the map shown in FIG. 2F. Next, the CPU advances the process to Step 2015 to control the operation of the steering device 23 to output a steering reaction force corresponding to the target steering reaction force RFtgt set in Step 2010. Next, the CPU advances the process to Step 2095 to temporarily terminate the process of this routine.

When the CPU determines "No" in Step 2005, the CPU advances the process to Step 2020 to determine whether the current phase is a sixth phase. The sixth phase is a period after the lane change of the driver's vehicle 100 is started and then the driver's vehicle 100 is returned to its original lane (initial lane) and before determination is made that the lane change of the driver's vehicle 100 is stopped.

When the CPU determines "Yes" in Step 2020, the CPU advances the process to Step 2025. When the driver's vehicle 100 has temporarily started to change the lane to the right adjacent parallel lane, the CPU sets the target steering reaction force RFtgt by using the map shown in FIG. 2F. When the driver's vehicle 100 has temporarily started to change the lane to the left adjacent parallel lane, the CPU sets the target steering reaction force RFtgt by using the map shown in FIG. 2E. Next, the CPU advances the process to Step 2030 to control the operation of the steering device 23 to output a steering reaction force corresponding to the target steering reaction force RFtgt set in Step 2025. Next, the CPU advances the process to Step 2095 to temporarily terminate the process of this routine.

When the CPU determines "No" in Step 2020, the CPU advances the process directly to Step 2095 to temporarily terminate the process of this routine.

When the CPU determines "No" in Step 1810 of the routine shown in FIG. 18, the CPU advances the process to Step 1695 of the routine shown in FIG. 16 via Step 1895, and temporarily terminates the process of this routine.

Figure 21:
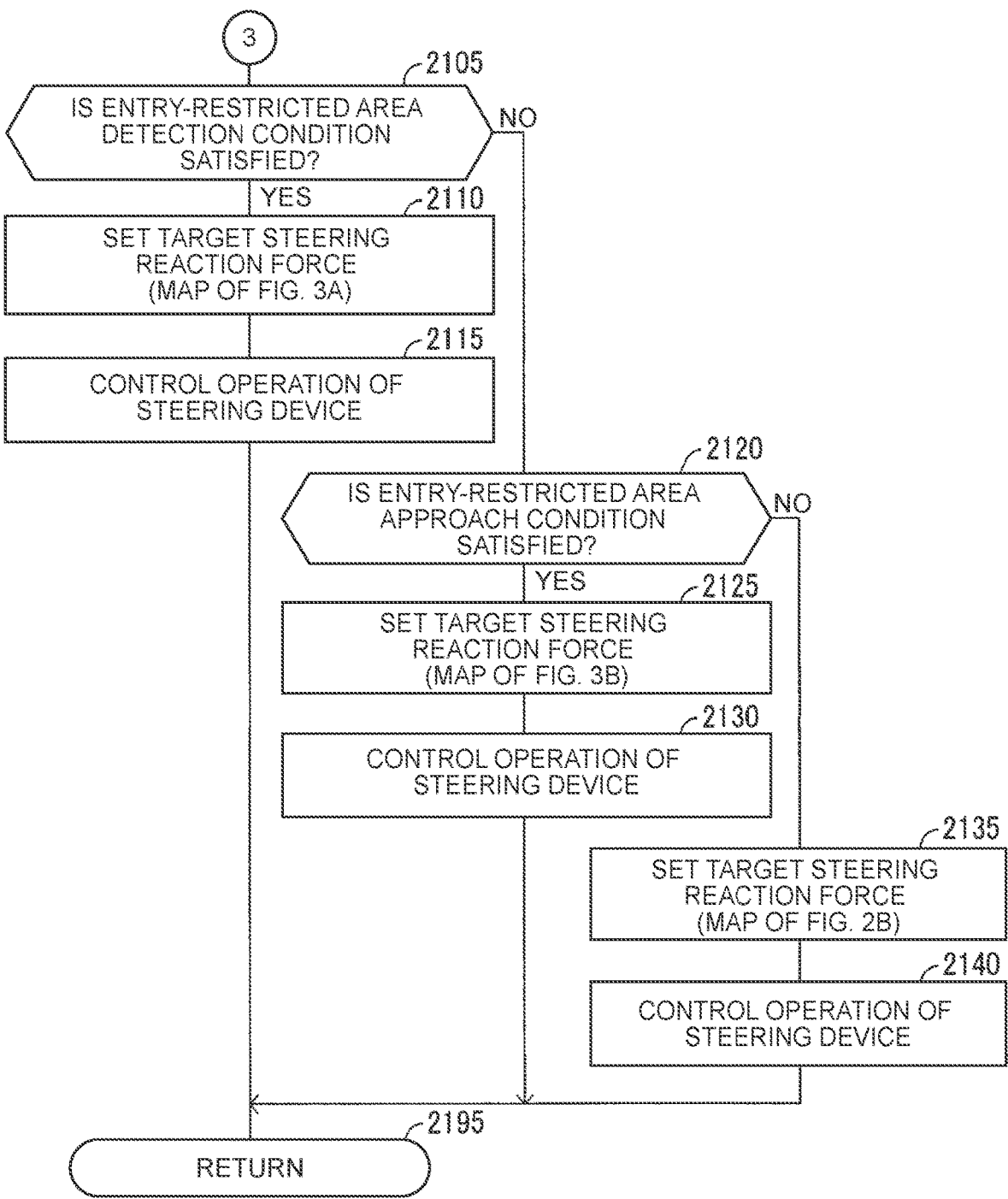
FIG. 21 is a flowchart showing a routine to be executed by the vehicle control device according to the embodiment of the present disclosure.

When the CPU determines "No" in Step 1805, the CPU advances the process to Step 2105 of a routine shown in FIG. 21 to determine whether the entry-restricted area detection condition is satisfied. When the CPU determines "Yes" in Step 2105, the CPU advances the process to Step 2110 to set the target steering reaction force RFtgt by using the map shown in FIG. 3A. Next, the CPU advances the process to Step 2115 to control the operation of the steering device 23 to output a steering reaction force corresponding to the target steering reaction force RFtgt set in Step 2110. Next, the CPU advances the process to Step 2195 to temporarily terminate the process of this routine.

When the CPU determines "No" in Step 2105, the CPU advances the process to Step 2120 to determine whether the entry-restricted area approach condition is satisfied. When the CPU determines "Yes" in Step 2120, the CPU advances the process to Step 2125 to set the target steering reaction force RFtgt by using the map shown in FIG. 3B. Next, the CPU advances the process to Step 2130 to control the operation of the steering device 23 to output a steering reaction force corresponding to the target steering reaction force RFtgt set in Step 2125. Next, the CPU advances the process to Step 2195 to temporarily terminate the process of this routine.

When the CPU determines "No" in Step 2120, the CPU advances the process to Step 2135 to set the target steering reaction force RFtgt by using the map shown in FIG. 2B. Next, the CPU advances the process to Step 2140 to control the operation of the steering device 23 to output a steering reaction force corresponding to the target steering reaction force RFtgt set in Step 2135. Next, the CPU advances the process to Step 2195 to temporarily terminate the process of this routine.

Figure 22:
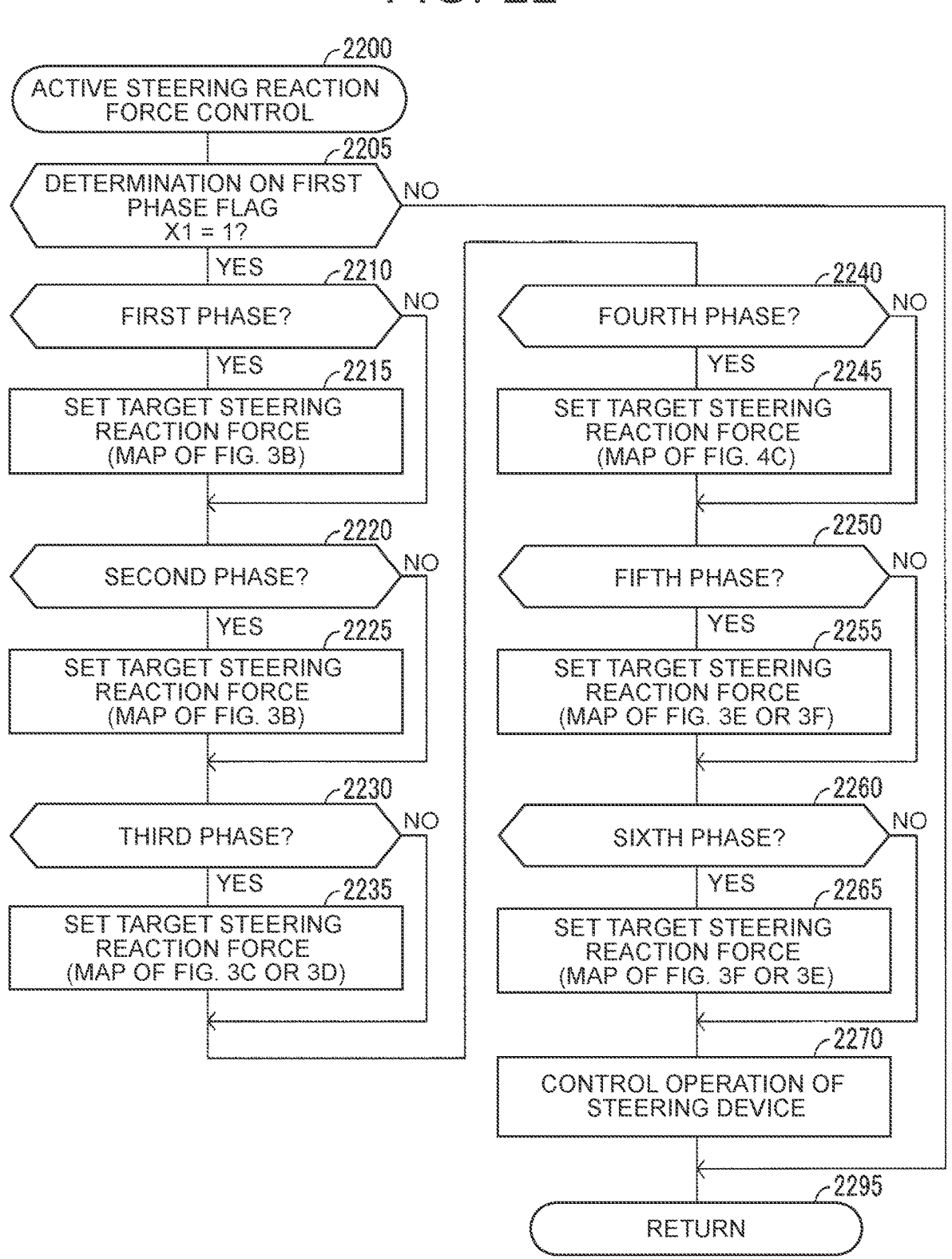
FIG. 22 is a flowchart showing a routine to be executed by the vehicle control device according to the embodiment of the present disclosure.

The CPU executes the routine shown in FIG. 22 in a predetermined calculation cycle. At a predetermined timing, the CPU starts the process from Step 2200 of the routine shown in FIG. 22, and advances the process to Step 2205 to determine whether the value of the first phase flag X1 is "1".

When the CPU determines "Yes" in Step 2205, the CPU advances the process to Step 2210 to determine whether the current phase is the first phase. When the CPU determines "Yes" in Step 2210, the CPU advances the process to Step 2215. When the driver's vehicle 100 is changing the lane to the right adjacent parallel lane and also when the driver's vehicle 100 is changing the lane to the left adjacent parallel lane, the CPU sets the target steering reaction force RFtgt by using the map shown in FIG. 3B. Then, the CPU advances the process to Step 2220. When the CPU determines "No" in Step 2210, the CPU advances the process directly to Step 2220.

When the CPU advances the process to Step 2220, the CPU determines whether the current phase is the second phase. When the CPU determines "Yes" in Step 2220, the CPU advances the process to Step 2225. When the driver's vehicle 100 is changing the lane to the right adjacent parallel lane and also when the driver's vehicle 100 is changing the lane to the left adjacent parallel lane, the CPU sets the target steering reaction force RFtgt by using the map shown in FIG. 3B. Then, the CPU advances the process to Step 2230. When the CPU determines "No" in Step 2220, the CPU advances the process directly to Step 2230.

When the CPU advances the process to Step 2230, the CPU determines whether the current phase is the third phase. When the CPU determines "Yes" in Step 2230, the CPU advances the process to Step 2235. When the driver's vehicle 100 is changing the lane to the right adjacent parallel lane, the CPU sets the target steering reaction force RFtgt by using the map shown in FIG. 3C. When the driver's vehicle 100 is changing the lane to the left adjacent parallel lane, the CPU sets the target steering reaction force RFtgt by using the map shown in FIG. 3D. Then, the CPU advances the process to Step 2240. When the CPU determines "No" in Step 2230, the CPU advances the process directly to Step 2240.

When the CPU advances the process to Step 2240, the CPU determines whether the current phase is the fourth phase. When the CPU determines "Yes" in Step 2240, the CPU advances the process to Step 2245. When the driver's vehicle 100 is changing the lane to the right adjacent parallel lane and also when the driver's vehicle 100 is changing the lane to the left adjacent parallel lane, the CPU sets the target steering reaction force RFtgt by using the map shown in FIG. 4C. Then, the CPU advances the process to Step 2250. When the CPU determines "No" in Step 2240, the CPU advances the process directly to Step 2250.

When the CPU advances the process to Step 2250, the CPU determines whether the current phase is the fifth phase. When the CPU determines "Yes" in Step 2250, the CPU advances the process to Step 2255. When the driver's vehicle 100 is changing the lane to the right adjacent parallel lane, the CPU sets the target steering reaction force RFtgt by using the map shown in FIG. 3E. When the driver's vehicle 100 is changing the lane to the left adjacent parallel lane, the CPU sets the target steering reaction force RFtgt by using the map shown in FIG. 3F. Then, the CPU advances the process to Step 2260. When the CPU determines "No" in Step 2250, the CPU advances the process directly to Step 2260.

When the CPU advances the process to Step 2260, the CPU determines whether the current phase is the sixth phase. When the CPU determines "Yes" in Step 2260, the CPU advances the process to Step 2265. When the driver's vehicle 100 is changing the lane to the right adjacent parallel lane, the CPU sets the target steering reaction force RFtgt by using the map shown in FIG. 3F. When the driver's vehicle 100 is changing the lane to the left adjacent parallel lane, the CPU sets the target steering reaction force RFtgt by using the map shown in FIG. 3E. Then, the CPU advances the process to Step 2270. When the CPU determines "No" in Step 2260, the CPU advances the process directly to Step 2270.

When the CPU advances the process to Step 2270, the CPU controls the operation of the steering device 23 to output a steering reaction force corresponding to the target steering reaction force RFtgt set in Step 2215, Step 2225, Step 2235, Step 2245, Step 2255, or Step 2265. Next, the CPU advances the process to Step 2295 to temporarily terminate the process of this routine.

When the CPU determines "No" in Step 2205, the CPU advances the process directly to Step 2295 to temporarily terminate the process of this routine.

Figure 23:
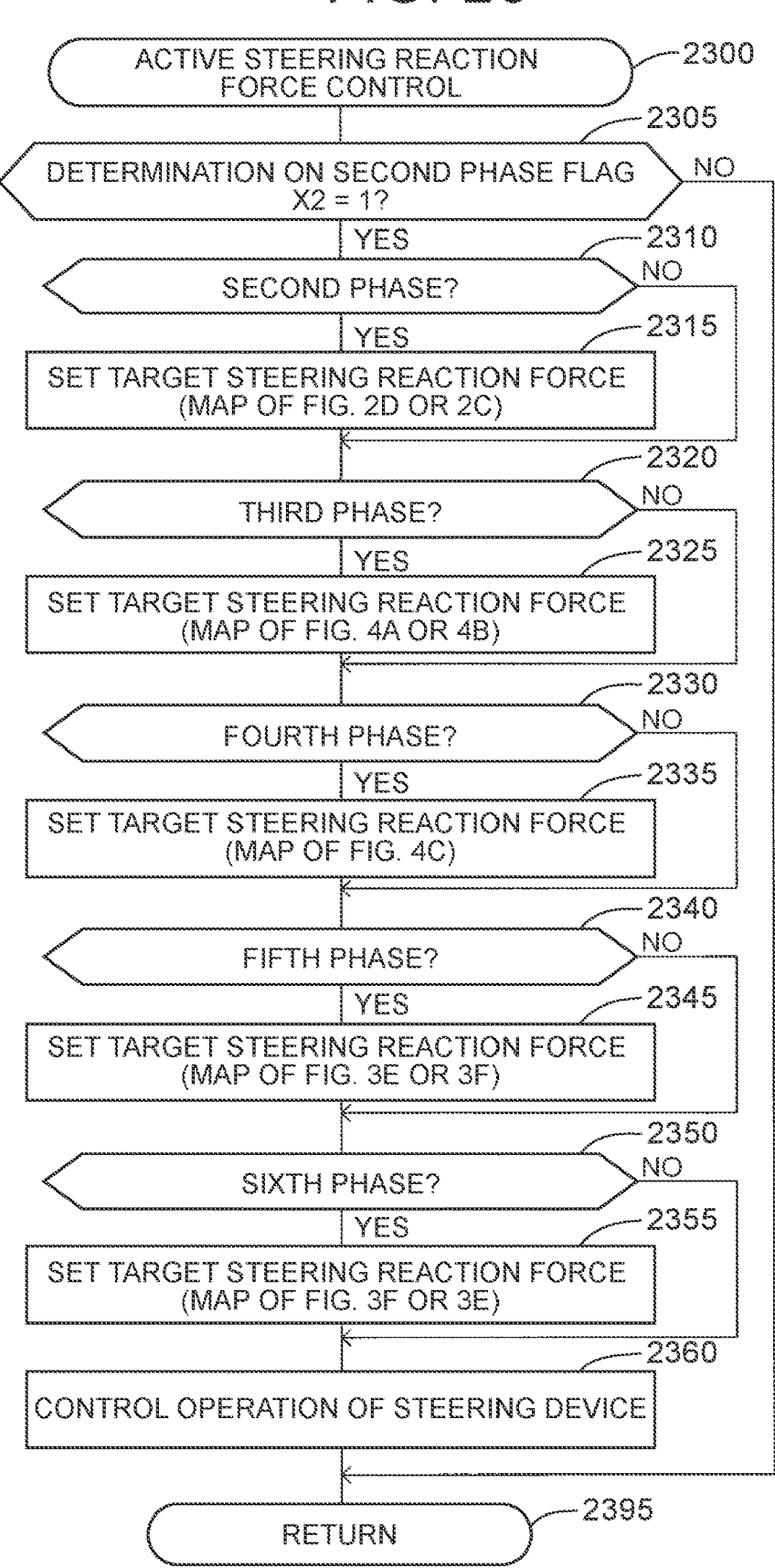
FIG. 23 is a flowchart showing a routine to be executed by the vehicle control device according to the embodiment of the present disclosure.

The CPU executes the routine shown in FIG. 23 in a predetermined calculation cycle. At a predetermined timing, the CPU starts the process from Step 2300 of the routine shown in FIG. 23, and advances the process to Step 2305 to determine whether the value of the second phase flag X2 is "1".

When the CPU determines "Yes" in Step 2305, the CPU advances the process to Step 2310 to determine whether the current phase is the second phase. When the CPU determines "Yes" in Step 2310, the CPU advances the process to Step 2315. When the driver's vehicle 100 is changing the lane to the right adjacent parallel lane, the CPU sets the target steering reaction force RFtgt by using the map shown in FIG. 2D. When the driver's vehicle 100 is changing the lane to the left adjacent parallel lane, the CPU sets the target steering reaction force RFtgt by using the map shown in FIG. 2C. Then, the CPU advances the process to Step 2320. When the CPU determines "No" in Step 2310, the CPU advances the process directly to Step 2320.

When the CPU advances the process to Step 2320, the CPU determines whether the current phase is the third phase. When the CPU determines "Yes" in Step 2320, the CPU advances the process to Step 2325. When the driver's vehicle 100 is changing the lane to the right adjacent parallel lane, the CPU sets the target steering reaction force RFtgt by using the map shown in FIG. 4A. When the driver's vehicle 100 is changing the lane to the left adjacent parallel lane, the CPU sets the target steering reaction force RFtgt by using the map shown in FIG. 4B. Then, the CPU advances the process to Step 2330. When the CPU determines "No" in Step 2320, the CPU advances the process directly to Step 2330.

When the CPU advances the process to Step 2330, the CPU determines whether the current phase is the fourth phase. When the CPU determines "Yes" in Step 2330, the CPU advances the process to Step 2335. When the driver's vehicle 100 is changing the lane to the right adjacent parallel lane and also when the driver's vehicle 100 is changing the lane to the left adjacent parallel lane, the CPU sets the target steering reaction force RFtgt by using the map shown in FIG. 4C. Then, the CPU advances the process to Step 2340. When the CPU determines "No" in Step 2330, the CPU advances the process directly to Step 2340.

When the CPU advances the process to Step 2340, the CPU determines whether the current phase is the fifth phase. When the CPU determines "Yes" in Step 2340, the CPU advances the process to Step 2345. When the driver's vehicle 100 is changing the lane to the right adjacent parallel lane, the CPU sets the target steering reaction force RFtgt by using the map shown in FIG. 3E. When the driver's vehicle 100 is changing the lane to the left adjacent parallel lane, the CPU sets the target steering reaction force RFtgt by using the map shown in FIG. 3F. Then, the CPU advances the process to Step 2350. When the CPU determines "No" in Step 2340, the CPU advances the process directly to Step 2350.

When the CPU advances the process to Step 2350, the CPU determines whether the current phase is the sixth phase. When the CPU determines "Yes" in Step 2350, the CPU advances the process to Step 2355. When the driver's vehicle 100 is changing the lane to the right adjacent parallel lane, the CPU sets the target steering reaction force RFtgt by using the map shown in FIG. 3F. When the driver's vehicle 100 is changing the lane to the left adjacent parallel lane, the CPU sets the target steering reaction force RFtgt by using the map shown in FIG. 3E. Then, the CPU advances the process to Step 2360. When the CPU determines "No" in Step 2350, the CPU advances the process directly to Step 2360.

When the CPU advances the process to Step 2360, the CPU controls the operation of the steering device 23 to output a steering reaction force corresponding to the target steering reaction force RFtgt set in Step 2315, Step 2325, Step 2335, Step 2345, or Step 2355. Next, the CPU advances the process to Step 2395 to temporarily terminate the process of this routine.

When the CPU determines "No" in Step 2305, the CPU advances the process directly to Step 2395 to temporarily terminate the process of this routine.

Figure 24:
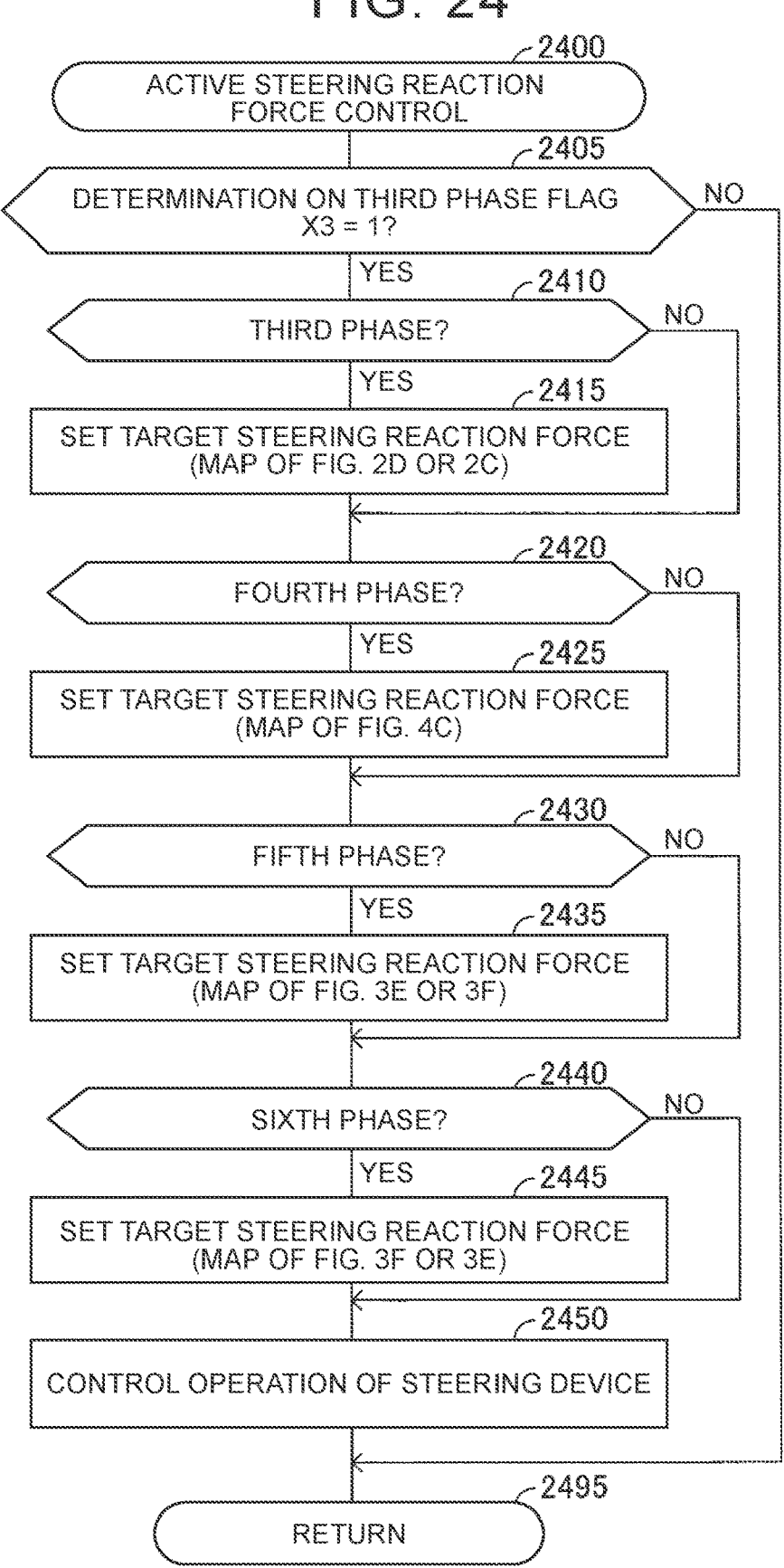
FIG. 24 is a flowchart showing a routine to be executed by the vehicle control device according to the embodiment of the present disclosure.

The CPU executes the routine shown in FIG. 24 in a predetermined calculation cycle. At a predetermined timing, the CPU starts the process from Step 2400 of the routine shown in FIG. 24, and advances the process to Step 2405 to determine whether the value of the third phase flag X3 is "1".

When the CPU determines "Yes" in Step 2405, the CPU advances the process to Step 2410 to determine whether the current phase is the third phase. When the CPU determines "Yes" in Step 2410, the CPU advances the process to Step 2415. When the driver's vehicle 100 is changing the lane to the right adjacent parallel lane, the CPU sets the target steering reaction force RFtgt by using the map shown in FIG. 2D. When the driver's vehicle 100 is changing the lane to the left adjacent parallel lane, the CPU sets the target steering reaction force RFtgt by using the map shown in FIG. 2C. Then, the CPU advances the process to Step 2420.

When the CPU determines "No" in Step 2410, the CPU advances the process directly to Step 2420.

When the CPU advances the process to Step 2420, the CPU determines whether the current phase is the fourth phase. When the CPU determines "Yes" in Step 2420, the CPU advances the process to Step 2425. When the driver's vehicle 100 is changing the lane to the right adjacent parallel lane and also when the driver's vehicle 100 is changing the lane to the left adjacent parallel lane, the CPU sets the target steering reaction force RFtgt by using the map shown in FIG. 4C. Then, the CPU advances the process to Step 2430. When the CPU determines "No" in Step 2420, the CPU advances the process directly to Step 2430.

When the CPU advances the process to Step 2430, the CPU determines whether the current phase is the fifth phase. When the CPU determines "Yes" in Step 2430, the CPU advances the process to Step 2435. When the driver's vehicle 100 is changing the lane to the right adjacent parallel lane, the CPU sets the target steering reaction force RFtgt by using the map shown in FIG. 3E. When the driver's vehicle 100 is changing the lane to the left adjacent parallel lane, the CPU sets the target steering reaction force RFtgt by using the map shown in FIG. 3F. Then, the CPU advances the process to Step 2440. When the CPU determines "No" in Step 2430, the CPU advances the process directly to Step 2440.

When the CPU advances the process to Step 2440, the CPU determines whether the current phase is the sixth phase. When the CPU determines "Yes" in Step 2440, the CPU advances the process to Step 2445. When the driver's vehicle 100 is changing the lane to the right adjacent parallel lane, the CPU sets the target steering reaction force RFtgt by using the map shown in FIG. 3F. When the driver's vehicle 100 is changing the lane to the left adjacent parallel lane, the CPU sets the target steering reaction force RFtgt by using the map shown in FIG. 3E. Then, the CPU advances the process to Step 2450. When the CPU determines "No" in Step 2440, the CPU advances the process directly to Step 2450.

When the CPU advances the process to Step 2450, the CPU controls the operation of the steering device 23 to output a steering reaction force corresponding to the target steering reaction force RFtgt set in Step 2415, Step 2425, Step 2435, or Step 2445. Next, the CPU advances the process to Step 2495 to temporarily terminate the process of this routine.

When the CPU determines "No" in Step 2405, the CPU advances the process directly to Step 2495 to temporarily terminate the process of this routine.

Figure 25:
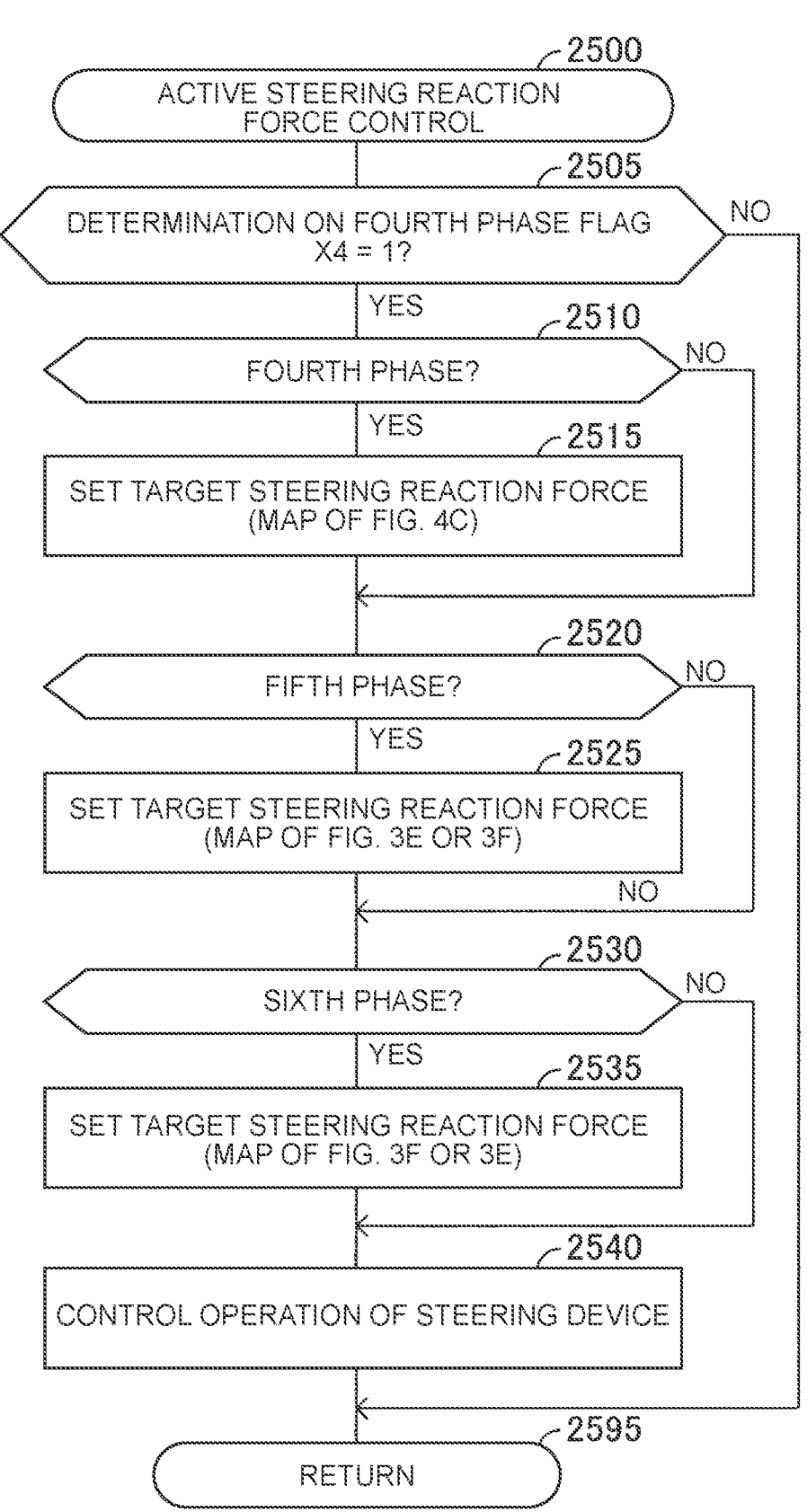
FIG. 25 is a flowchart showing a routine to be executed by the vehicle control device according to the embodiment of the present disclosure.

The CPU executes the routine shown in FIG. 25 in a predetermined calculation cycle. At a predetermined timing, the CPU starts the process from Step 2500 of the routine shown in FIG. 25, and advances the process to Step 2505 to determine whether the value of the fourth phase flag X4 is "1".

When the CPU determines "Yes" in Step 2505, the CPU advances the process to Step 2510 to determine whether the current phase is the fourth phase. When the CPU determines "Yes" in Step 2510, the CPU advances the process to Step 2515. When the driver's vehicle 100 is changing the lane to the right adjacent parallel lane and also when the driver's vehicle 100 is changing the lane to the left adjacent parallel lane, the CPU sets the target steering reaction force RFtgt by using the map shown in FIG. 4C. Then, the CPU advances the process to Step 2520. When the CPU determines "No" in Step 2510, the CPU advances the process directly to Step 2520.

When the CPU advances the process to Step 2520, the CPU determines whether the current phase is the fifth phase. When the CPU determines "Yes" in Step 2520, the CPU advances the process to Step 2525. When the driver's vehicle 100 is changing the lane to the right adjacent parallel lane, the CPU sets the target steering reaction force RFtgt by using the map shown in FIG. 3E. When the driver's vehicle 100 is changing the lane to the left adjacent parallel lane, the CPU sets the target steering reaction force RFtgt by using the map shown in FIG. 3F. Then, the CPU advances the process to Step 2530. When the CPU determines "No" in Step 2520, the CPU advances the process directly to Step 2530.

When the CPU advances the process to Step 2530, the CPU determines whether the current phase is the sixth phase. When the CPU determines "Yes" in Step 2530, the CPU advances the process to Step 2535. When the driver's vehicle 100 is changing the lane to the right adjacent parallel lane, the CPU sets the target steering reaction force RFtgt by using the map shown in FIG. 3F. When the driver's vehicle 100 is changing the lane to the left adjacent parallel lane, the CPU sets the target steering reaction force RFtgt by using the map shown in FIG. 3E. Then, the CPU advances the process to Step 2540. When the CPU determines "No" in Step 2530, the CPU advances the process directly to Step 2540.

When the CPU advances the process to Step 2540, the CPU controls the operation of the steering device 23 to output a steering reaction force corresponding to the target steering reaction force RFtgt set in Step 2515, Step 2525, or Step 2535. Next, the CPU advances the process to Step 2595 to temporarily terminate the process of this routine.

When the CPU determines "No" in Step 2505, the CPU advances the process directly to Step 2595 to temporarily terminate the process of this routine.

The above are the specific operations of the vehicle control device 10.

The present disclosure is not limited to the embodiment described above, and a variety of modifications can be adopted within the scope of the present disclosure.

What is claimed is:

1. A vehicle control device comprising:

a reaction device configured to apply a steering reaction force to a steering operation performed by a driver on a driver's vehicle; and a control device configured to execute steering reaction force control for controlling a value of the steering reaction force, wherein:

the control device is configured to apply, to the steering operation, a reaction force having a reference value as the steering reaction force when a lane change of the driver's vehicle is not performed during execution of the steering reaction force control;

the control device is configured to, when the lane change of the driver's vehicle is performed during the execution of the steering reaction force control, set the steering reaction force to be applied to the steering operation in a direction of the lane change of the driver's vehicle to a value smaller than the reference value; and the control device is configured such that, when an entry-restricted area approach condition that a parallel lane adjoining a lane along which the driver's vehicle is traveling includes, at a part ahead of the driver's vehicle, an entry-restricted area where entry of the driver's vehicle is restricted is satisfied during the execution of the steering reaction force control, the steering reaction force to be applied to the steering operation in a direction of movement of the driver's vehicle toward the parallel lane is not set to the value smaller than the reference value, wherein the control device is configured to, when the entry-restricted area approach condition for the parallel lane is satisfied during the execution of the steering reaction force control, set the steering reaction force to be applied to the steering operation in the direction of movement of the driver's vehicle toward the parallel lane to a value larger than the reference value.

2. A vehicle control device comprising:

a reaction device configured to apply a steering reaction force to a steering operation performed by a driver on a driver's vehicle; and a control device configured to execute steering reaction force control for controlling a value of the steering reaction force, wherein:

the control device is configured to apply, to the steering operation, a reaction force having a reference value as the steering reaction force when a lane change of the driver's vehicle is not performed during execution of the steering reaction force control;

the control device is configured to, when the lane change of the driver's vehicle is performed during the execution of the steering reaction force control, set the steering reaction force to be applied to the steering operation in a direction of the lane change of the driver's vehicle to a value smaller than the reference value; and the control device is configured such that, when an entry-restricted area approach condition that a parallel lane adjoining a lane along which the driver's vehicle is traveling includes, at a part ahead of the driver's vehicle, an entry-restricted area where entry of the driver's vehicle is restricted is satisfied during the execution of the steering reaction force control, the steering reaction force to be applied to the steering operation in a direction of movement of the driver's vehicle toward the parallel lane is not set to the value smaller than the reference value, wherein the control device is configured to, when the entry-restricted area approach condition for the parallel lane to which the driver's vehicle is expected to change the lane is satisfied at a start of the lane change of the driver's vehicle during the execution of the steering reaction force control, or when the entry-restricted area approach condition for the parallel lane is satisfied within a period after the start of the lane change of the driver's vehicle and before entry of the driver's vehicle into the parallel lane, set the steering reaction force to be applied to the steering operation in the direction of the lane change of the driver's vehicle to a value larger than the reference value, and set the steering reaction force to be applied to the steering operation in a direction opposite to the direction of the lane change of the driver's vehicle to the value smaller than the reference value.

3. A vehicle control device comprising:

a reaction device configured to apply a steering reaction force to a steering operation performed by a driver on a driver's vehicle; and a control device configured to execute steering reaction force control for controlling a value of the steering reaction force, wherein:

the control device is configured to apply, to the steering operation, a reaction force having a reference value as the steering reaction force when a lane change of the driver's vehicle is not performed during execution of the steering reaction force control;

the control device is configured to, when the lane change of the driver's vehicle is performed during the execution of the steering reaction force control, set the steering reaction force to be applied to the steering operation in a direction of the lane change of the driver's vehicle to a value smaller than the reference value; and the control device is configured such that, when an entry-restricted area approach condition that a parallel lane adjoining a lane along which the driver's vehicle is traveling includes, at a part ahead of the driver's vehicle, an entry-restricted area where entry of the driver's vehicle is restricted is satisfied during the execution of the steering reaction force control, the steering reaction force to be applied to the steering operation in a direction of movement of the driver's vehicle toward the parallel lane is not set to the value smaller than the reference value, wherein the control device is configured to, when the entry-restricted area approach condition for the parallel lane is satisfied within a period after the driver's vehicle starts to change the lane and starts to enter the parallel lane during the execution of the steering reaction force control and before entry of the driver's vehicle into the parallel lane is completed, set the steering reaction force to be applied to the steering operation in the direction of the lane change of the driver's vehicle to the value smaller than the reference value, and set the steering reaction force to be applied to the steering operation in a direction opposite to the direction of the lane change of the driver's vehicle to the value smaller than the reference value.

* * * * *